Oct. 27, 1959  H. J. MUMMA  2,910,288
MACHINE FOR HANDLING EGGS
Original Filed June 1, 1953  35 Sheets-Sheet 5
FIG_3C
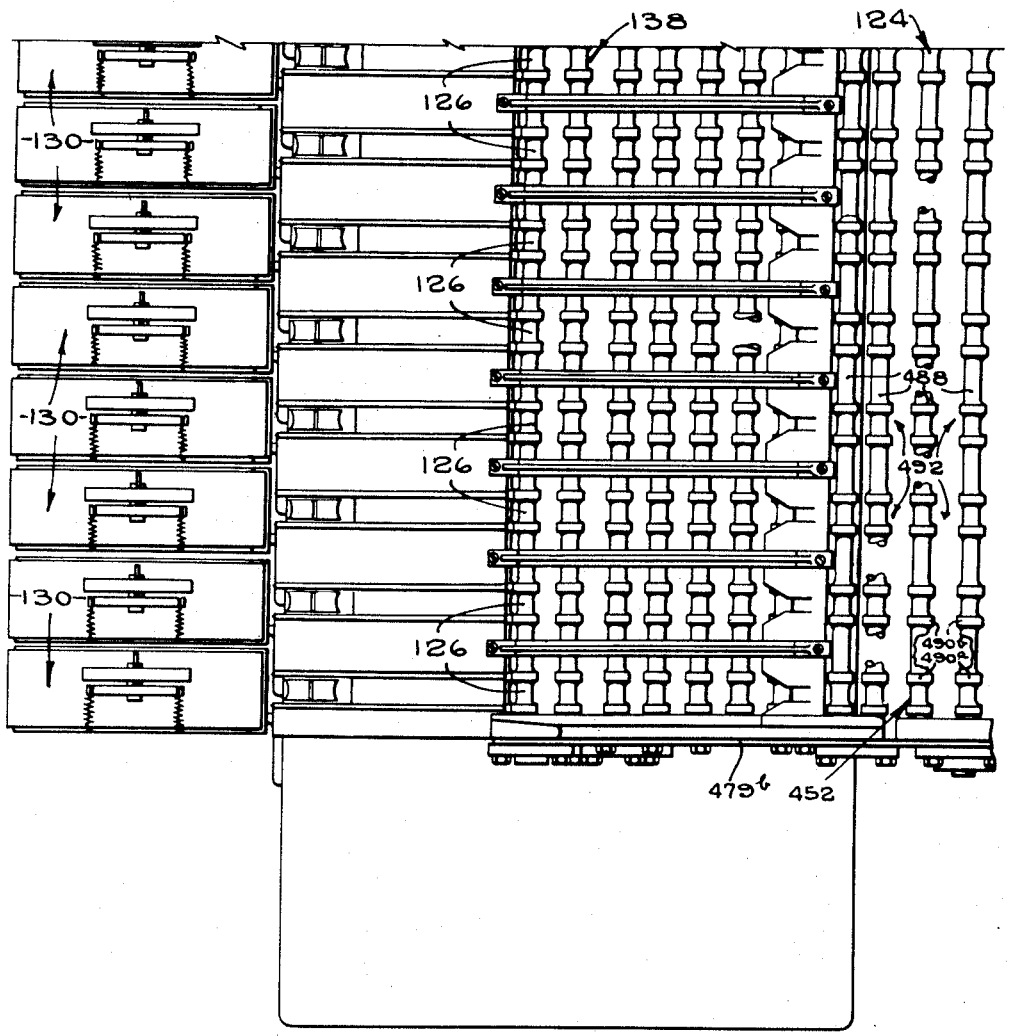
INVENTOR
HAROLD J. MUMMA
BY Hans G. Hoffmeister.
ATTORNEY

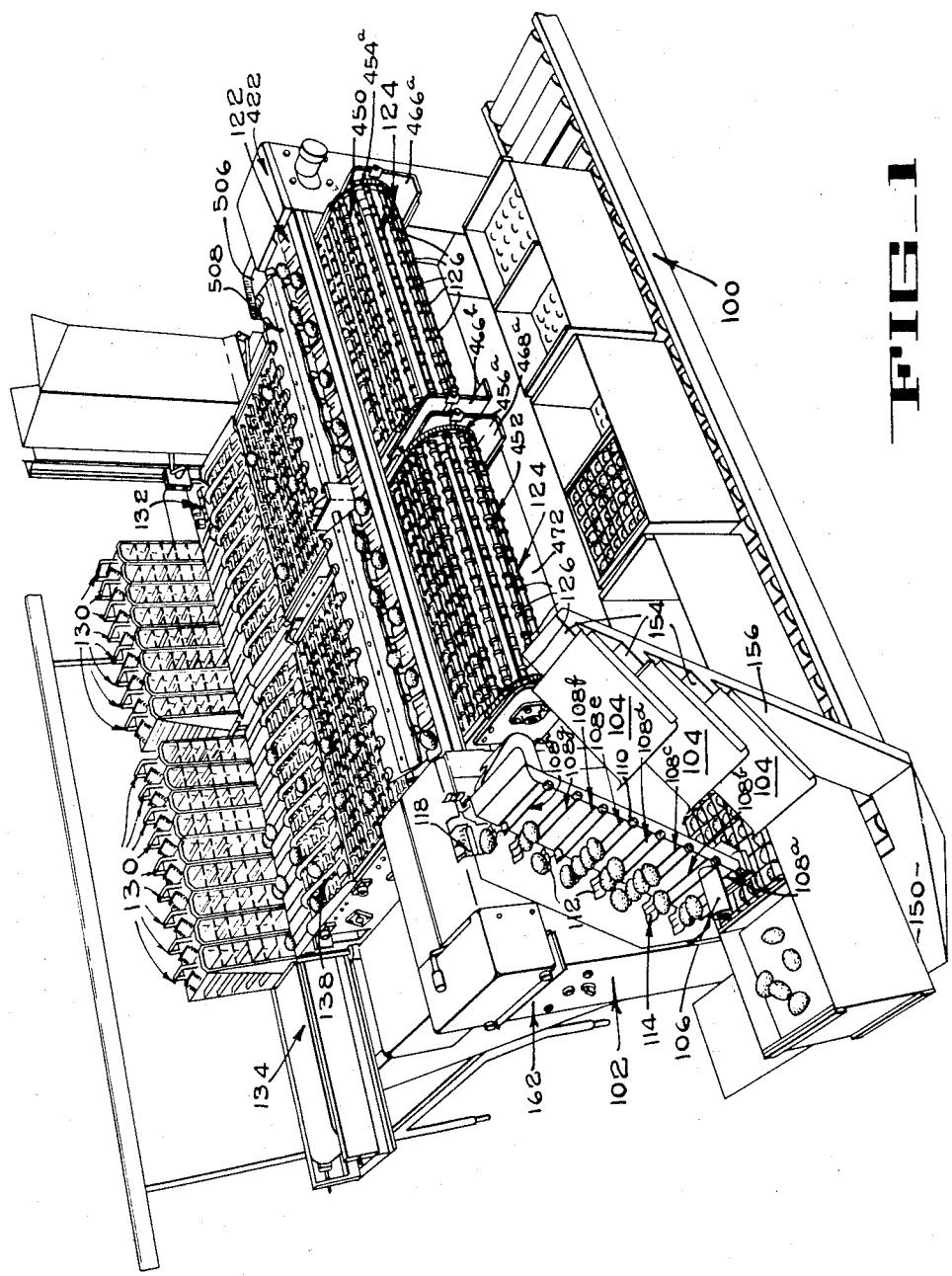

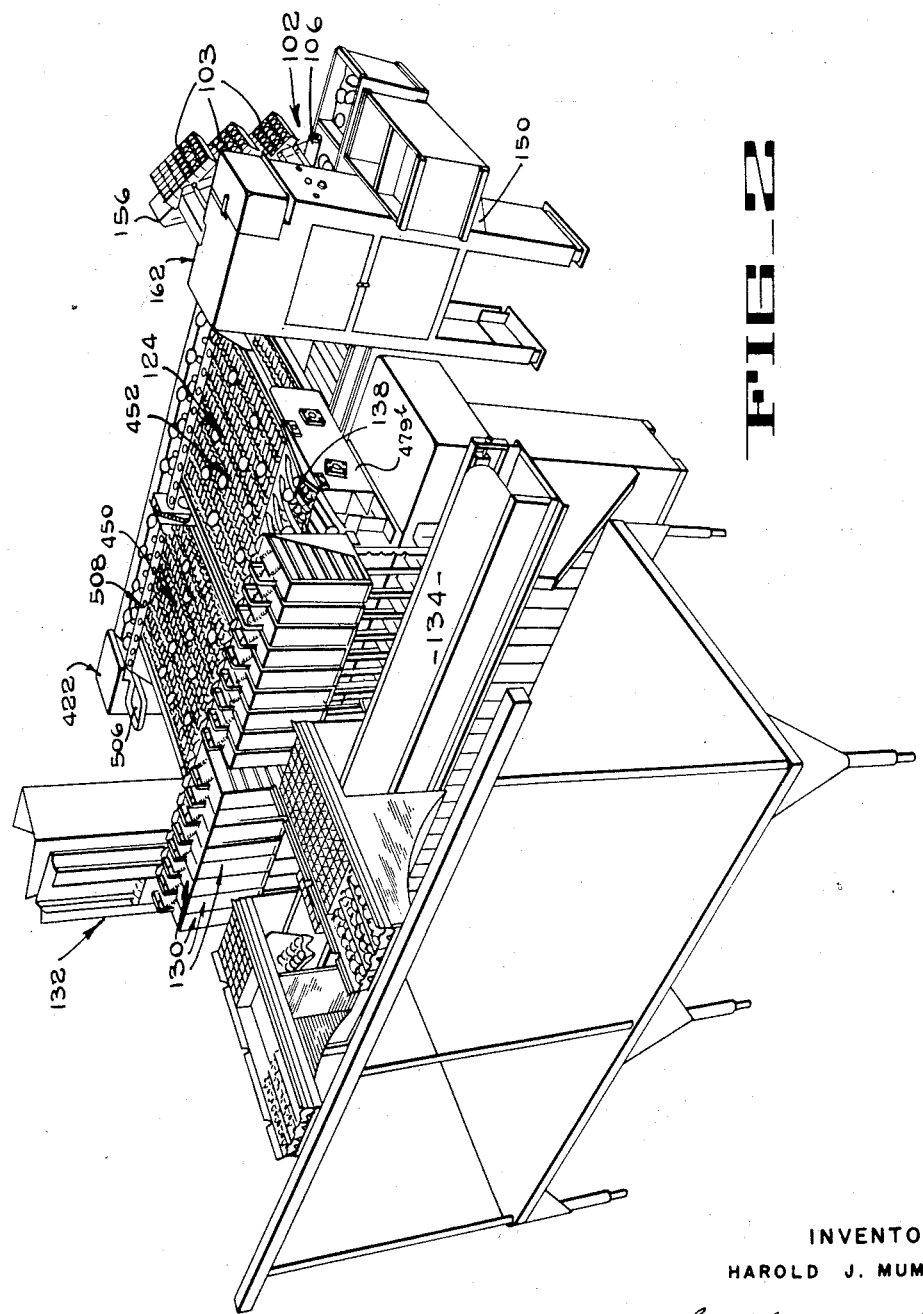

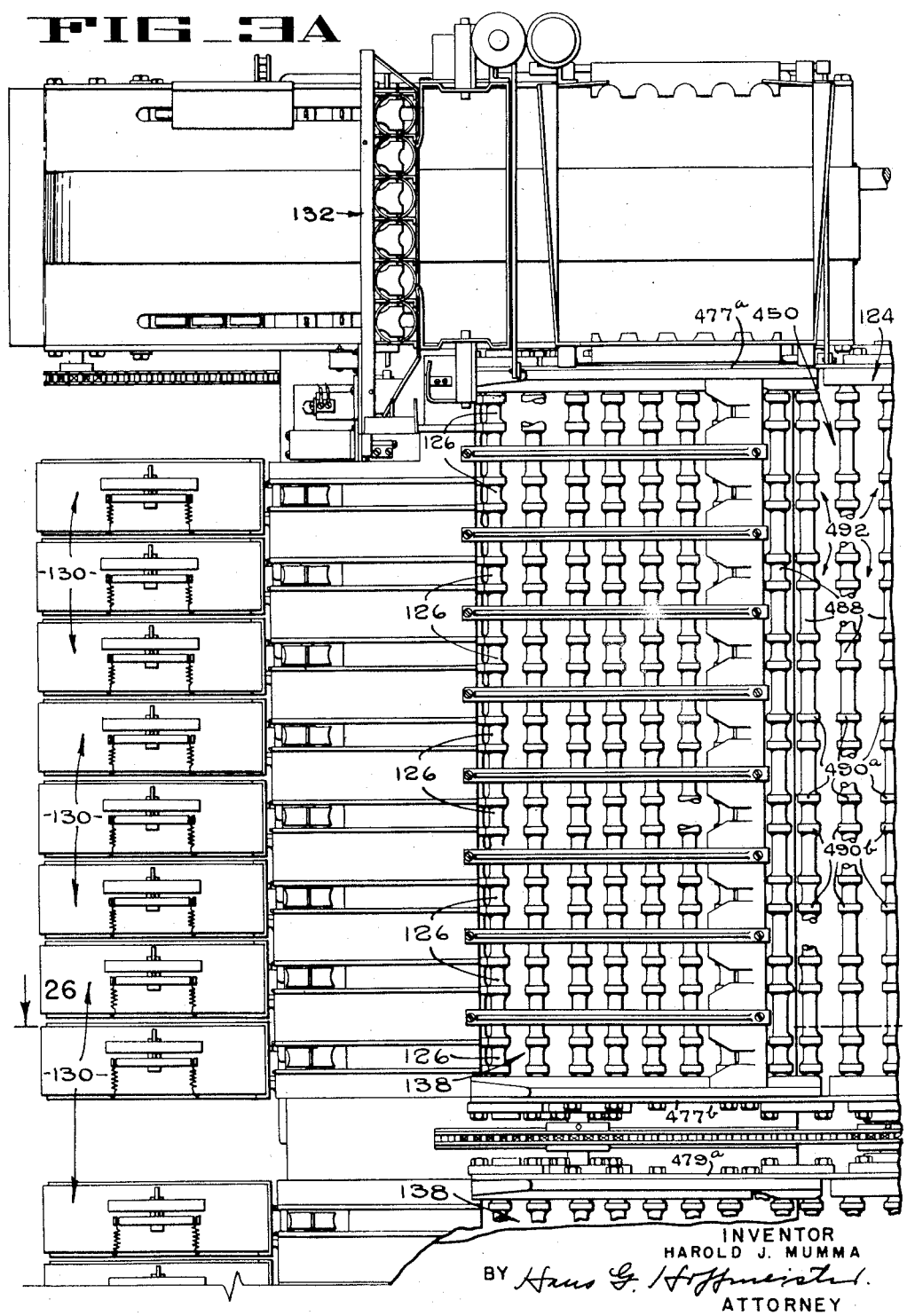

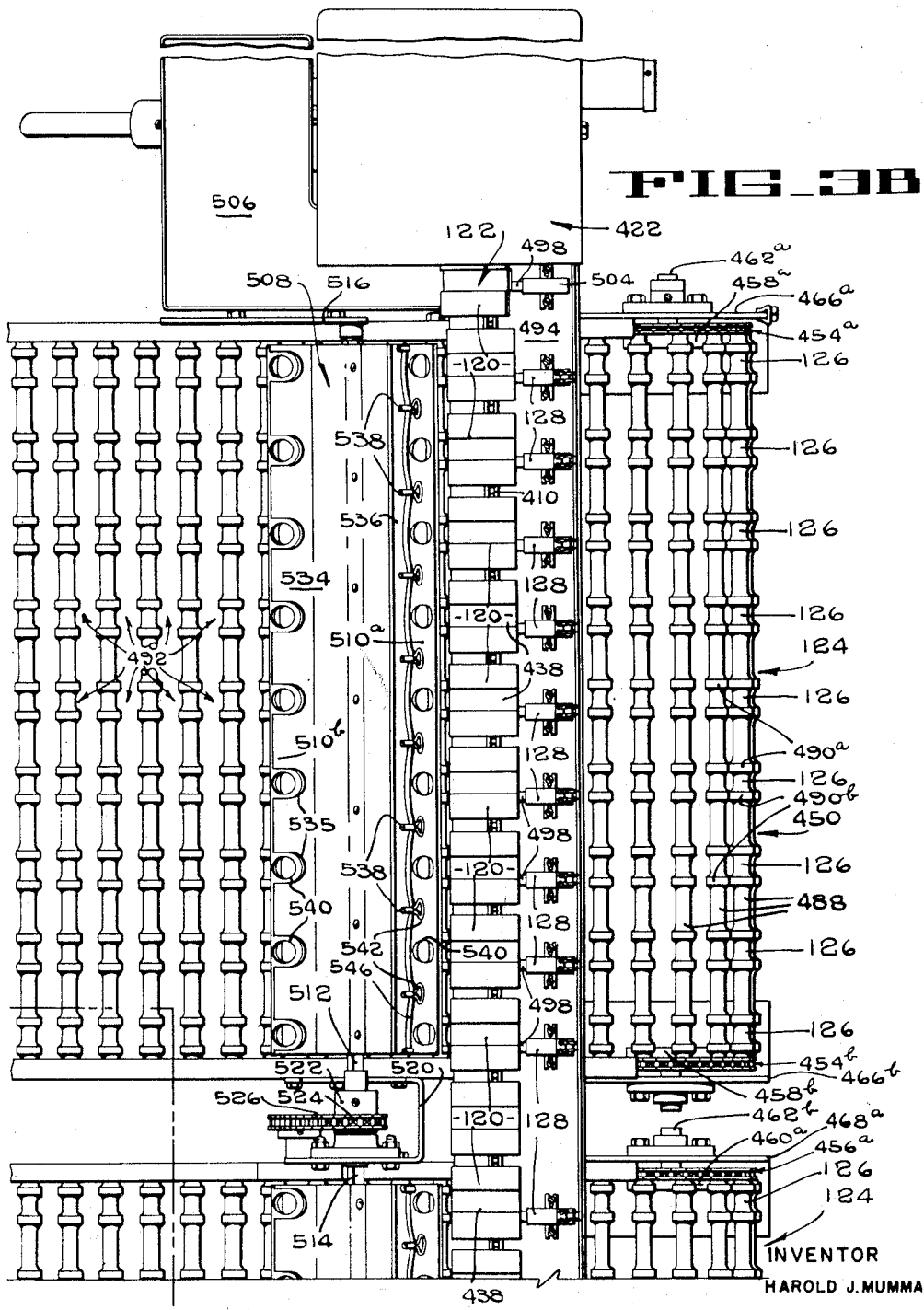

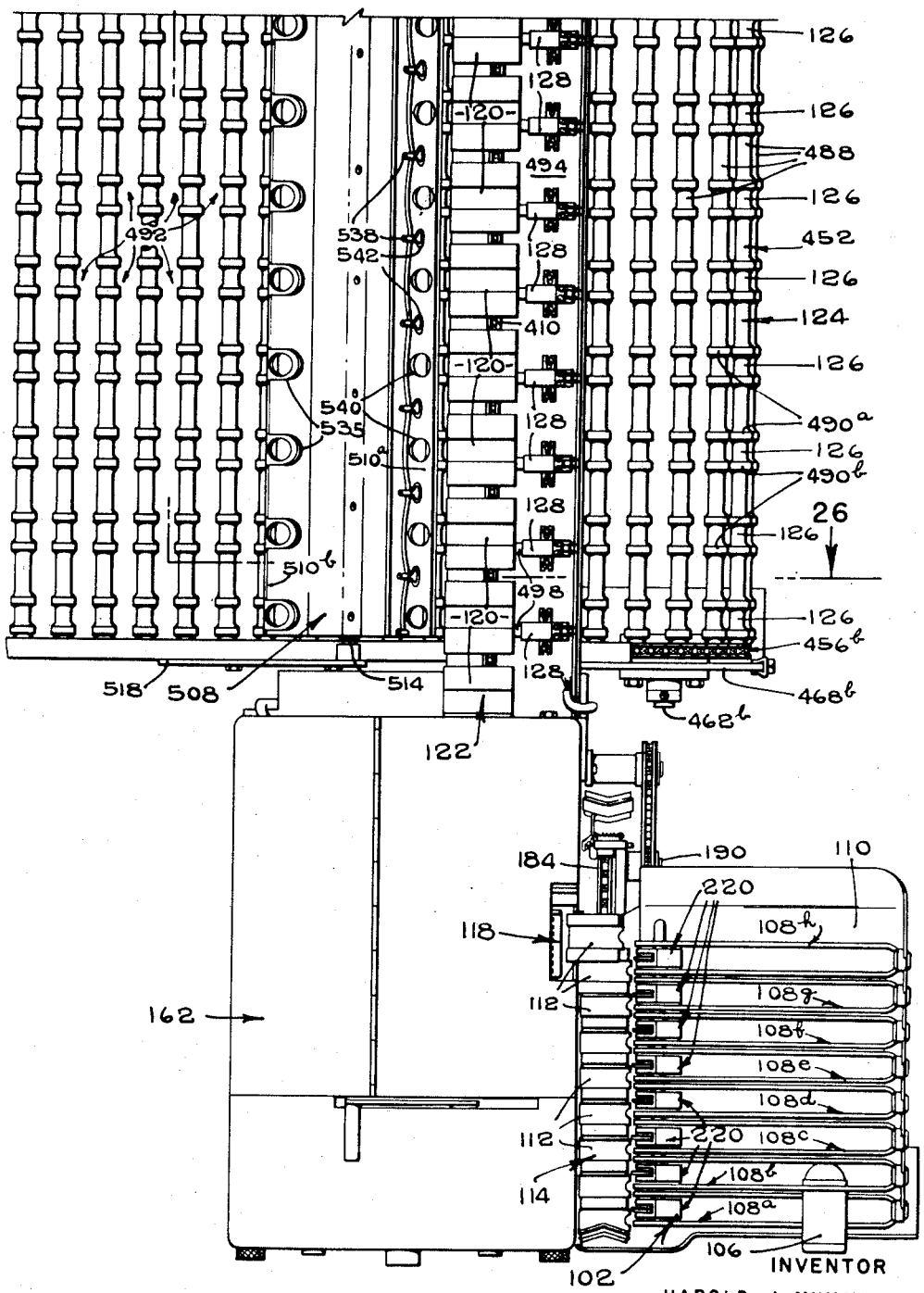
FIG_3D

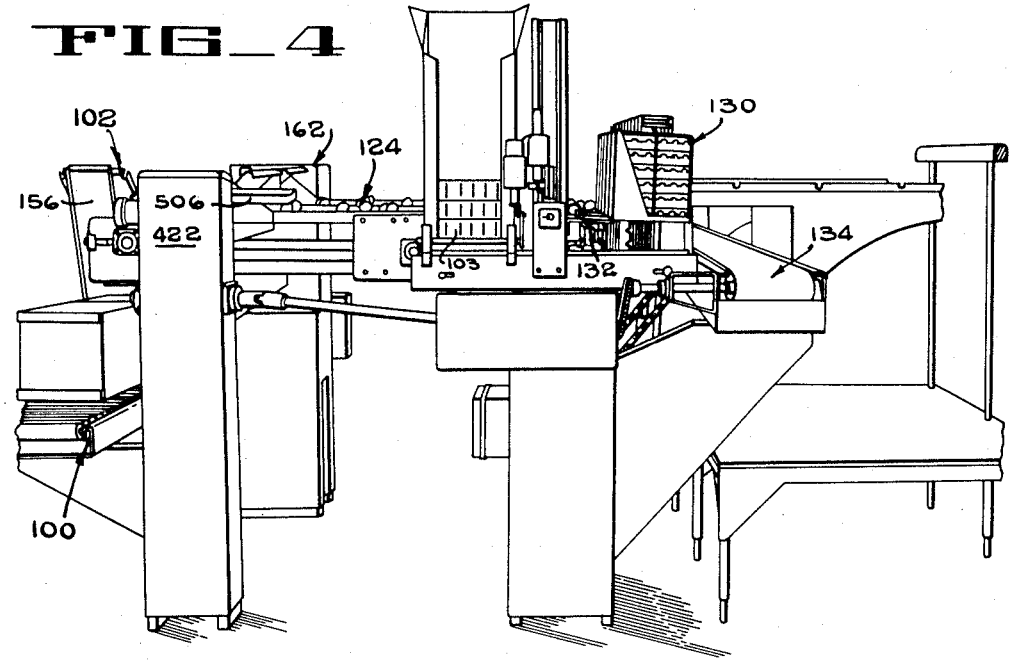

Oct. 27, 1959   H. J. MUMMA   2,910,288
MACHINE FOR HANDLING EGGS
Original Filed June 1, 1953   35 Sheets-Sheet 8
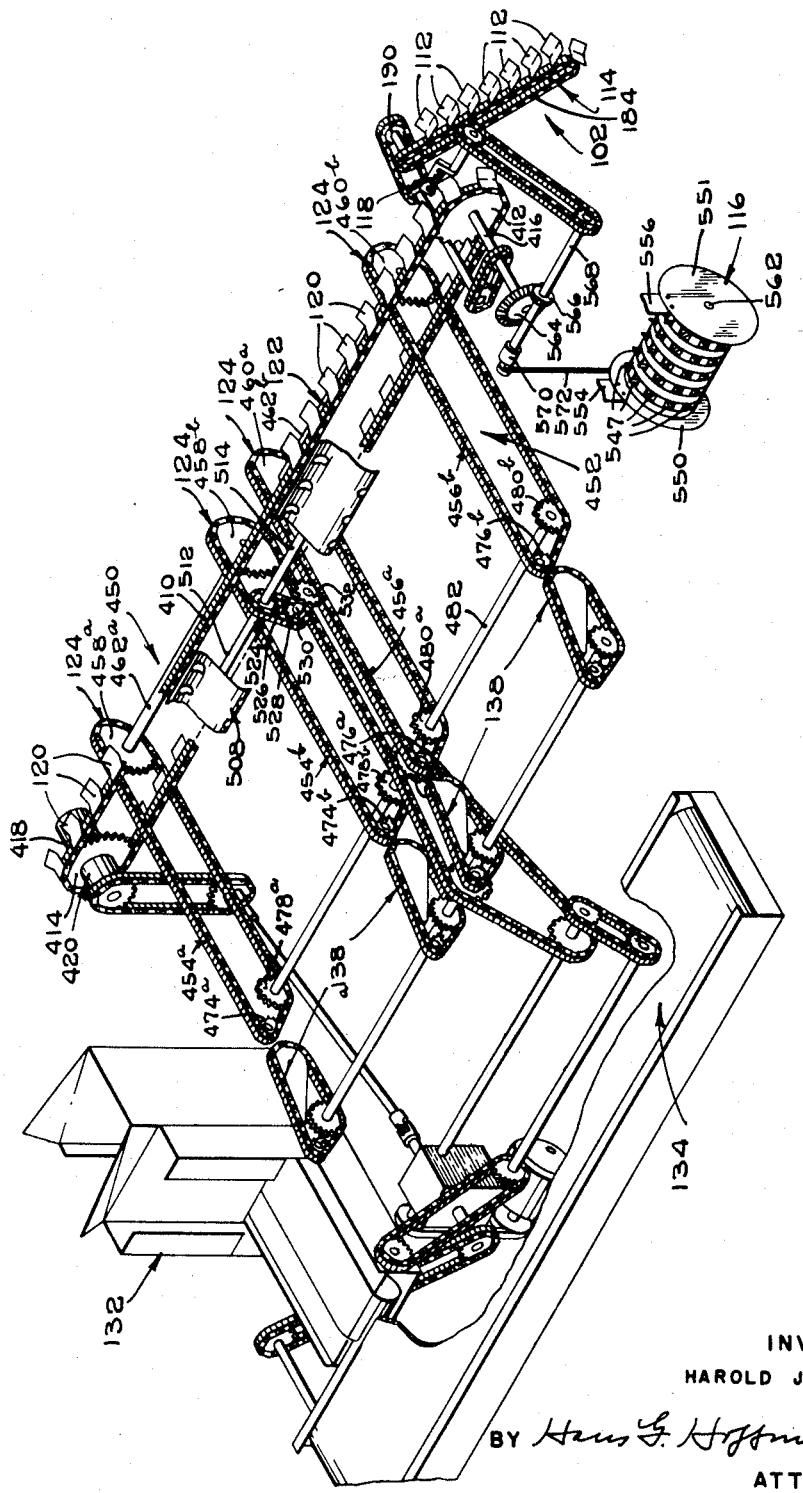
INVENTOR
HAROLD J. MUMMA
BY Hans G. Hoffmeister
ATTORNEY

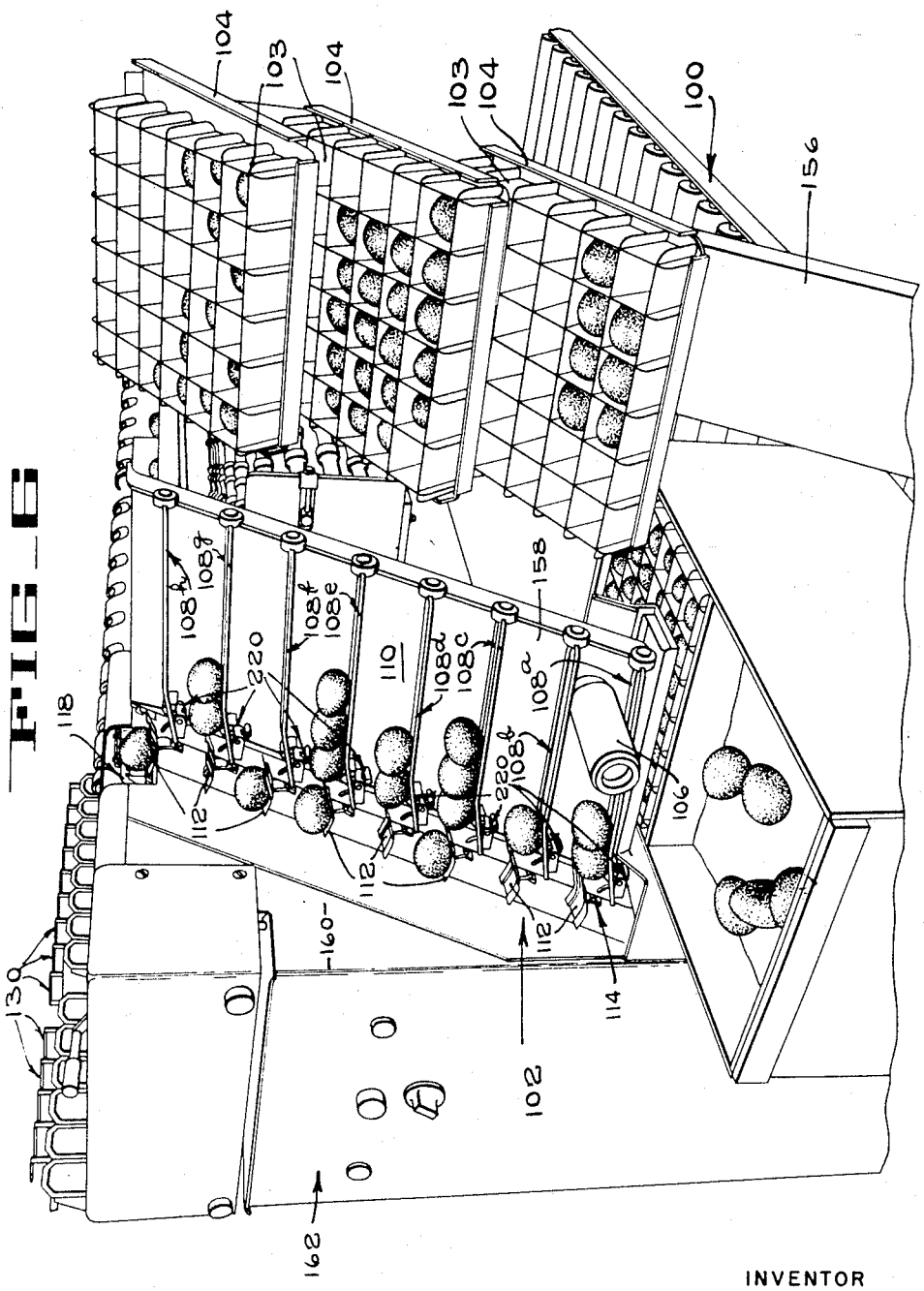

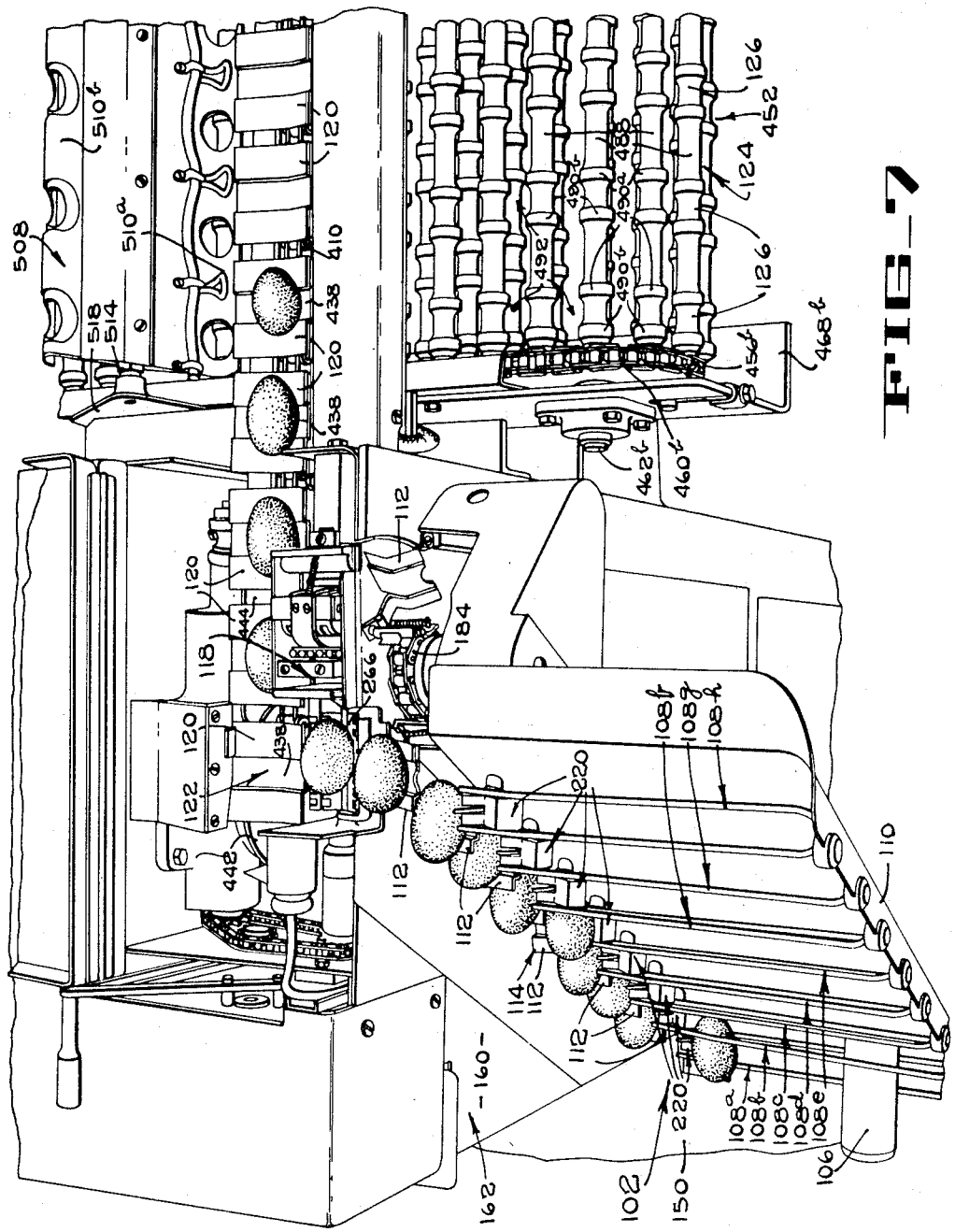

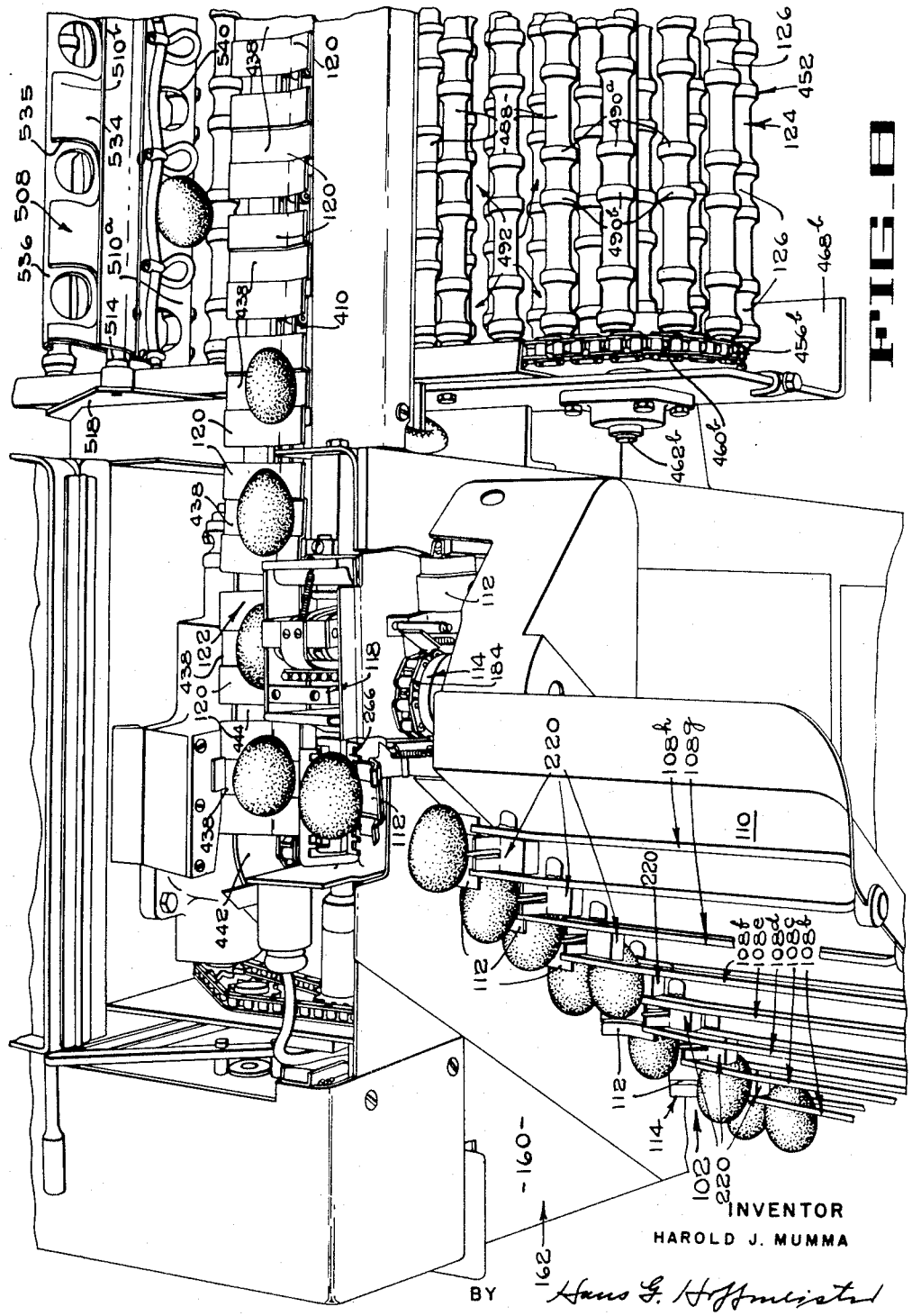

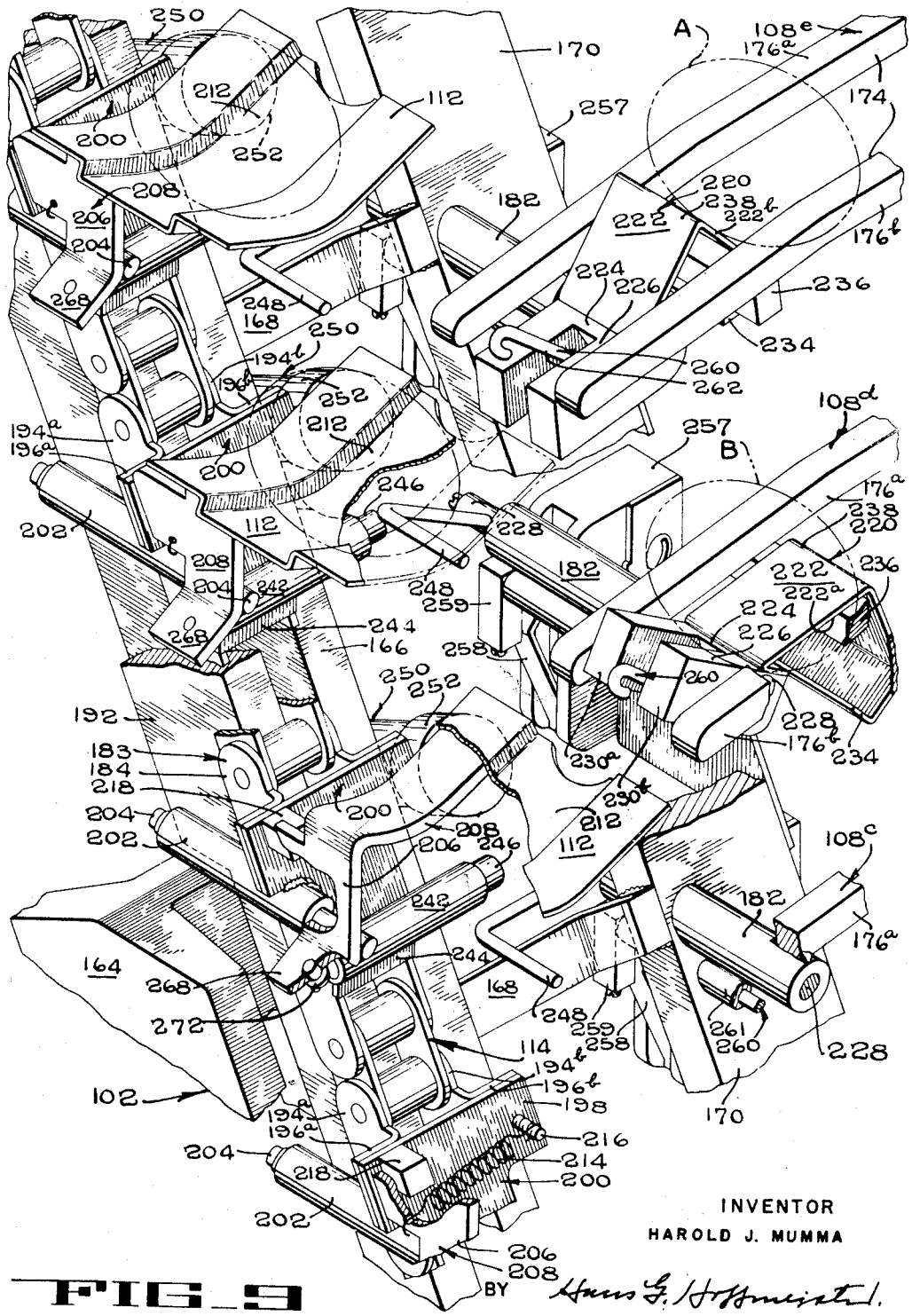

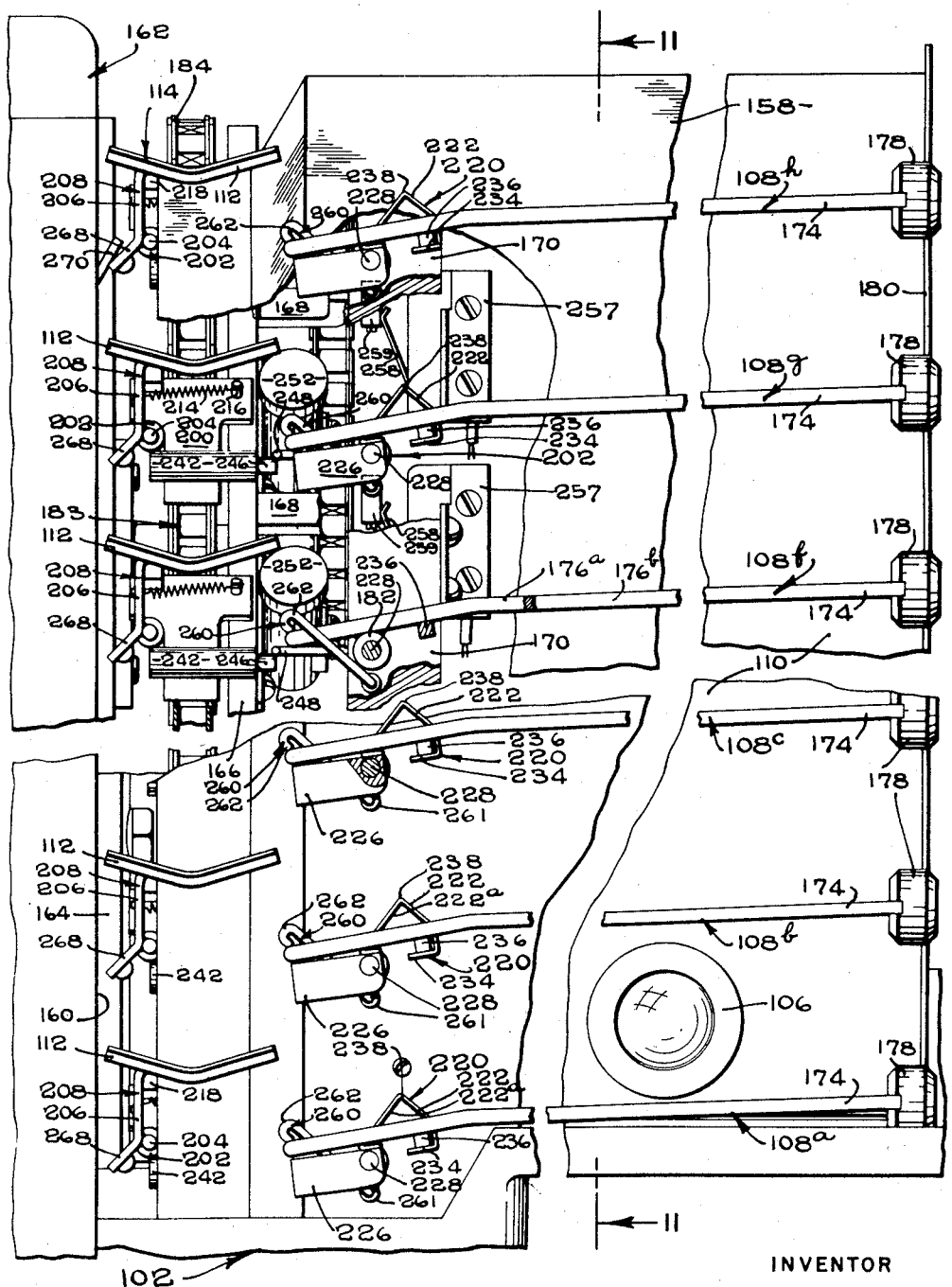
FIG_10

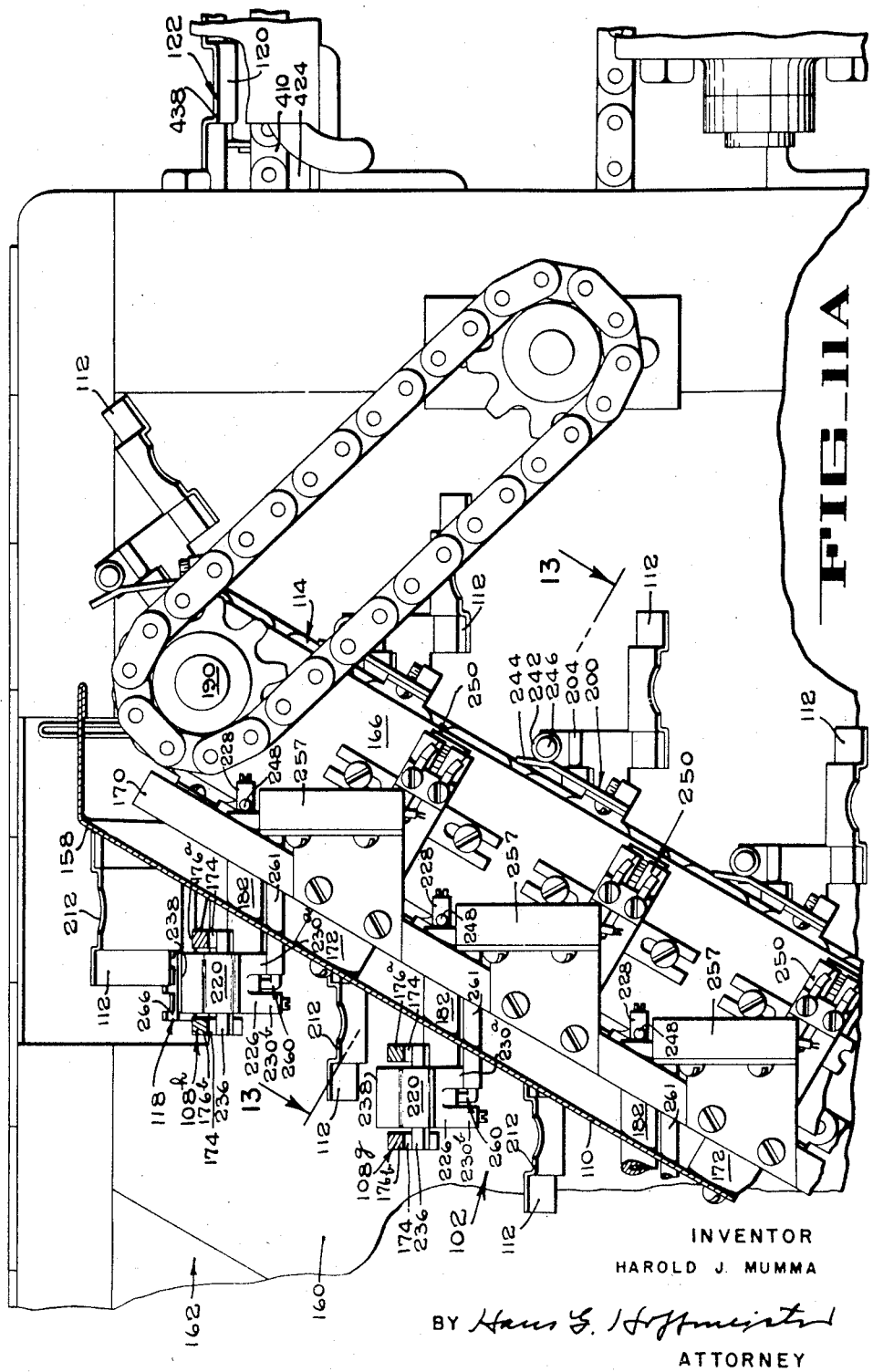

Oct. 27, 1959
H. J. MUMMA
2,910,288
MACHINE FOR HANDLING EGGS
Original Filed June 1, 1953
35 Sheets-Sheet 15
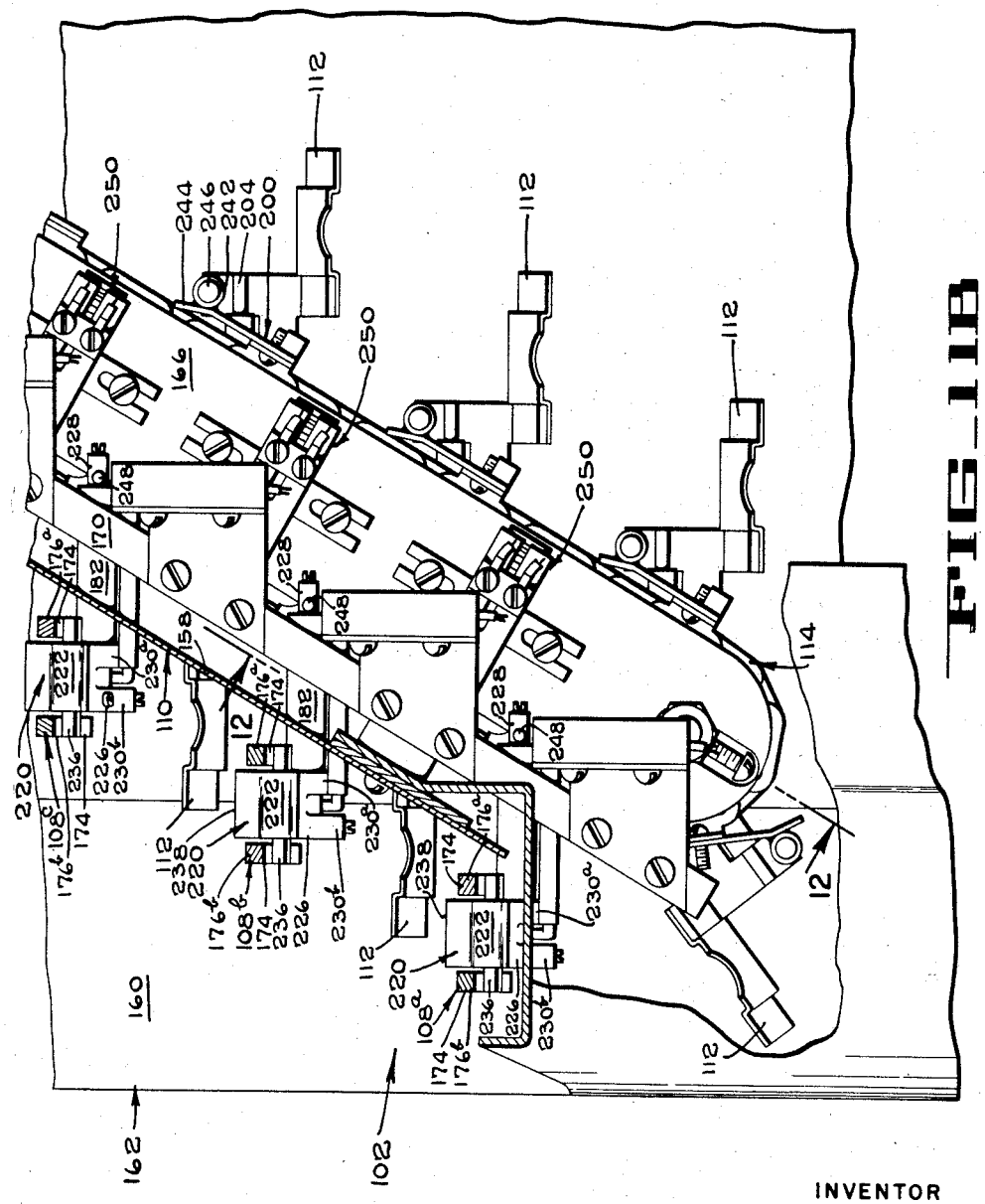
INVENTOR
HAROLD J. MUMMA
BY Hans G. Hoffmeister.
ATTORNEY Oct. 27, 1959

H. J. MUMMA 2,910,288

MACHINE FOR HANDLING EGGS

Original Filed June 1, 1953

INVENTOR
HAROLD J. MUMMA

BY *Hans G. Hoffmeister*

ATTORNEY

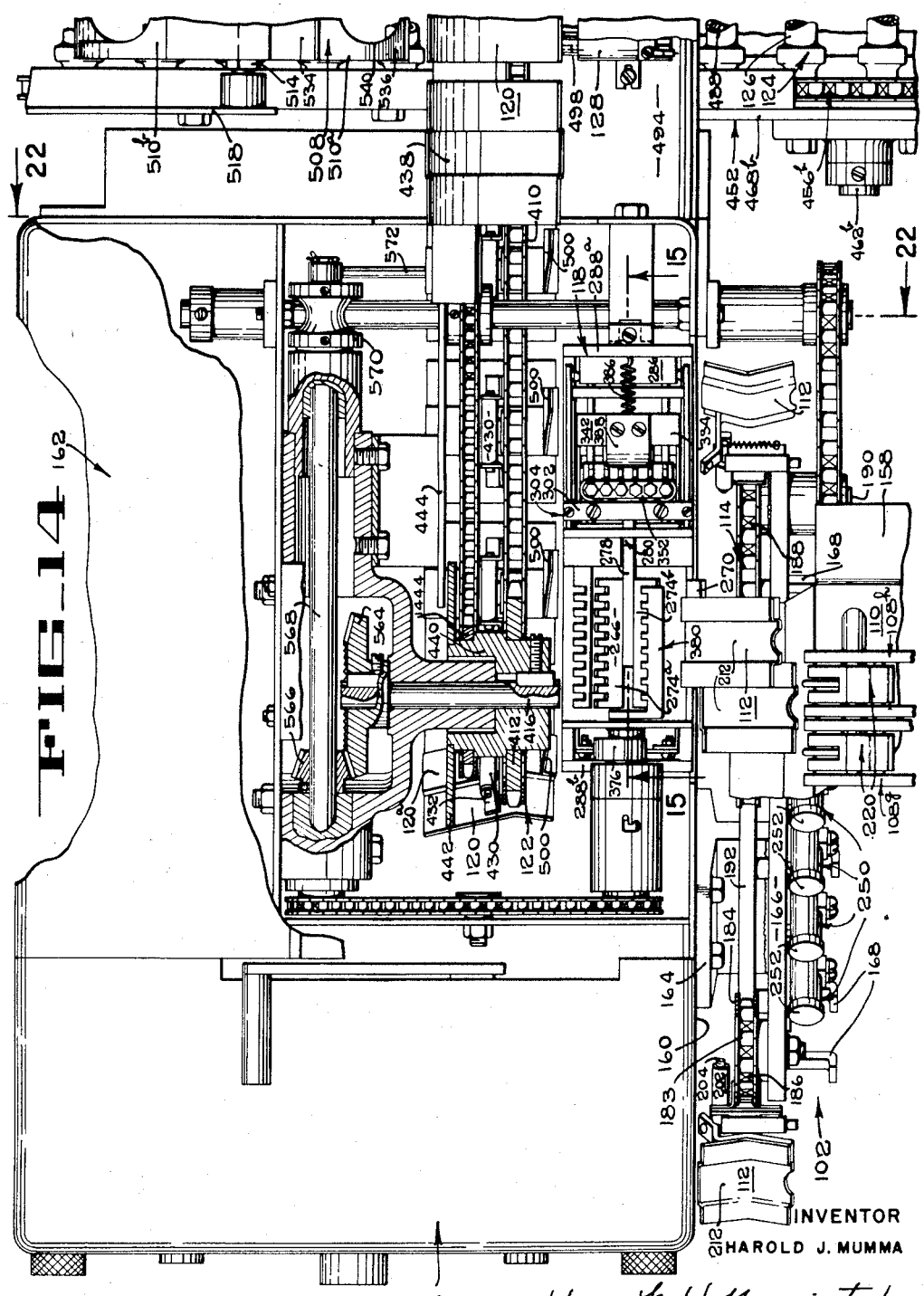

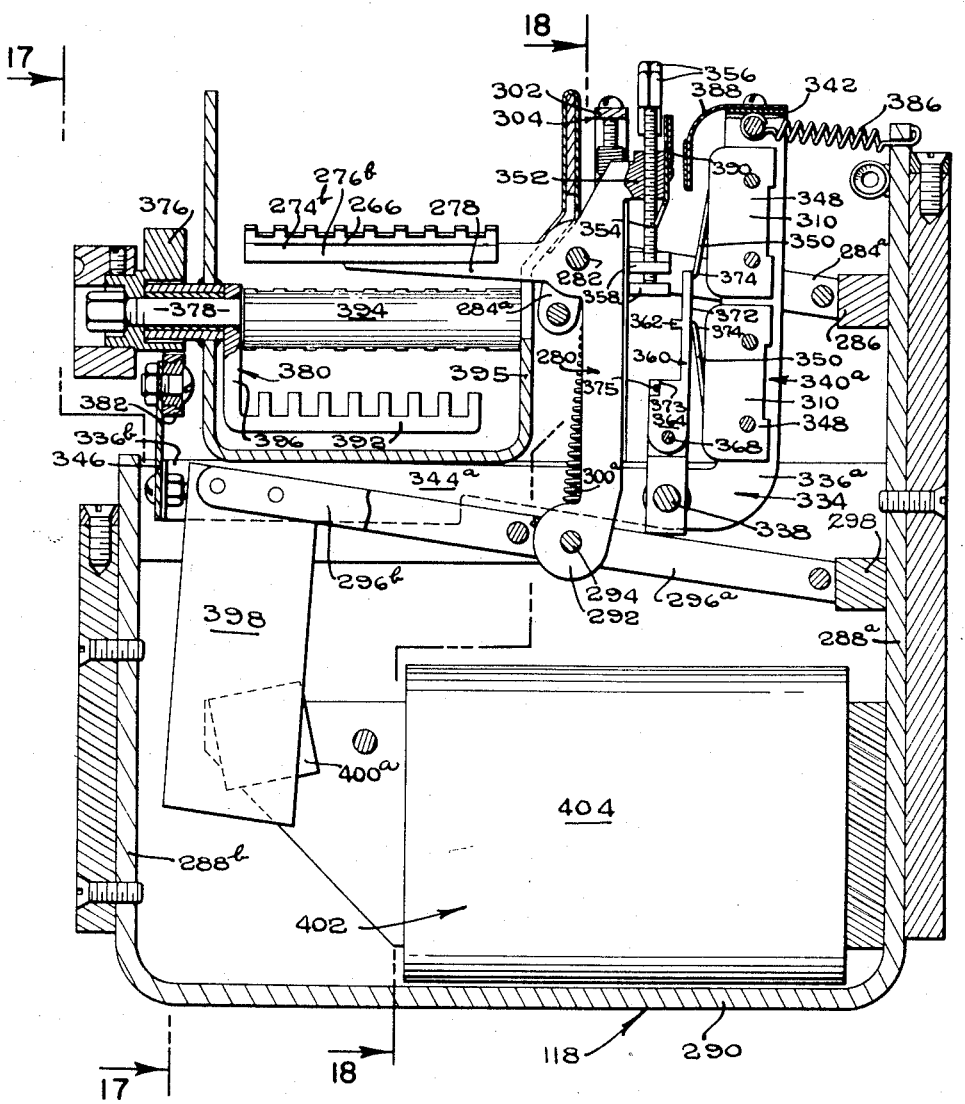

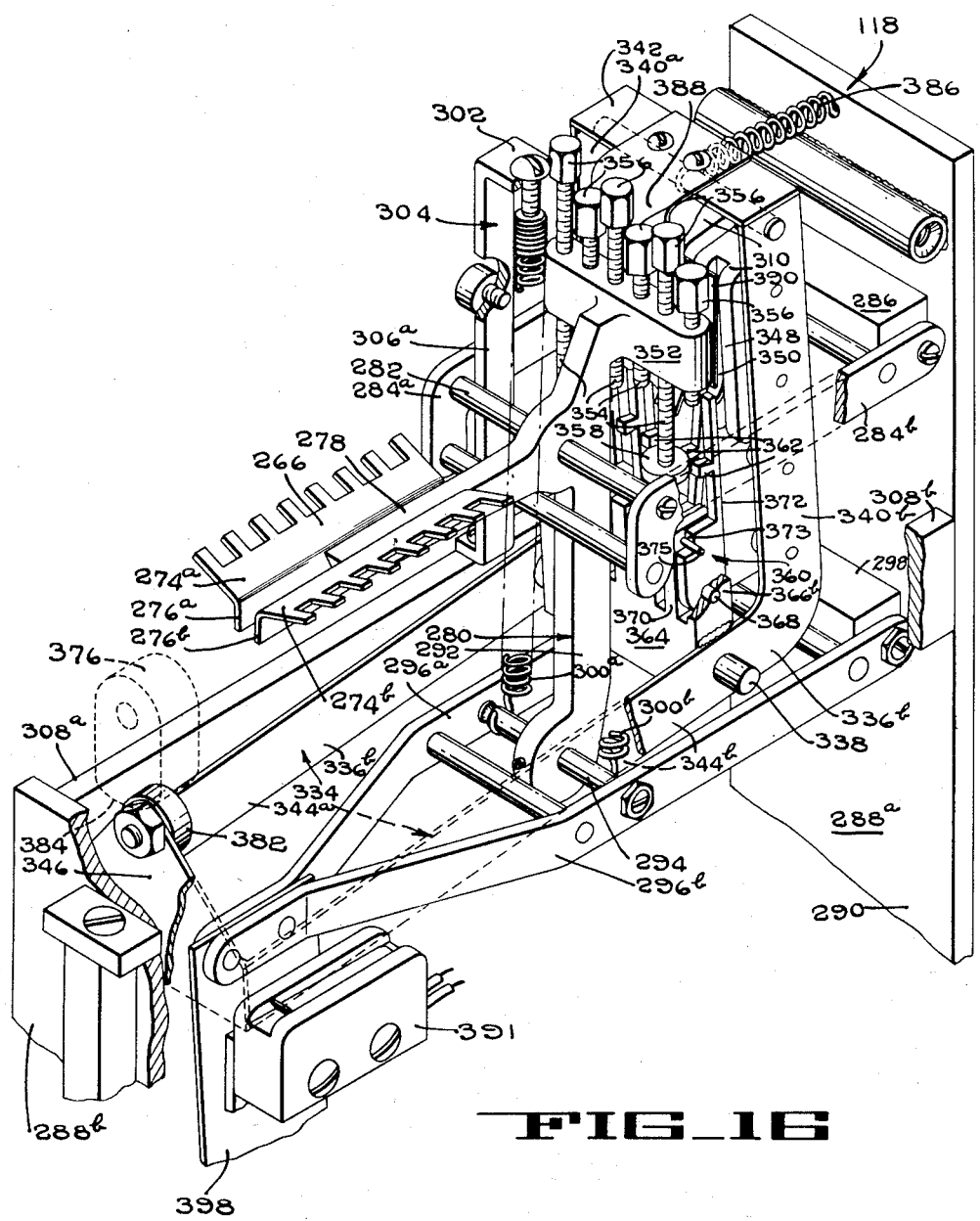
FIG_16

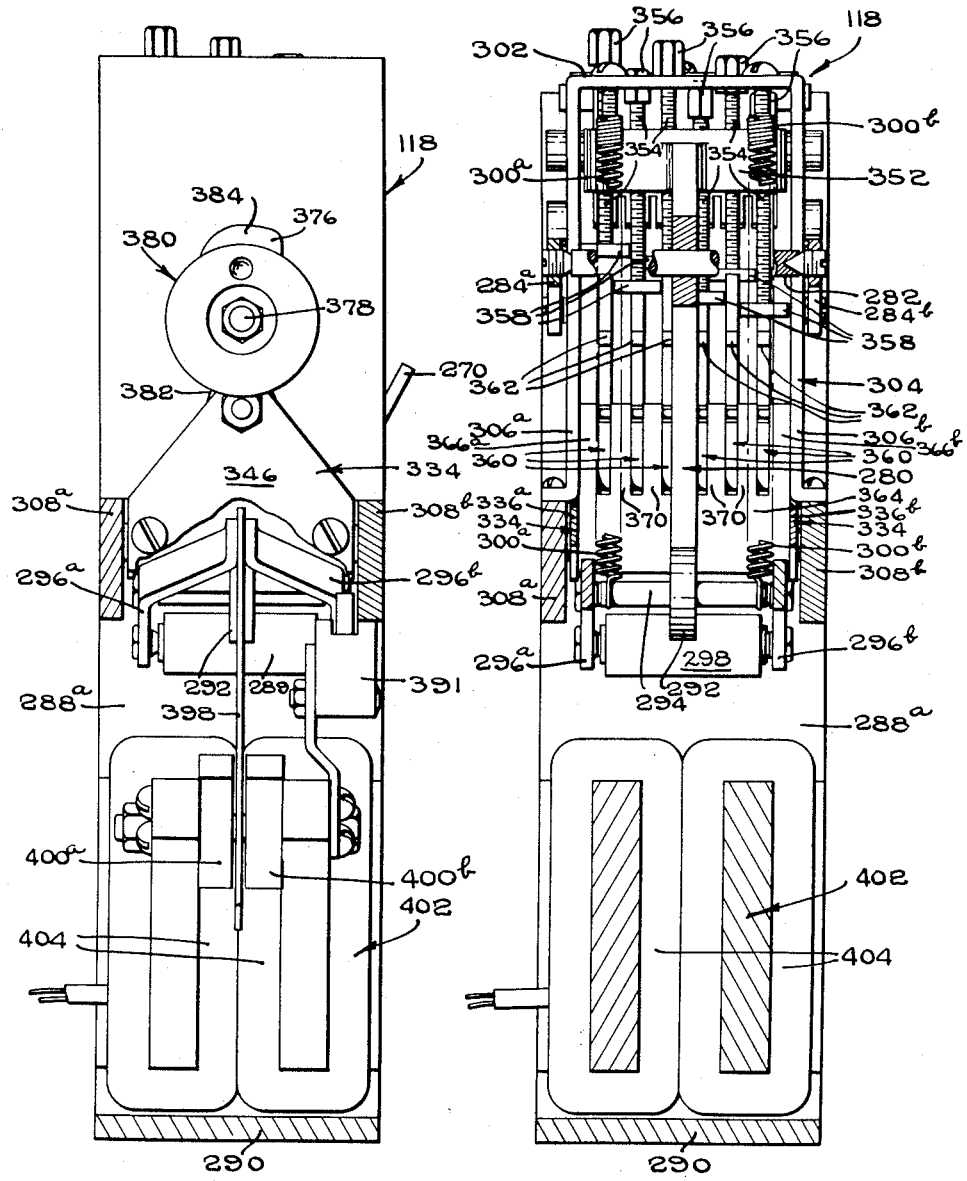

Oct. 27, 1959          H. J. MUMMA          2,910,288
MACHINE FOR HANDLING EGGS
Original Filed June 1, 1953          35 Sheets-Sheet 21
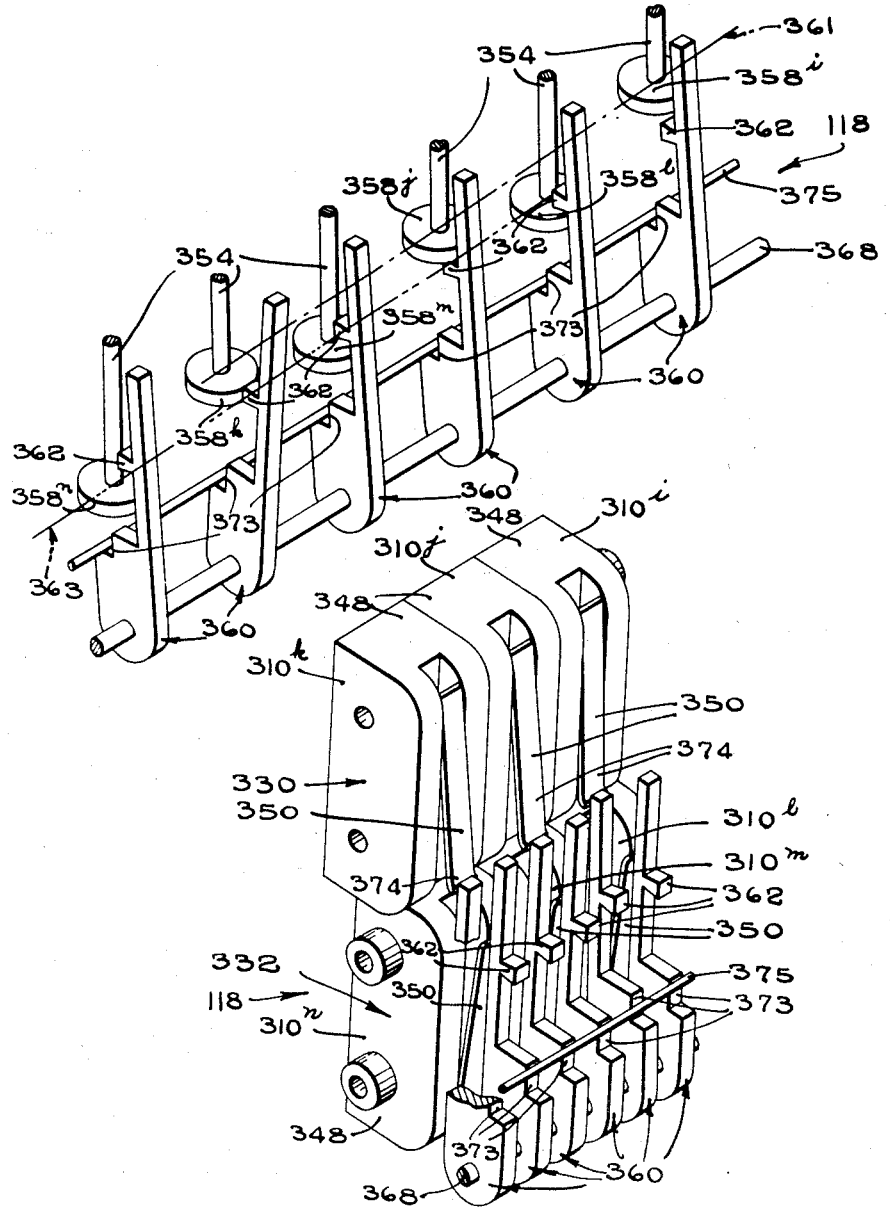
INVENTOR
HAROLD J. MUMMA
BY *Hans G. Hoffmeister*
ATTORNEY

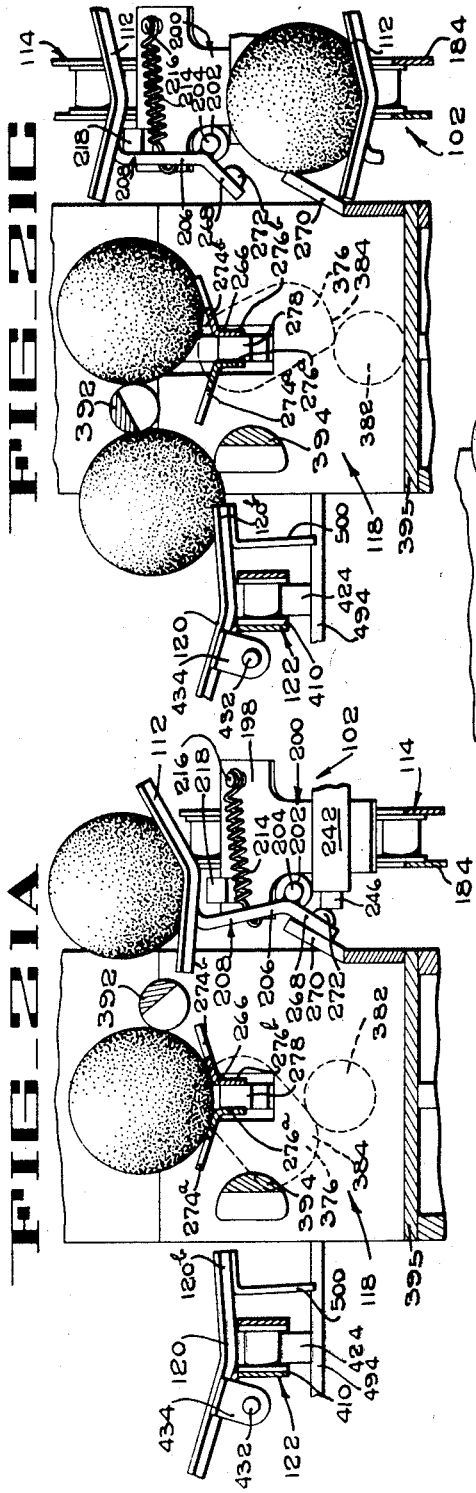
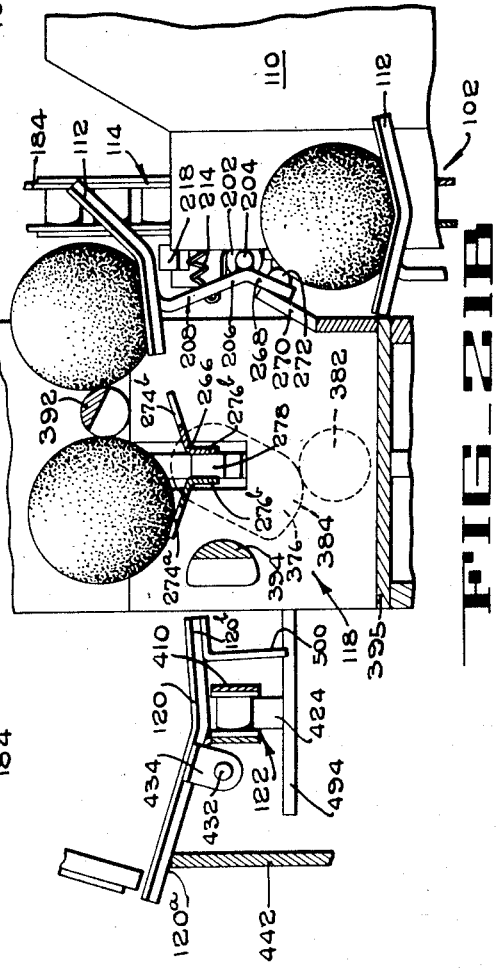

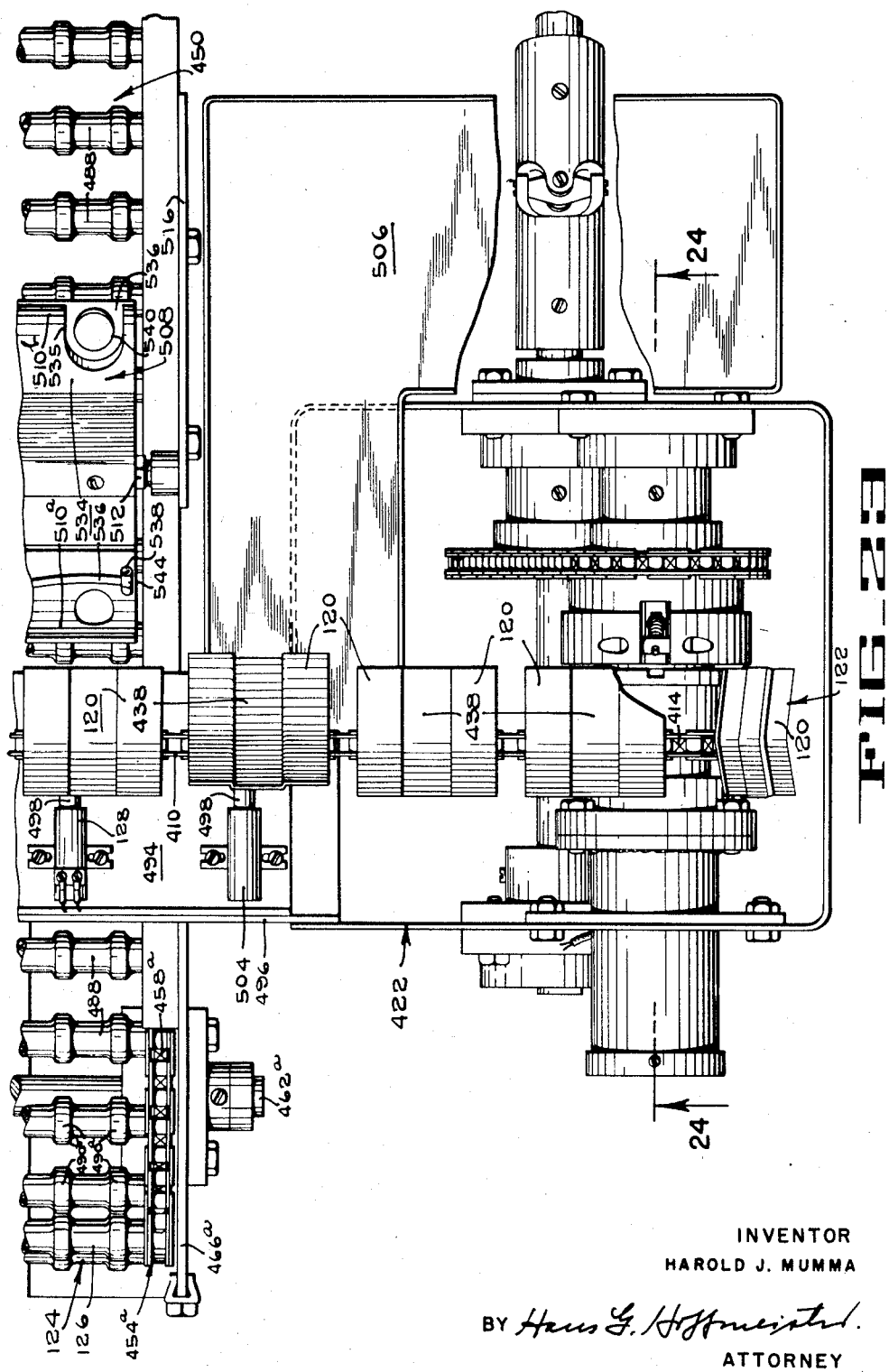

Oct. 27, 1959 H. J. MUMMA 2,910,288
MACHINE FOR HANDLING EGGS
Original Filed June 1, 1953 35 Sheets-Sheet 25
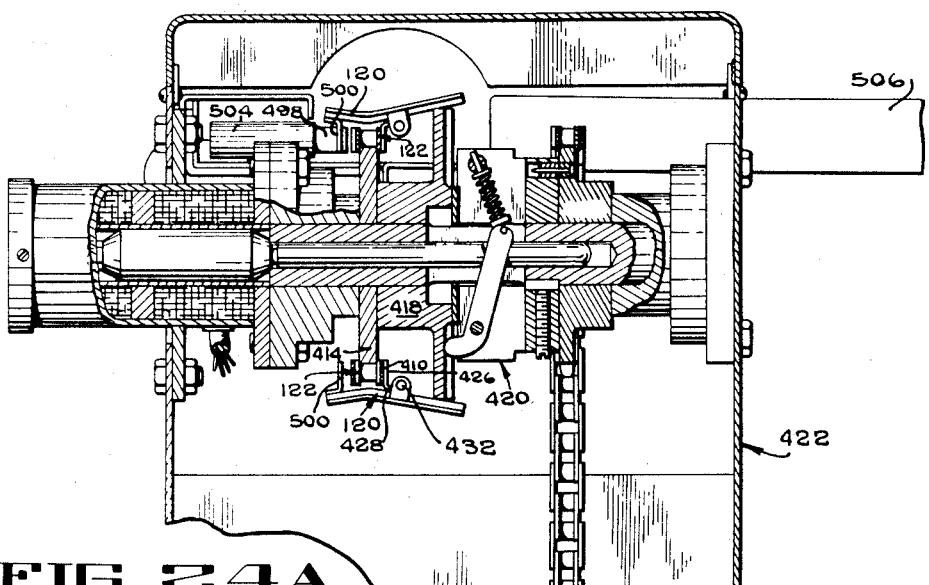
FIG_24
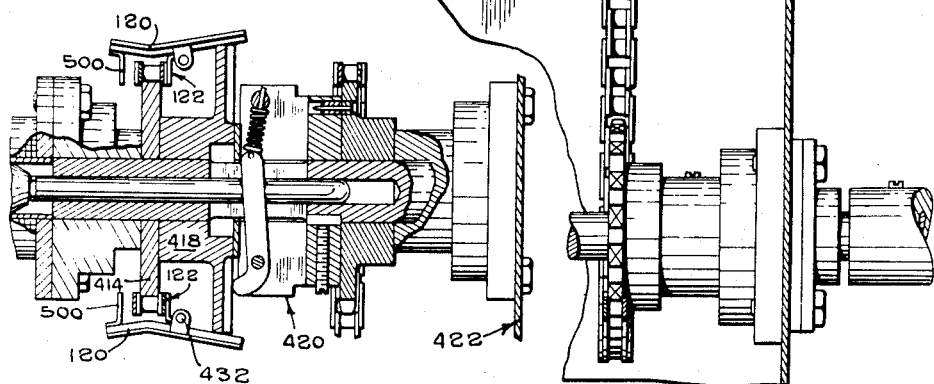
FIG_24A
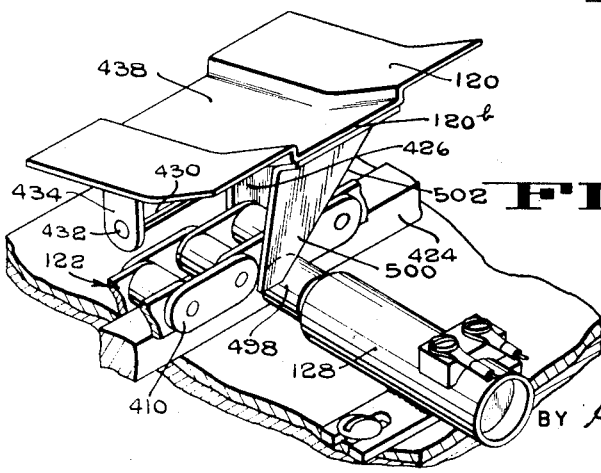
FIG_25
INVENTOR
HAROLD J. MUMMA
BY Hans G. Hoffmeister
ATTORNEY

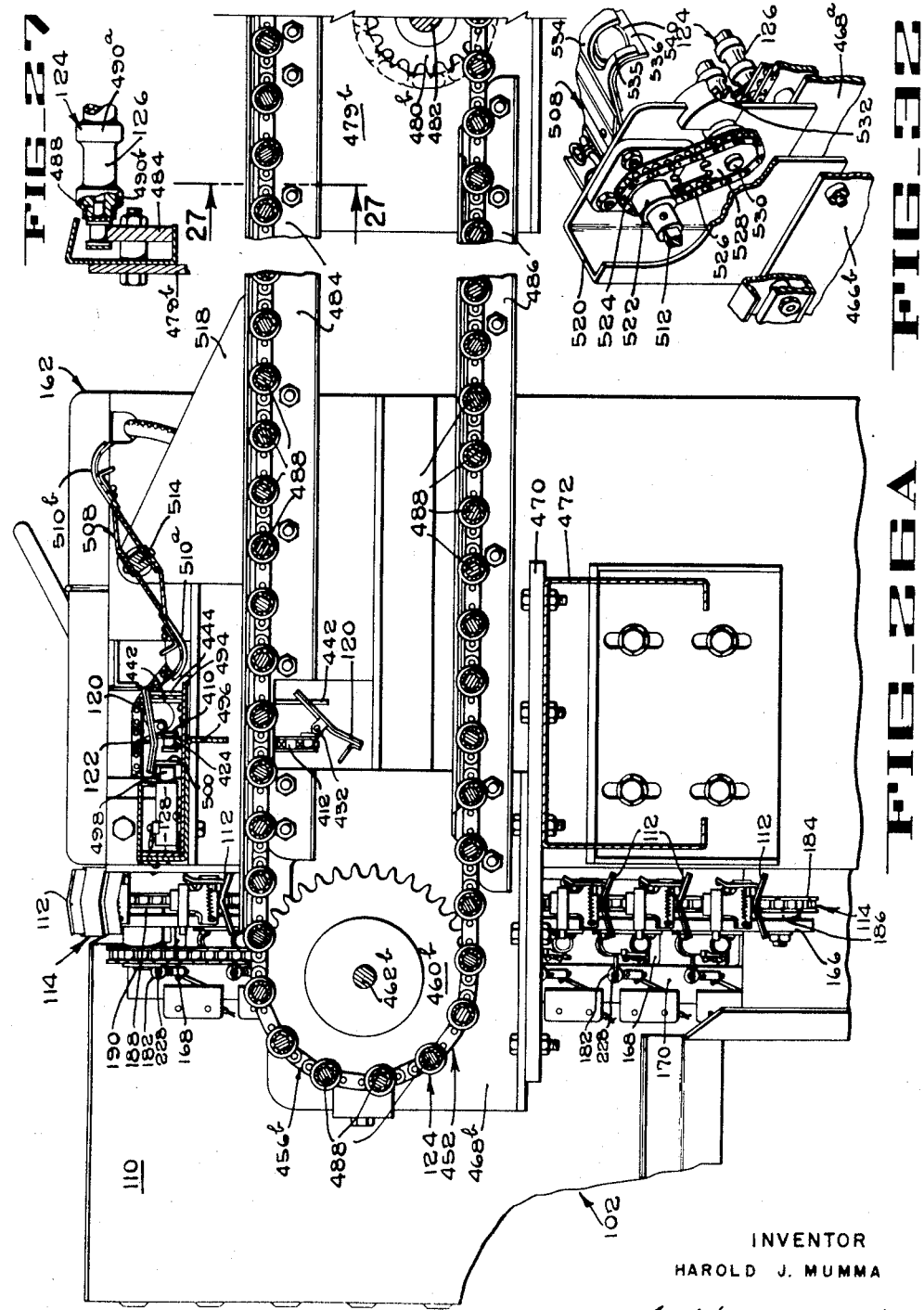

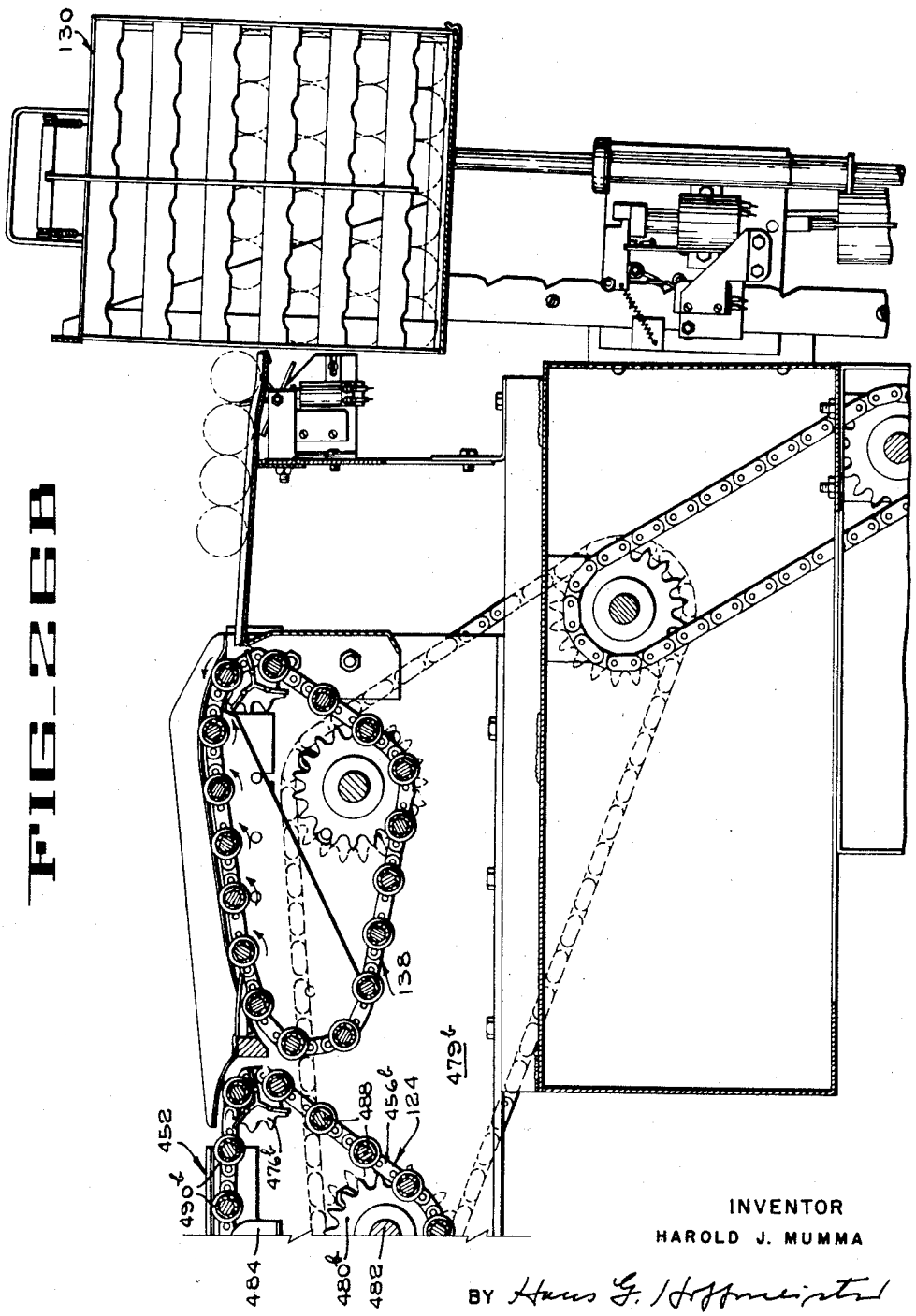

Oct. 27, 1959 H. J. MUMMA 2,910,288
MACHINE FOR HANDLING EGGS
Original Filed June 1, 1953 35 Sheets-Sheet 28
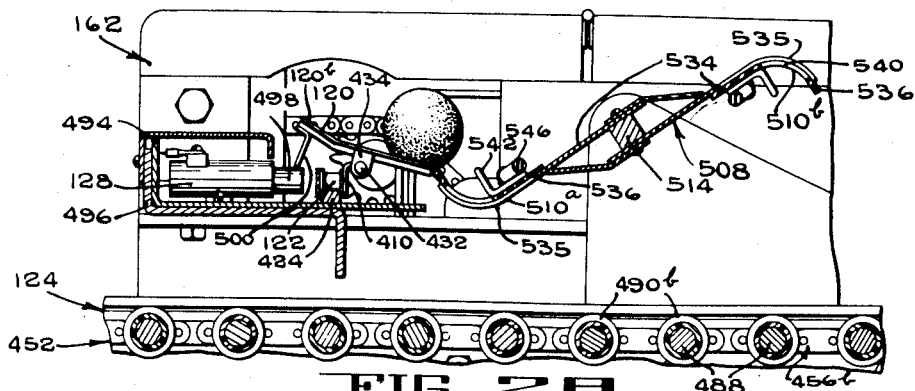
FIG_28
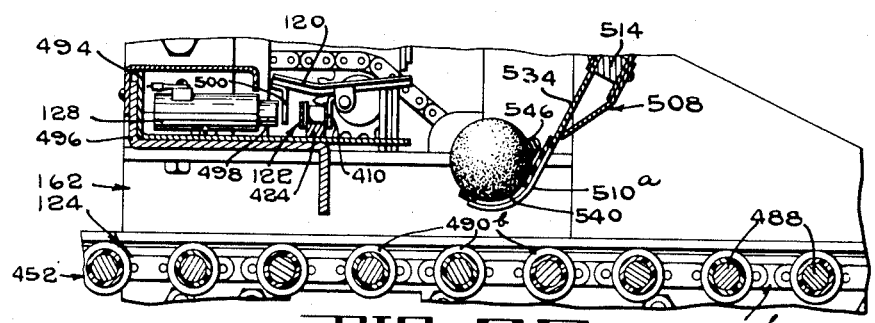
FIG_29
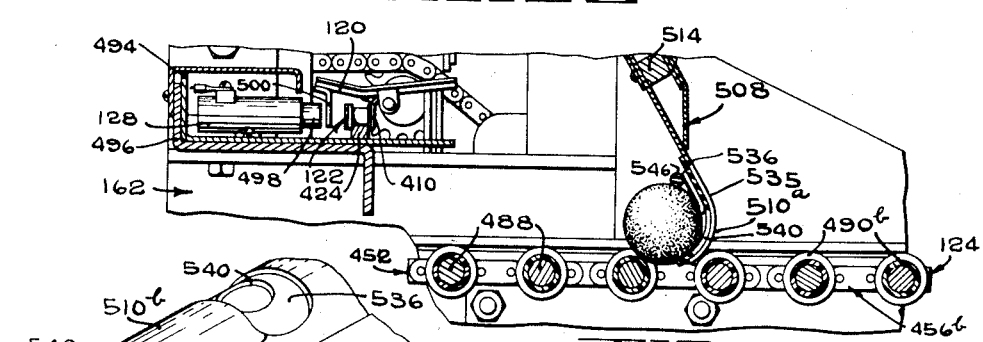
FIG_30
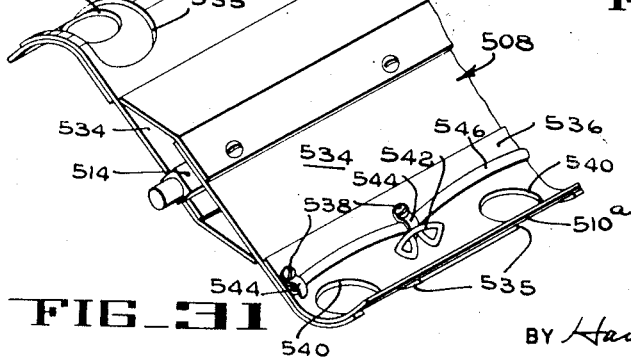
FIG_31
INVENTOR
HAROLD J. MUMMA
BY Hans G. Hoffmeister
ATTORNEY

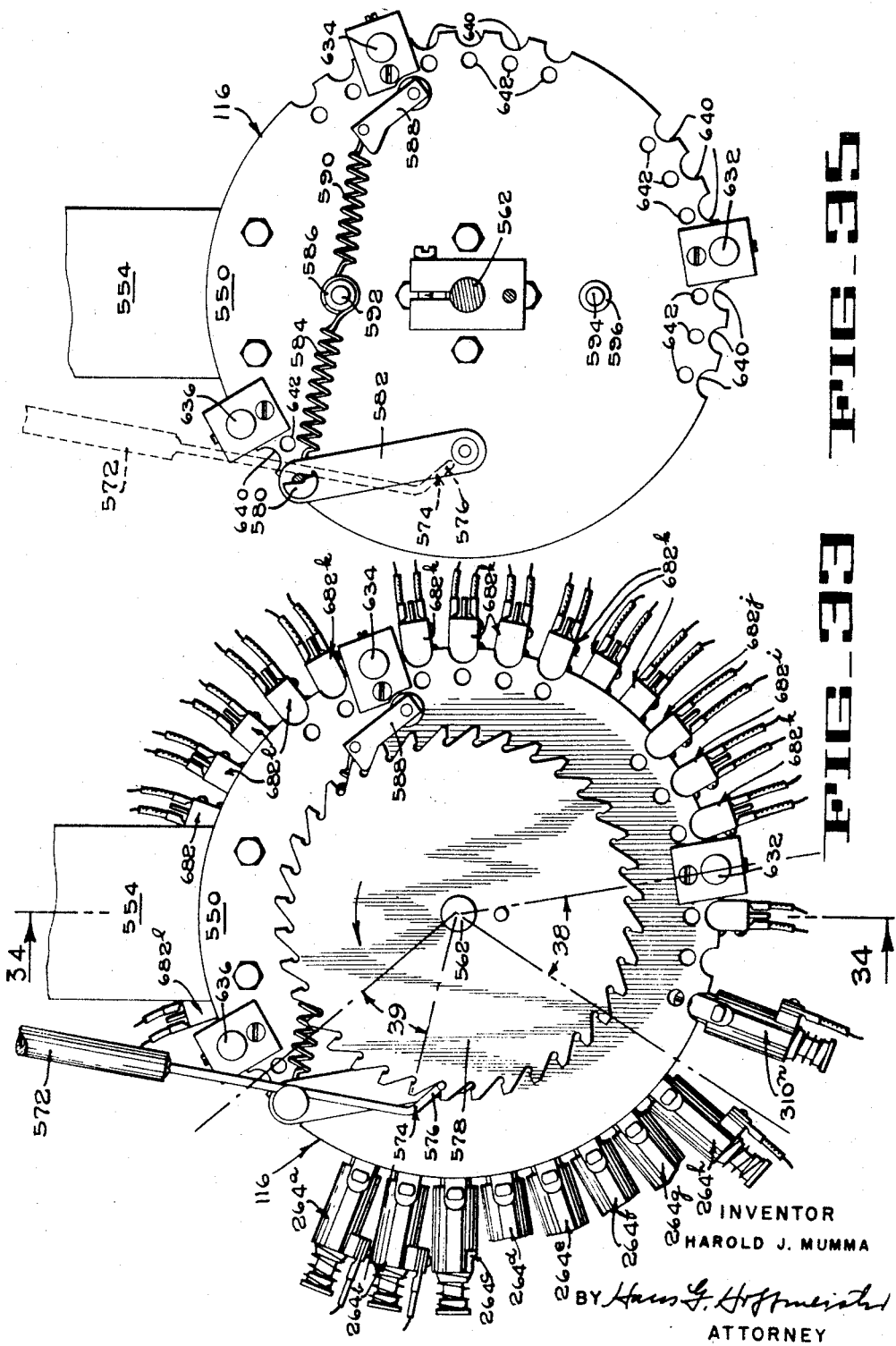

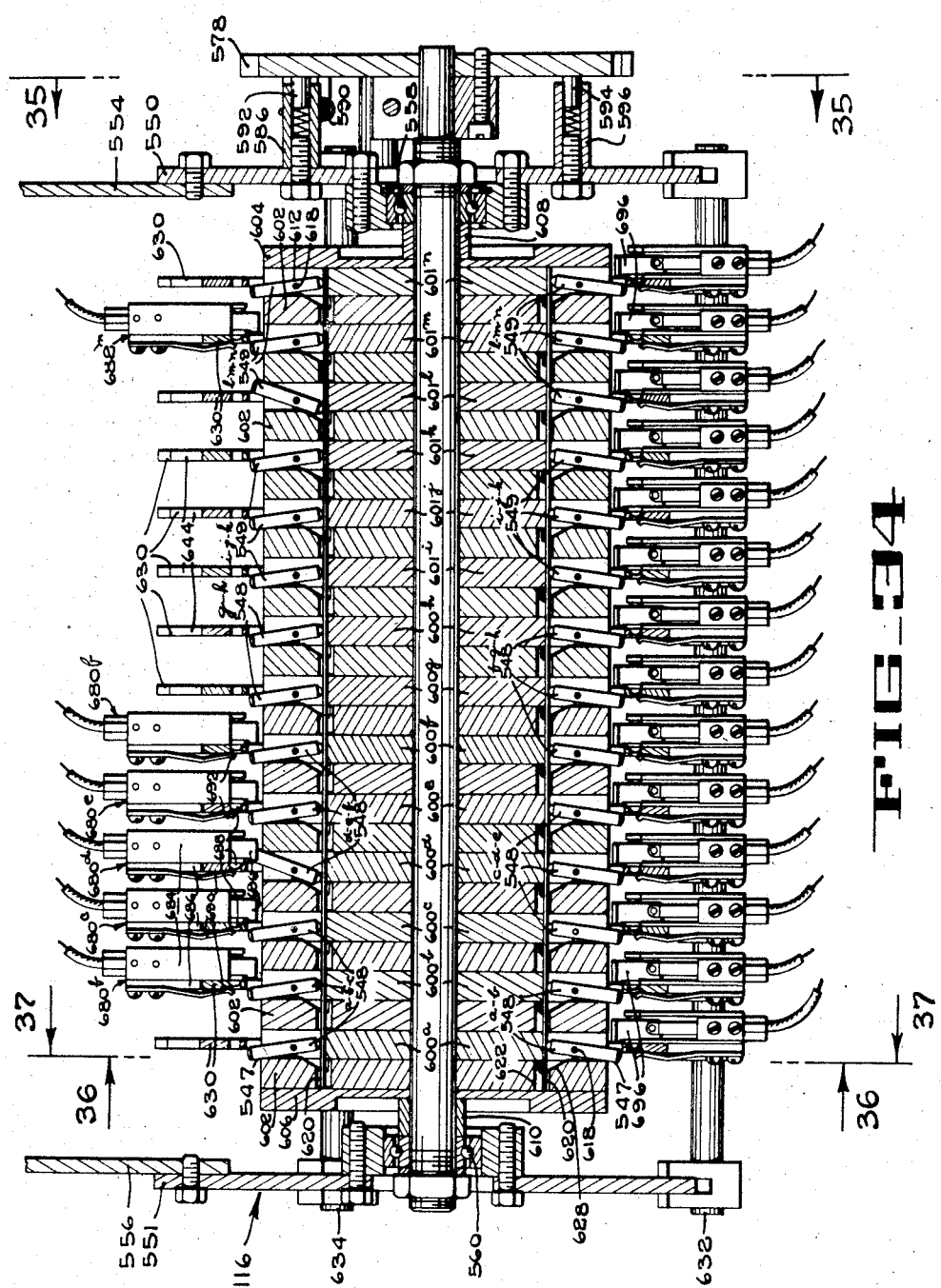

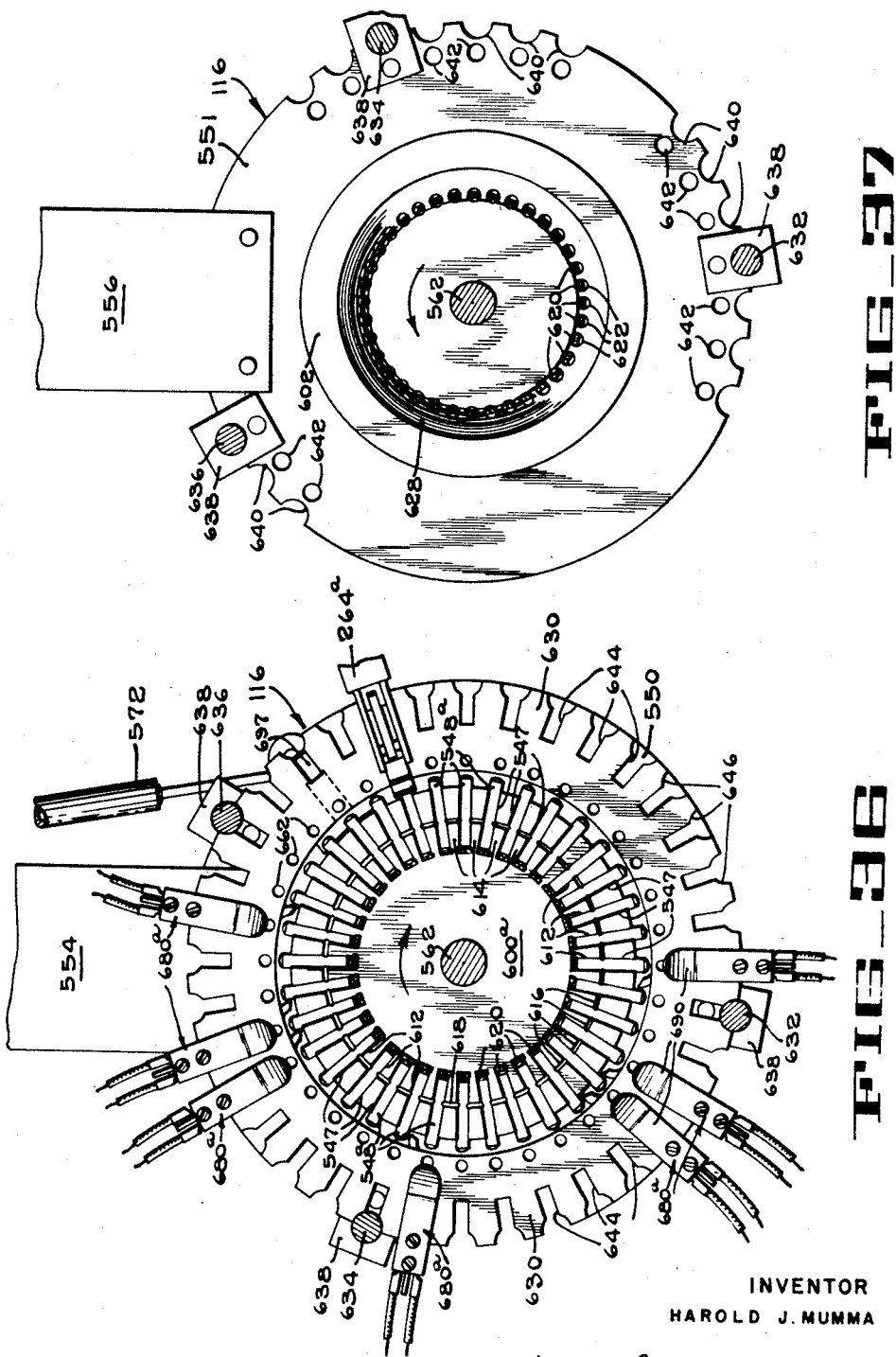

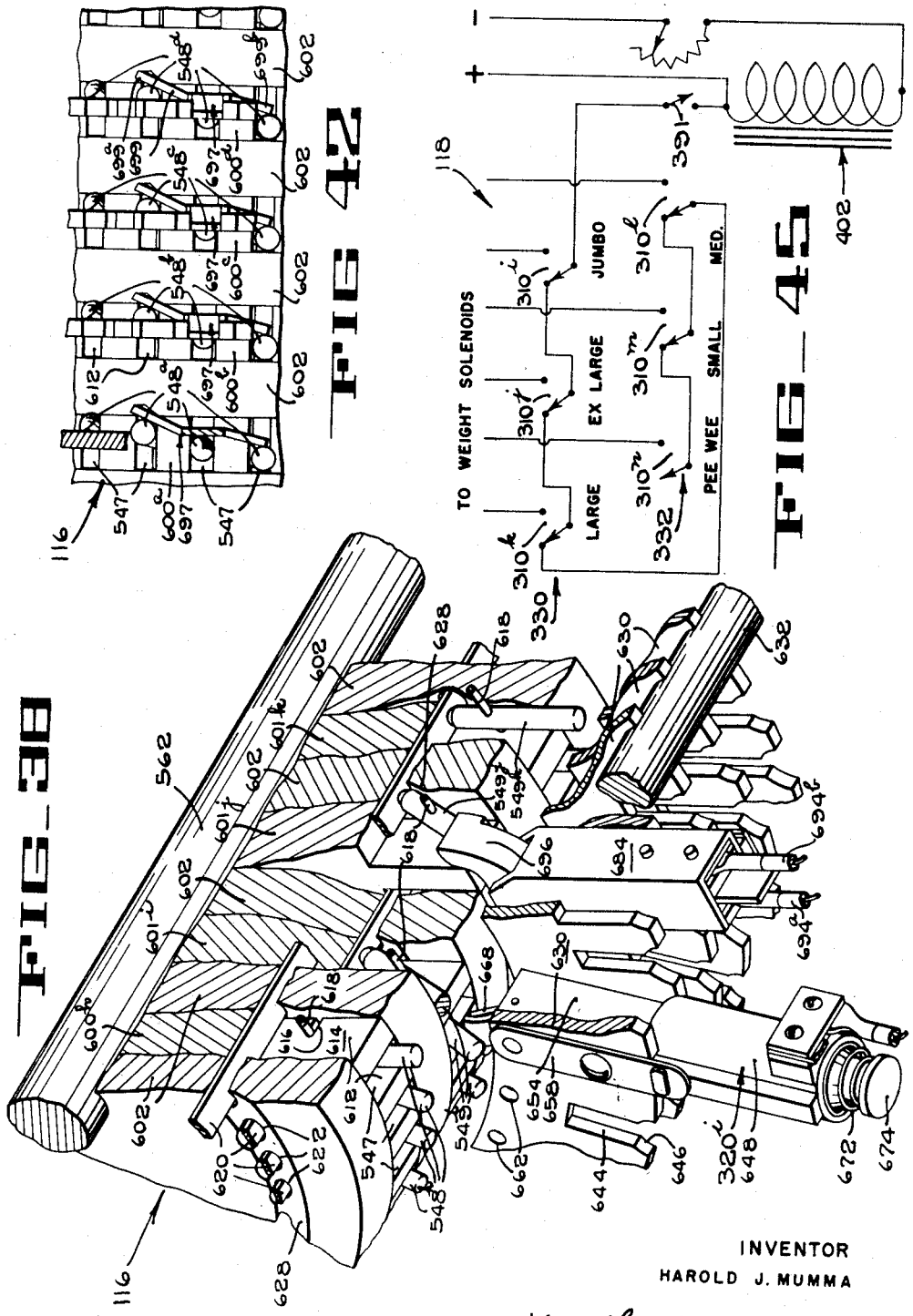

Oct. 27, 1959
H. J. MUMMA
2,910,288
MACHINE FOR HANDLING EGGS
Original Filed June 1, 1953
35 Sheets-Sheet 33
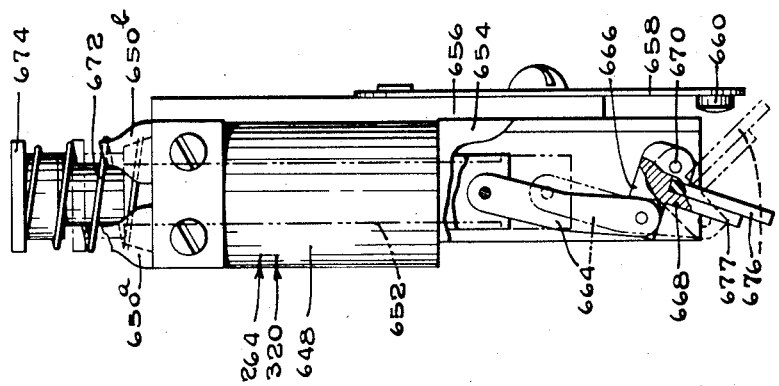
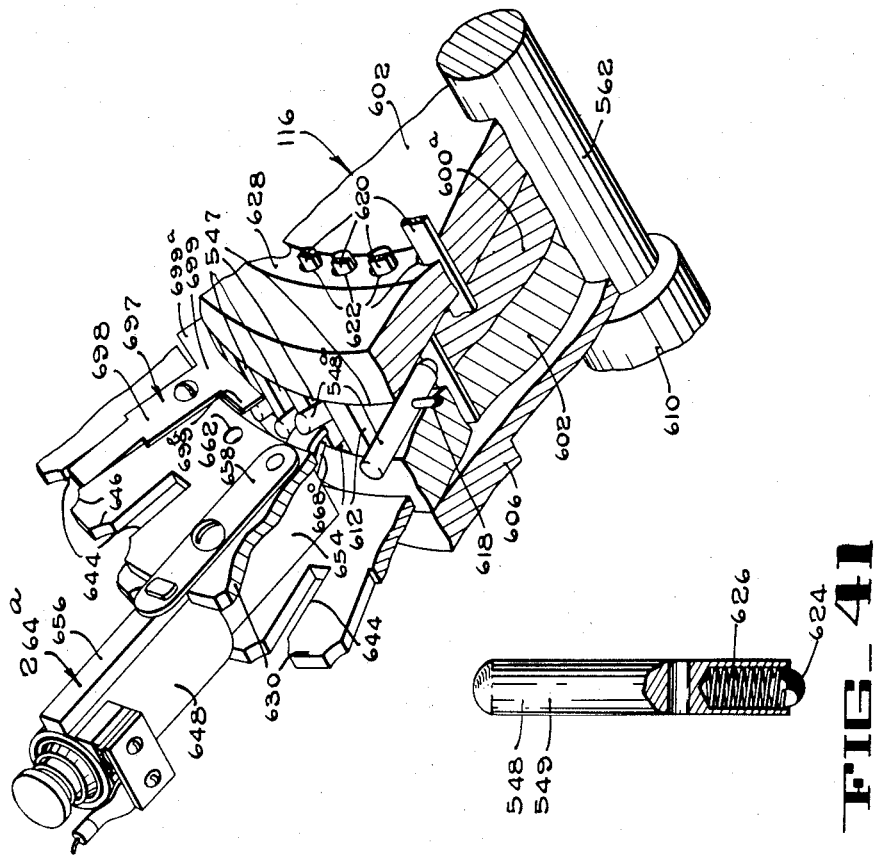
INVENTOR
HAROLD J. MUMMA
BY Hans G. Hoffmeister
ATTORNEY Oct. 27, 1959  H. J. MUMMA  2,910,288
MACHINE FOR HANDLING EGGS
Original Filed June 1, 1953  35 Sheets-Sheet 34

FIG_43

INVENTOR
HAROLD J. MUMMA
BY Hans G. Hoffmeister
ATTORNEY

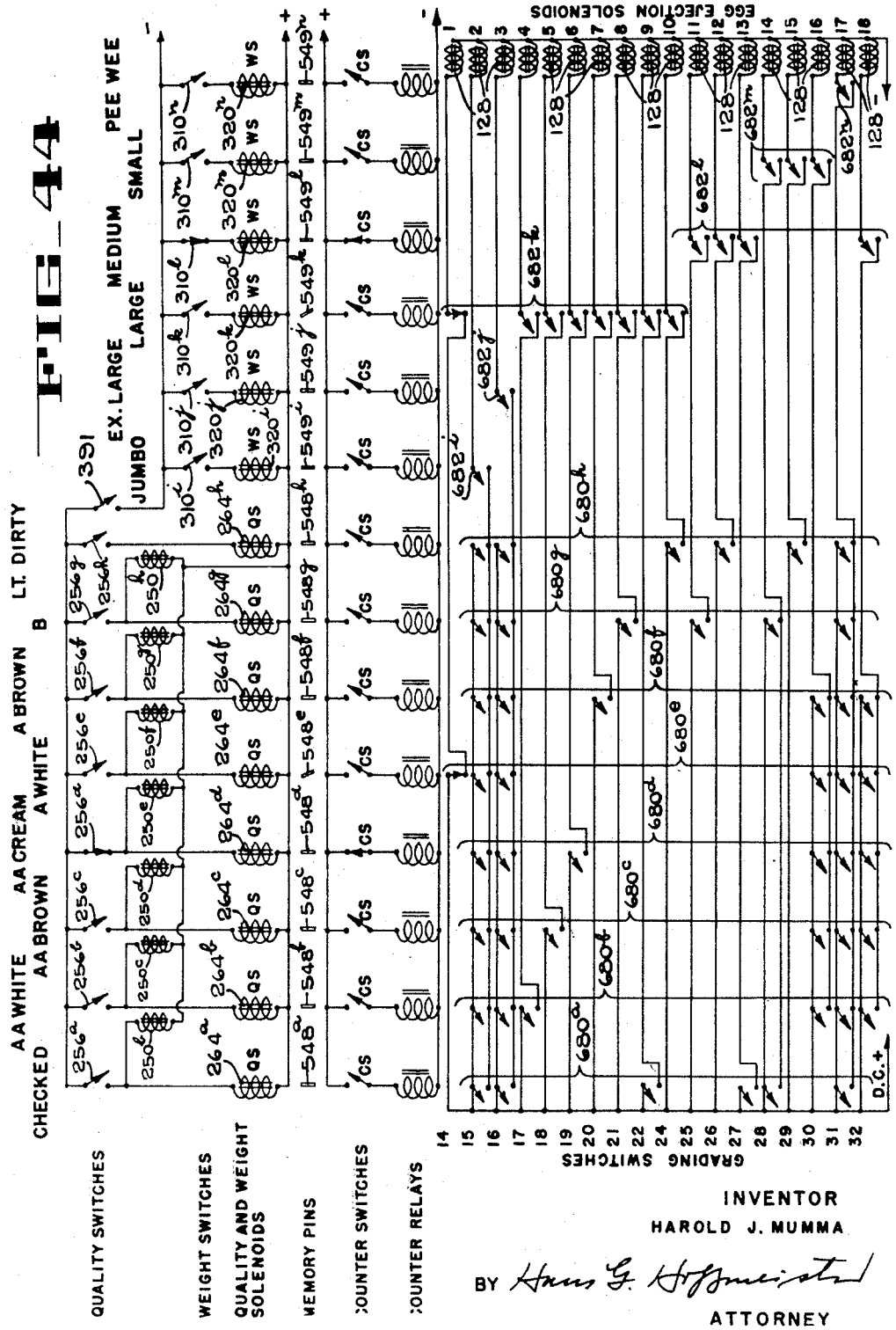

United States Patent Office 2,910,288
Patented Oct. 27, 1959

2,910,288
MACHINE FOR HANDLING EGGS

Harold J. Mumma, Riverside, Calif., assignor to Food Machinery and Chemical Corporation, San Jose, Calif., a corporation of Delaware Original application June 1, 1953, Serial No. 358,621. Divided and this application August 22, 1956, Serial No. 605,562

18 Claims. (Cl. 265—27)

The present invention relates to machines and apparatus for handling eggs. More particularly, the present invention relates to machines and apparatus that assist in segregating the eggs received from the producers into desired classification groups according to quality and weight and which pack, or facilitate the packing of eggs of the same classification into cartons or cases for shipment to distributors and consumers.

This application is a division of my copending application, U.S. Serial No. 358,621, filed June 1, 1953, for a Machine for Handling Eggs.

An object of the present invention is to provide a dependable and fast operating egg weighing machine.

Another object is to provide an apparatus which is operable to register the weight of each egg traveling along a predetermined path.

Another object is to provide an apparatus which is adapted to group eggs according to desired weight classifications.

These and other objects and advantages of the present invention will become apparent from the following description and drawings wherein:

Fig. 1 is a perspective of the total egg handling machine of the invention viewed from a point in front and to the right of the feed end thereof.

Fig. 2 is another perspective of the total egg handling machine viewed from a point in front and to the right of the egg discharge end thereof.

Figs. 3A, 3B, 3C, 3D are the four quarters of a plan view of the total machine.

Fig. 4 is a perspective of the machine viewed from the side opposite to the feed end thereof.

Fig. 5 is a fragmentary schematic perspective illustrating the various power trains by means of which the movable components of the machine are driven from a common source of rotary power.

Fig. 6 is an enlarged perspective of the feed end of the machine showing an inclined board having a plurality of superposed shelves or racks upon which the operator deposits the eggs according to their different qualities, and an elevator arranged to remove the eggs from said shelves to carry them to a weighing mechanism.

Fig. 7 is another perspective of the feed end of the machine viewed from a higher level than Fig. 6.

Fig. 8 is a perspective similar to Fig. 7 illustrating a directly succeeding phase in the operation of the mechanisms shown therein.

Fig. 9 is an enlarged fragmentary perspective of the quality racks and of the feed elevator with certain parts removed to expose structure underneath.

Fig. 10 is a fragmentary front elevation of quality racks and of the feed elevator with certain parts removed to expose structure underneath.

Figs. 11A and 11B are the upper and lower halves of a fragmentary vertical section through the quality racks taken along lines 11—11 of Fig. 1 and viewed in the direction of the arrows associated with said line.

Fig. 14 is a plan view of the feed end of the machine with parts removed or broken away to illustrate details of the feed elevator, a weighing mechanism, an egg distributing conveyor and of the drive mechanisms therefor.

Fig. 15 is a fragmentary vertical section taken along line 15—15 of Fig. 14 illustrating the egg weighing mechanism as viewed in the direction of the arrows associated with said line.

Fig. 16 is a fragmentary perspective of said egg weighing mechanism.

Figs. 17 and 18 are vertical sections through the egg weighing mechanism taken along lines 17—17 and 18—18, respectively, of Fig. 15, and viewed in the direction of the arrows associated with said lines.

Fig. 19 is a perspective of the switches and switch operating mechanism that are actuated by the weighing mechanism.

Fig. 20 is an exploded fragmentary perspective of the switch mechanisms illustrated in Fig. 19 viewed from a point opposite to the viewing point of Fig. 19 and showing the components of the weighing mechanism that engage said switch operating mechanisms.

Figs. 21A, 21B and 21C are detail views illustrating successive stages in the transfer of eggs from the feed elevator to the weighing mechanism and from the weighing mechanism to the egg distributing conveyor.

Figure 22:
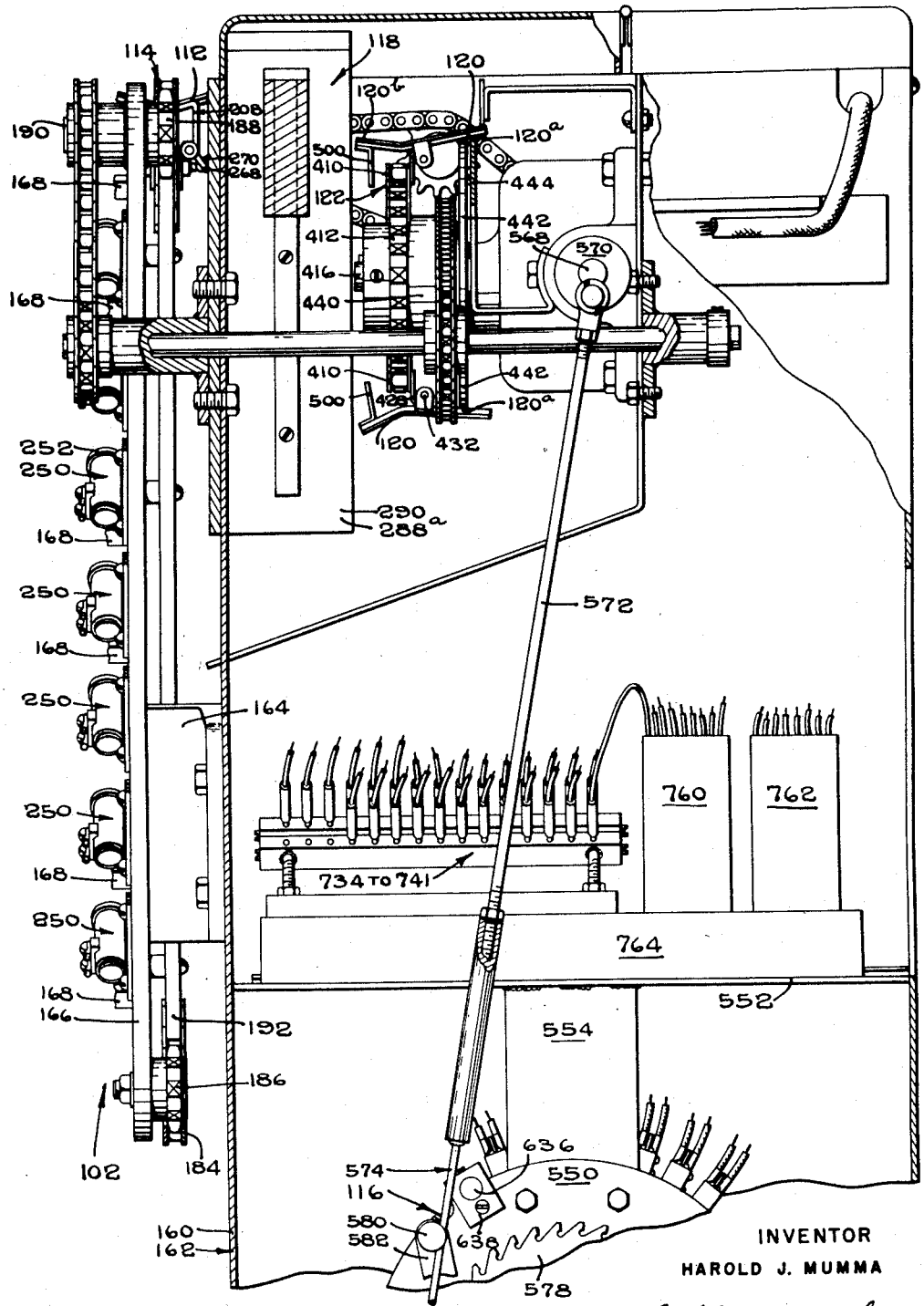

Fig. 22 is a fragmentary vertical section through the machine taken along line 22—22 of Fig. 14 and viewed in the direction of the arrows associated with said line.

Fig. 23 is a fragmentary plan view of the machine taken at the end of the distributing conveyor opposite to that illustrated in Fig. 14, with a top panel removed to expose structure underneath.

Fig. 24 is a fragmentary vertical section taken along line 24—24 of Fig. 23 and viewed in the direction of the arrows associated with said line.

Fig. 24A is a fragmentary vertical section similar to Fig. 24 illustrating a different operational position of the components shown therein.

Fig. 25 is a fragmentary perspective of the hereinbefore mentioned distributing conveyor showing one of the egg supporting cups mounted upon said conveyor.

Figs. 26A and 26B are the left and right halves of a fragmentary vertical section through the total machine taken along lines 26—26 of Figs. 3A and 3D and illustrating a multi-lane conveyor onto the different lanes of which the classified eggs are dropped from the aforementioned distributing conveyor according to their quality and weight and delivers them finally to an egg accumulating mechanism that facilitates packing of said eggs into cartons, boxes and the like.

Fig. 27 is a section taken along line 27—27 of Fig. 26A and illustrating details in the construction of the first of the conveyors shown in Figs. 26A and 26B, which will be termed the classification conveyor hereinafter.

Fig. 28 is an enlarged detail view of part of Fig. 26A illustrating mechanism for transferring an egg from one of the cups of the distributing conveyor to the classification conveyor.

Figs. 29 and 30 are fragmentary sectional detail views similar to Fig. 28 illustrating said egg transfer mechanism in two consecutive operational positions.

Fig. 31 is a fragmentary perspective of said egg transfer mechanism.

Fig. 32 is a fragmentary perspective illustrating the manner in which said egg transfer mechanism is driven from the classification conveyor.

Fig. 33 is a rear elevation of a device that will be termed the memory drum hereinafter and which registers the quality and the weight of the eggs, and controls the discharge of the eggs from the distributing conveyor onto the different lanes of the classification conveyor.

Fig. 34 is an axial section through the memory drum illustrated in Fig. 33 taken along line 34—34 and viewed in the direction of the arrows associated with said line.

Fig. 35 is a vertical cross section through the memory drum taken along line 35—35 of Fig. 34.

Fig. 36 is a vertical cross section through the memory drum taken along line 36—36 of Fig. 34.

Fig. 37 is yet another vertical cross section through the memory drum taken along line 37—37 of Fig. 34.

Figs. 38 and 39 are fragmentary perspectives of sectors of the memory drum marked out in broken lines at 38 and 39 in Fig. 33.

Fig. 40 is a detail view showing an elevation, partly in section, of one of the weight or quality registering solenoids that are associated with the memory drum.

Fig. 41 is another detail view illustrating an elevation, partly in section, of a component of the memory drum.

Fig. 42 is fragmentary plan view of the outer surface of the memory drum.

Fig. 43 is a diagram representing a development of the control structure surrounding the memory drum and illustrating the function of the various regions thereof.

Fig. 44 is a circuit diagram illustrating the manner in which the egg-quality recording and the egg-weight recording components of the memory drum are actuated and in turn control discharge of the eggs from the distributing conveyor onto the classification conveyor.

Fig. 45 is a circuit diagram illustrating the manner in which the egg weighing mechanism energizes solenoids that register the weight of the eggs in the memory drum.

Construction and operation of the machine

The egg handling machine of the invention (Figs. 1, 2 and 4) comprises a supply conveyor 100 which may have the form of a slightly inclined roller conveyor, whereupon cases or crates with eggs are delivered to the candling station 102. At the candling station, the operator takes the eggs from the cases or crates, checks them first for external appearance and places those that are deformed, excessively dirty or broken into the pockets of cardboard grids 103 on special trays 104 that are located at his right side. Those found to be of satisfactory external appearance, he views against a light beam emitted from a suitable electric torch 106 and places them according to their color and internal quality upon the proper racks or shelves 108 of a reclining grading board 110 that has eight such shelves or racks, 108a, 108b, 108c, 108d, 108e, 108f, 108g and 108h in superposed relation. From the racks or shelves 108 which are laterally inclined, the eggs slide onto the cups 112 of a single file elevator 114 while actuating electric mechanisms that register the quality of every egg according to the rack or shelf from which it is supplied to the conveyor on a rotary memory device 116 (Fig. 5), that moves in synchronism with the elevator 114 and which possesses quality recording members corresponding to every one of the cups 112 that pass by and may receive an egg from, the racks or shelves of the grading board 110. The elevator 114 lifts the eggs successively to the level of, and delivers them into a weighing mechanism 118 which weighs each egg and registers its weight by electrical impulses on the memory device 116 with the aid of weight recording members thereof that are aligned with the previously mentioned quality recording members. From the weighing mechanism 118 the eggs are transferred onto cups 120 carried by the elongated horizontal run of a single file conveyor 122 which passes at right angles over another conveyor 124 that comprises as many parallel lanes 126 as there are different quality/weight classification groups provided for in the machine. The cups 120 on the horizontal run of the single file conveyor 122 advance in synchronism with both the feed elevator 114 and the memory device 116, hence, as an egg passes from the aforementioned feed elevator 114 onto the weighing mechanism 118 and from there onto a cup 120 of the single file conveyor 122, the cup 120 on the latter conveyor that receives the particular egg steps into the synchronous relation with the quality and weight recording members of the memory device 116 which, up to this point, was held by the elevator cup 112 that passed the egg to the weighing mechanism.

Above each classification lane 126 of the multi-lane conveyor 124 mechanism is provided in the form of solenoids 128 (Figs. 3B and 3D) that are operable to tip the cups 120 of the single file conveyor 122 as they pass above said classification lanes so as to deliver the eggs from said cups into selected ones of said classification lanes. Energization of each of said solenoids 128 (Figs. 3B and 3D) is arranged to require the simultaneous closure of at least two series-connected normally open switches whose position may be adjustable relative to the hereinbefore mentioned memory device and which may be closed depending upon their position by selected ones of the hereinbefore mentioned quality and weight recording members of said device whenever a cup carrying an egg of the selected quality and weight combination passes over a particular preselected lane 126 of the classification conveyor 124. Thus as the single file conveyor 122 carries the eggs over the various parallel lanes 126 of the classification conveyor 124, it distributes said eggs under control of the memory device into the proper classification lanes of said conveyor 124 so that each of said lanes will receive only eggs of predetermined quality and weight combinations.

The classification conveyor 124 may be arranged to feed the segregated eggs to egg accumulators 130 which are provided at the end of each classification lane and which operate to arrange the eggs in superposed tiers or rows. Alternatively, the classification lanes of transverse conveyor 124 may be arranged to feed the eggs into an automatic carton filling mechanism 132 and the automatically filled cartons are then delivered onto the upper run of a take-off conveyor 134 extending along the discharge end of the classification lanes 126 as best shown in Fig. 2.

Quality grading board and feed elevator for the weighing mechanism

The operator receives open crates of eggs as supplied from the producer on a platform 150 at the lower end of the previously mentioned inclined roller conveyor 100 as shown in Fig. 1. In taking the eggs out of the crates, he immediately rejects excessively soiled or broken eggs by transferring them into one of the cardboard grids 103 on the hereinbefore mentioned trays 104. Said trays 104 are preferably inclined toward the operator and may be pivotally mounted in superposed relation upon a series of inclined base plates 154 that project in candelabrum fashion from a reclining support post 156 which rises from the platform 150 at the right side of the conveyor 100.

The hereinbefore mentioned grading board 110 is preferably mounted directed above the end of the roller conveyor 100 a distance only slightly larger than the depth of the egg crates so that a crate delivered from the conveyor onto the platform may position itself with its open end directly below and in front of the grading board 110 (Fig. 6).

Figure 13:
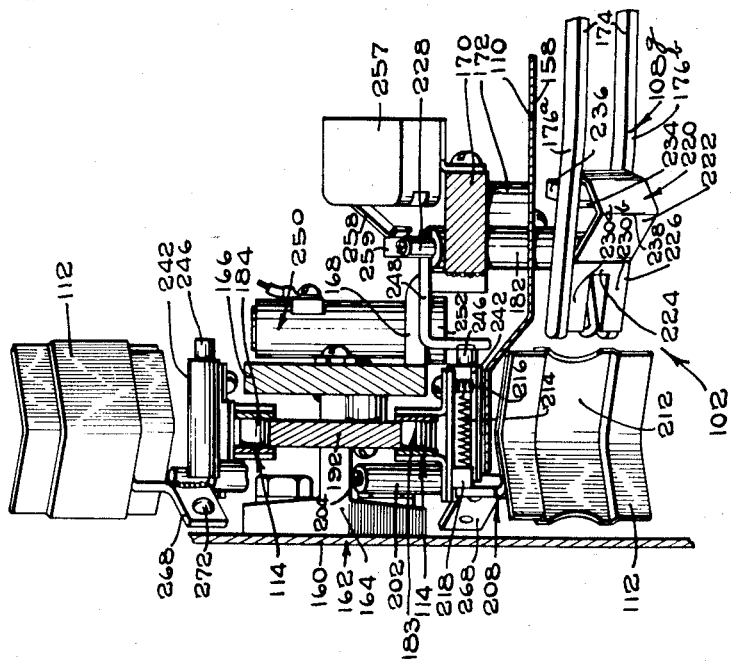
Fig. 13 is another section taken along lines 13—13 of Fig. 11A and viewed in the direction of the arrows associated with said line.

The grading board may comprise a reclined base plate 158 which may suitably be supported from the adjacent side wall 160 of a cabinet 162 that encases the hereinbefore mentioned weighing mechanism 118 and the memory drum 116. For this purpose, said side wall 160 carries a bracket member 164 which supports a reclining bar 166 (Figs. 9 and 13), and supported from said reclining bar by suitable angle members 168 is another reclining bar 170 to which base plate 158 is bolted with suitable spacer bushings 172 maintaining said plate a limited distance in front of the reclining bar 170 as best shown in Figs. 11A and 11B. Disposed in front of the base plate 158 are the eight superposed racks 108 which decline toward the left edge of said plate as previously pointed out. All of said racks are formed by bars 174 of hairpin shape having spaced parallel legs 176a and 176b of preferably rectangular cross section. At the juncture of said legs, the bars 174 are mounted in circular blocks 178 that are seated upon the edge of a flange 180 which is formed by the upwardly turned right edge of the base plate 158 (Fig. 10). The free left ends of bars 174 are slightly bent downwards to increase the downward gradient of the slanting legs 176a and 176b at their inner ends, and the downwardly bent left ends of the inner legs 176a of said bars rest upon tubular arms 182 that are mounted in and project outwardly from the reclining bar 170 through the base plate 158, as best shown in Figs. 9, 11A and 11B.

Upon viewing the eggs against the hereinbefore mentioned torch 106, which is mounted in and projects forwardly from the base plate 158 between the two lowermost racks (Figs. 6 and 10), the operator rejects those eggs found to be too old or containing internal impurities, transferring them onto one or the other of the hereinbefore described trays 104. Those found acceptable he places upon appropriate one of the above described eight racks 108 according to their quality. Thus, he may place the eggs graded as "Light Dirty" upon the top rack 108h, those graded as B upon the second rack 108g counted from the top, etc., with the bottom rack 108a receiving those classed as "Checked."

Figure 12:
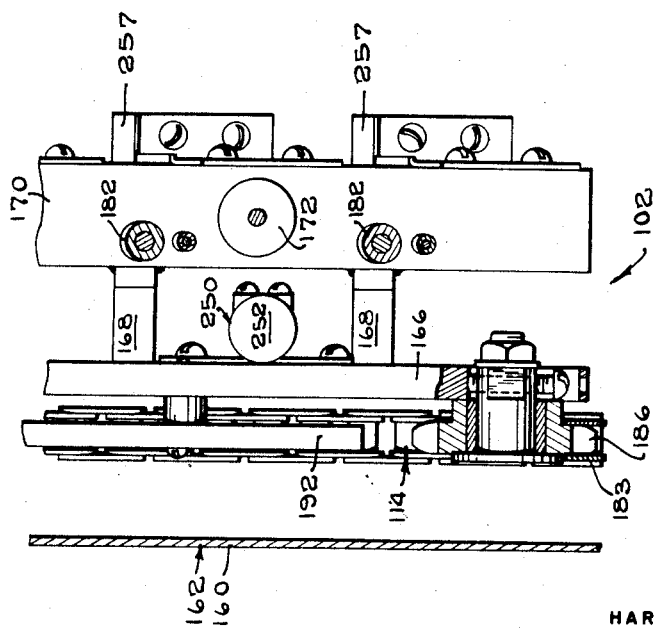
Fig. 12 is a fragmentary section along lines 12—12 of Fig. 11B as viewed from the front end of the machine.

Disposed adjacent the lower ends of the racks 108 is the rearwardly inclined rising run 183 of the hereinbefore mentioned feed elevator 114 which receives the graded eggs from the racks into the before mentioned cups 112 and delivers them to the weighing mechanism 118. Said elevator comprises an endless sprocket chain 184 trained about an idler sprocket 186 (Fig. 12), that is adjustably supported from the reclining bar 166, and a drive sprocket 188 (Fig. 22) that is firmly mounted upon a short transverse shaft 190 which is rotatably supported in the upper end of the bar 166. The rising run 183 of the sprocket chain 184 rides upon and along the upper edge of another reclining bar or plank 192 (Figs. 9, 13 and 22) which extends parallel to and is supported from the reclining bar 166.

At intervals equal to the distances between the quality racks 108, the parallel links 194a and 194b of the elevator chain are provided with outwardly turned lugs 196a and 196b, respectively, which carry the cross bar 198 of a T-shaped plate 200. Secured to the left inner corner of each T-shaped plate 200, as viewed in Fig. 9, is a tubular bearing 202 that is horizontally positioned when traveling along the ascending run of the elevator and within which is rotatably anchored a pivot stud 204. Secured to the outwardly projecting end of each said pivot studs 204 is the vertically rising stem 206 of an arm 208 that extends transversely across the elevator chain. Said arm 208 is of concave conformation and carries the actual cup 112 which has the form of a shallow concave plate that is traversed by a centrally located recess or depression 212 extending approximately in the same direction as the bars 176a and 176b of the racks 174. Said recess 212 is of a width about equal to the distance between said bars. Thus, the cup plate 112 presents to an egg delivered thereinto from one of the racks 108 a supporting surface with at least two contacting areas that are spaced in a direction axially of the egg. A spring 214 tensioned between the vertical stem 206 of arm 208 and a stud 216 upon the opposite end of the cross bar 198 of the T-shaped mounting plate 200 yieldably holds said stem against a stop member 218 secured to said same cross bar 198 and in this manner maintains the cup 112 in a substantially horizontal position wherein it is adapted to support an egg thereon when traveling along the rising run of the elevator.

Interposed between the lower ends of the racks 108 and the rising run of the elevator 114 are gate mechanisms 220 which normally block exit of the eggs from the racks but may temporarily be disabled by the approach of an empty cup on the rising conveyor run to permit discharge of an egg from the rack whenever an empty cup on the conveyor is available for its reception. Each of the normally closed gate mechanisms 220 is formed by a knee-shaped plate 222 disposed between the parallel legs 176a and 176b of its respective rack near the discharge end thereof (Fig. 9). Said plate 222 is secured to the cross bar 224 of a U-shaped member 226 which is firmly mounted upon a spindle 228 that projects from, and turns in, the hereinbefore mentioned tubular arm 182 upon which the leg 176a of the rack bar 174 is supported. The weight of the parallel legs 230a and 230b of the U-shaped member 226 urges the gate 220 in counterclockwise direction as viewed in Figs. 9 and 10 to an extent determined by engagement of a lip 234, formed at the free end of the knee-shaped plate 222, with a fillet 236 extending between and secured by the lower faces of the rack bars 176a and 176b. When in said counterclockwise position, the knee-shaped crest 238 of each plate 222 projects above the level of the rack bars 176a and 176b and in this manner prevents any egg placed onto, and gravitating down said rack, from escape as best shown in phantom lines at A in Fig. 9.

Means are provided to actuate each gate mechanism 220 to swing its knee-shaped plate 222 in clockwise direction as viewed in Fig. 9 into the position illustrated at B in said Fig. 9 whenever an empty cup approaches the discharge end of its respective rack. For this purpose, a tubular bearing 242 extending in a direction transversely of the elevator chain 184 is welded to the lower end of the center bar 244 of each T-shaped mounting plate 200, and slidably disposed within each of said tubular bearings is a trip finger 246 that protrudes normally beyond the right end of said bearings as viewed in Fig. 9. The protruding tips of the fingers 246 are arranged to engage L-shaped arms 248 projecting radially from the hereinbefore described spindles 228 of the U-shaped gate members 226 into the path of said finger tips and swings them clockwise as viewed in Fig. 9. When an L-shaped arm 248 is moved in the described manner, the gate mechanism 220 with which said arm is associated, swings in clockwise direction until the rising portion 222a of its knee-shaped gate plate 222 comes against the fillet 236 and lies flat below the bars 176a and 176b of the rack as illustrated at B in Fig. 9. Now an egg that formerly pressed against the descending run 222b of the knee-shaped plate 222 as illustrated at A in Fig. 9 may roll over the rising portion 222a of said plate, as shown in phantom lines at B in said Fig. 9. Then, as it comes against the upturned legs 230a and 230b of the U-shaped gate member 226, its momentum swings the total gate mechanism in counterclockwise direction back into its initial position, as determined by engagement of lip 234 with fillet 236 because the continuously advancing finger 246 on elevator 114 has meanwhile released the L-shaped arm 248. As a result thereof, the egg is now free to roll from the rack into the directly succeeding elevator cup 112 that registers at the moment with the rack 108. Discharge of other eggs from the same rack, however, is positively prevented by the described return of the gate mechanism to its initial position.

Means are provided that disable the protruding trip fingers 246 by pushing them back into their tubular bushings 242 whenever a succeeding elevator cup receives an egg. For this purpose, the hereinbefore mentioned reclining bar 166 carries opposite the ends of each but the lowermost grading rack, a solenoid 250 (Figs. 9 and 10)

whose armature has a buffer-shaped head 252 that is normally seated slightly behind the path of the protruding finger tips 246 as they rise with and along the ascending run of the elevator 114. The power circuit of each of said solenoids includes a normally open switch 256 (Fig. 44) housed in a switch box 257 that may be bolted to the reclining bar 170 (Figs. 10, 11A and 11B). Each of said switches 256 has an arm 258 that is operated by a camming block 259 which is mounted upon an actuating spindle 260 rotatably received in a tubular spindle 261 that is supported in reclining bar 170. The actuating spindle 260 of each of said switches 256 extends to a point below the bars 176a and 176b of its switches 256 extends to a point below the bars 176a and 176b of its respective rack and is provided with a radially directed arm 262 that rises above the level of said bars at a point intermediately of the parallel legs 230a and 230b of the U-shaped gate member 226. Whenever an egg rolls over the gate member 226 in the manner described hereinbefore, it depresses the arm 262 which is effective to close momentarily the power circuit of the solenoid 250 opposite the end of the next higher rack 108. This projects the buffer-shaped head 252 of the armature of said solenoid momentarily into the path of the protruding finger tip 246 above the cup that receives the egg which actuated the switch 256. Thus, the protruding finger tip preceding the cup that just received an egg encounters a projected head 252 which cams it back into its tubular bearing 242. Hence, the finger 246 above a filled cup is unable to actuate any of the gate mechanisms 220 of the higher racks, and it is impossible therefore that said cup may accidentally receive another egg from any one of said higher racks.

In the circuit diagram shown in Fig. 44, the switches 256 have been individually identified by the suffix letters a, b, c, d, e, f, g, and h, respectively, corresponding to the quality racks 108a to 108h with which they are associated because the momentary closure of switch 256, as effected by escape of an egg from its corresponding rack 108 is not only effective to disable the gate opening finger 246 preceding the filled cup, it also energizes briefly a corresponding one of another set of solenoids 264a to 264h (Fig. 44) which are associated with the hereinbefore mentioned memory device. Upon energization, each of said solenoids sets a corresponding recording member in said device into a position representative of the quality of the eggs stored on the particular rack from which the switch-actuating egg passed onto the cup, in a manner and for a purpose to be described in greater detail hereinafter.

After a cup on the ascending run of the elevator has risen above the level of the highest rack 108, means become effective that tip it to the left, as viewed in Figs. 6 and 10 to cause an egg lying therein to roll onto the platform 266 of the egg weighing mechanism 118 while at the same time restoring the retracted gate opening finger of the cup to its protruding position in which it may effectively actuate a gate mechanism 220 upon return to the ascending run of the elevator. Having again reference to Figs. 9 and 10, the vertical stem 206 of each of the arms 208 that carry the cups, forms at its lower end an outwardly turned ear 268, and as a cup reaches its uppermost position, said ear is engaged by a stationary camming ledge 270 projecting laterally from the side wall 160 of the hereinbefore described cabinet 162. Contact with ledge 270 swings each arm 208 in counterclockwise direction as viewed in Figs. 9 and 10, against the urgency of the hereinbefore described spring 214 and thus tips the cup about its pivot 204 to the left at the very moment when it reaches the level of the weighing platform 266. Mounted in each ear 268 at the underside thereof is a round headed camming stud 272, and when said ear comes against the camming ledge 270 and is swung in counterclockwise direction on its pivot 204, said camming stud bears down upon the projecting left end of the trip finger 246 in the tubular bushings 242 and restores said finger to its effective forwardly projected position, wherein it may again actuate the first gate mechanism 220 that it will encounter.

*Weighing mechanism*

As the cups 112 tip in the described manner at the upper end of the ascending run of elevator 114, eggs lying thereon roll sidewise onto the platform 266 of the weighing mechanism 118 (Figs. 7 and 8). Said platform is composed of two relatively inclined plates 274a and 274b having downwardly bent flanges 276a and 276b, respectively, that are secured to an intermediately positioned horizontal arm 278 (Fig. 16). Said arm is part of a bracket 280 that is firmly mounted upon a transverse shaft 282 which is rotatably held in and between a pair of arms 284a and 284b that are pivoted to and project forwardly from a transverse block 286 secured to the vertical leg 288a of a U-shaped mounting plate 290 (Fig. 15). The bracket 280 has a downwardly directed stem 292 that carries firmly secured to its lower end a transverse shaft 294 which is rotatably held in two arms 296a and 296b that are pivoted to and project forwardly from another transverse block 298 secured to the hereinbefore mentioned vertical leg 288a of the U-shaped plate 290 below block 286. The linkage parallelograms formed by the arms 284a, 284b and 296a, 296b constitutes a structure that supports the platform 266 in substantially horizontal position no matter what the angular position of arms 282a, 282b and 296a, 296b may be. To maintain the platform 266 at a predetermined elevated position, springs 300a and 300b are tensioned between the ends of shaft 294 at either side of stem 292 and the upper cross bar 302 of a rectangular frame 304 whose side posts 306a and 306b rise from two parallel braces 308a and 308b, respectively, that extend between the vertical legs 288a and 288b of the U-shaped mounting plate 290. Whenever an egg is placed upon the platform 266, said platform with its supporting bracket will drop to a lower level against the urgency of springs 300a and 300b to an extent determined by the weight of the egg.

Means are provided that are cyclically effective to close a selected one of a plurality of different weight recording switches 310 (Fig. 44) depending upon the level to which the bracket 280 has dropped under the weight of an egg placed onto the platform 266. Upon closure, said switches 310 transmit an electrical impulse to a solenoid 320 that represents the particular weight group to which the egg belongs and which is associated with the hereinbefore mentioned memory device 116 and is effective upon energization to actuate a member on said device corresponding to the particular egg on the platform in a manner that registers the weight group of said egg.

In the embodiment of the present invention illustrated in the accompanying drawings, there are six such switches 310i, 310j, 310k, 310l, 310m, 310n corresponding to the six different weight groups into which the eggs processed by the machine of the invention may be divided and which are usually termed "Jumbo," "Extra Large," "Large," "Medium," "Small," and "Peewee," respectively. For reasons of compactness, said switches are preferably arranged in two vertically superposed rows 330 and 332 (Figs. 15 and 19) held within a rocker frame 334 formed by two transversely spaced bell cranks 336a and 336b that turn upon a common transverse shaft 338 (Fig. 16) whose opposite ends are mounted in the hereinbefore mentioned horizontal braces 308a and 308b. Said bell cranks 336a and 336b have substantially vertically extending upper arms 340a and 340b, respectively, to which the above mentioned switch row 330 and 332 are suitably secured and which are rigidly connected above said switch rows by a cross bar 342. The lower arms 344a and 344b of said bell cranks extend substantially in a horizontal direction and are connected at their ends by a triangular brace plate 346. The switches in the two superposed rows 330 and 332 are preferably transversely displaced relative to each other by a distance equal to half the width of their housings 348 and the switches in the upper row 330 are inverted as compared with the switches of the lower rows 332. Hence, the actuating arms of the switches of both rows all of which are formed by leaf springs 350, approach each other relatively closely with their ends as best shown in Figs. 15 and 19 and are spaced an equal distance apart in a direction transversely of the rocker frame 334.

To actuate one of said switches 310 individually, depending upon the weight of a particular egg on the weighing platform 266, the platform-supporting bracket 280 carries at its upper end, a cross bar 352 provided with six transversely spaced threaded vertical holes within which are adjustably received a corresponding number of threaded stems 354. The upwardly projecting ends of said stems 354 may be provided with hexagonal head 356 for ease of adjustment while their downwardly projecting lower ends carry circular discs 358 of limited depth. The vertical position of said stems 354 is so adjusted that said discs 358 occupy consecutively lower positions, the arrangement being such that they form two superposed, parallel staggers 361 and 363 as best shown in Fig. 18. The upper stagger of three discs descends from the left to the right as viewed in said Fig. 18 and the lower stagger descends from a point intermediately the upper most and the middle disc of the upper stagger to a point below and somewhat to the right of the lower disc of said upper stagger. Thus, each of the disc supporting stems 354 lies in the same vertical plane as one of the above described switch actuating arms 350. Each of the discs 358 corresponds to a certain weight range. The lowermost one separately identified by the suffix letter $n$ represents the lightest weight range and should therefore become effective to actuate its respective switch when the weighing platform supporting bracket 280 is only slightly depressed, with the other discs incapable of actuating their respective switches. The next higher disc 358m represents a slightly heavier weight range and should, therefore, become effective to actuate its respective switch arm 350 when the bracket 280 is depressed somewhat more, while all other discs, including the lowermost disc are incapable of operating their respective switches. Thus, each higher disc represents a slightly heavier weight range with the highest disc 358i representing the heaviest weight range provided for in the illustrated embodiment of the invention.

To assure that upon delivery of an egg onto the weighing platform 266, exclusively the one switch 310 will be actuated that represents the weight range into which the egg belongs, sensing fingers 360 are interposed between the discs 358 and their respective switch actuating arms 350. These sensing fingers carry disc engaging beads 362 on a common horizontal level that lies somewhat below the level which the lowermost disc 358 assumes under the urgency of springs 300a and 300b whenever the weighing mechanism 118 is idle. Having reference to Figs. 15, 16 and 18, a block 364 is supported upon the hereinbefore mentioned shaft 338 intermediately of the bell crank side bars 336a and 336b and possesses upwardly directed lateral projections 366a and 366b which mount a transverse shaft or spindle 368. Upon said spindle are rotatably engaged the lower ends of said sensing fingers 360. Partitions 370 projecting from the upper face of block 364 maintain said fingers 360 in their proper transversely spaced positions within the vertical planes determined by switch arms 350 and the threaded stems 354 which carry the actuating discs 358. The flat vertical backs 372 of said fingers 360 bear against the outwardly turned ends 374 of their respective switch arms (Figs. 15 and 19). Below the beads 362 the front edges of said fingers form shoulders 373 which may engage a common transverse stop rod 375 that is mounted in the projections 366a, 366b and the partitions 370 of block 364, and which determines the extreme forwardly rotated position that the fingers 360 may assume upon the spindle 368.

As described hereinbefore, the beads 362 all lie in a common horizontal plane which extends somewhat below the plane of the lowermost disc when the weighing mechanism is in its idle position (Figs. 15 and 18). After an egg has been placed upon the weighing platform 266, however, the bracket 280 drops to a lower level against the urgency of the springs 300a and 300b which places one of the discs 358 upon a common level with the actuating beads 362, depending upon the weight of the particular egg on the platform. Immediately thereafter means enter into operation that swing all the fingers and their respective switches in unison toward the discs 358. When this occurs, the particular disc 358 that aligned itself with its corresponding bead 362 engages said bead and blocks further movement of the respective finger. As a result thereof, said finger will swing backwardly relative to the other fingers upon shaft 368 as illustrated in Fig. 20 wherein the lower disc 358k of the upper stagger of discs 361 is engaged by the contacting bead 362 of its associated sensing finger 360 which indicates that the egg on the weighing platform belongs to the weight class termed "Large." As the particular finger 360 is blocked in the described manner and swings backwards relative to the other fingers comprised in the mechanism, its back face 372 engages the spring arm 350 of its corresponding switch 310k which is effective to close said switch.

To effect the described approach of the sensing fingers 360 and the discs 358 at the proper moment, a cam 376 is mounted upon the main shaft 378 of a mechanism 380 that regulates the transfer of the eggs from the cups 112 of the feed elevator onto the weighing platform 266. The contour of said cam 376 is engaged by a cam follower roller 382 that is pivoted to the hereinbefore described triangular brace plate 346 which connects the horizontal arms 344a and 344b of the rocker frame 334. Said cam 376 has a single rise 384 of relatively short duration, and when the roller 382 encounters said rise it depresses the horizontal arms 344a and 344b of the rocker frame 334 and swings said frame in counterclockwise direction as viewed in Figs. 15 and 16 against the urgency of a suitable restore spring 386 that is tensioned between the upper end of said frame and the vertical leg 288a of the U-shaped mounting plate 290. The described counterclockwise movement of the rocker frame approaches the switches 310 and their associated sensing fingers 360 to the discs 358 in the manner necessary to cause actuation of whatever switch finger 360 encounters a disc 358 in vertical alignment with its actuating bead 362.

In order to obtain dependable results from the weighing operation, the described approach between the sensing fingers 360 and the weight-discs 358 must not become effective until the oscillations of the platform upon delivery of an egg thereinto have come to an end. The reduce the time by which the platform will reach an equilibrium means are provided to dampen the oscillations of the linkage parallelogram from which the platform 266 and its bracket 280 are supported as the springs 300a and 300b alternately extend and contract. For this purpose, the front portions of the hereinbefore described lower arms 296a and 296b converge as best shown in Fig. 16 and carry between their ends a plate 398 of an electrically conductive material, such as aluminum, that extends downwardly into a magnetic field formed between the poles 400a and 400b of a strong electro-magnet 402 of horseshoe shape whose magnetizing winding is indicated at 404 in Figs. 15, 17 and 18 and which is supported from the hereinbefore mentioned U-shaped mounting plate 290. When said electro-magnet is energized, the magnetic flux passing between the poles opposes any movement of plate 398 in a direction perpendicular to the force lines of said flux, and in this manner dampens quickly any oscillations of the parallelogram linkages that support the platform 266.

The machine of the invention is intended to operate without interruption, and after the platform 266 has reached a condition of equilibrium upon delivery of an egg thereonto, said egg will immediately be moved on and placed into an adjacent cup of the distributing conveyor 122, while means enter into operation that lock the platform supporting bracket 280 in its depressed position so that the hereinbefore mentioned weight sensing and switch actuating operations may occur while the weighed egg is already in the process of being transferred onto the distributing conveyor and a new egg is being delivered onto the weighing platform. For this purpose, a spring lip 388 mounted upon the top bar 342 of the rocker frame 334 is arranged to engage, upon counterclockwise movement of the rocker frame, a plate 390 secured to the upper transverse bar 352 of bracket 280 which is effective to prevent any change in the vertical position of said bracket while the rocker frame 334 is in its disc engaging counterclockwise position.

Reverting to the hereinbefore described weight sensing and weight switch closing operations, it will be understood that the vertical space between adjacent discs 358 must be less than the vertical dimension of the sensing beads 362 on the fingers 360 to avoid the possibility that upon relative approach of bracket 280 and rocker frame 334 all the sensing beads 362 might move above or below their corresponding discs 358 which would fail to close any of said switches and hence permit an egg to pass through the described weighing mechanism without registering its weight in the memory device. On the other hand, it will also be understood that by spacing consecutive discs 358 from each other by a distance less than the vertical thickness of the sensing beads 362, there arises the danger that two adjacent ones of said beads might simultaneously be engaged by their coacting discs, and two different weights might thus be registered in the memory device if an egg should happen to be of a weight on the border line between the weight ranges represented by the two discs. To avoid any such double registrations all the weight switches 310 are connected in series in such a manner (Fig. 45) that each switch which represents a higher weight range when in open position, i.e., when in the position wherein it interrupts the power circuit of its respective weight recording solenoid 320, lies in and forms part of the power circuit of the weight-recording solenoid that represents the next lower weight range. Hence, whenever two adjacent sensing beads 362 are engaged by their corresponding discs 358 during relative approach of the rocker frame 334 and bracket 280, closure of the switch that represents a higher weight range while energizing its respective weight registering solenoid, will interrupt the power circuit of the solenoid representing the lower next weight range and thus prevent energization of said solenoid though the control switch 310 of said solenoid may actually be closed. Consequently, there will be only one weight registration for an egg on the border line between two consecutive weight ranges.

In the practical performance of the described weight-sensing mechanism, it may happen, however, when the switches representing two consecutive weight ranges are both actuated during the weighing of a particular border line egg that the disc representing the lower one of the two consecutive weight ranges contacts its respective sensing bead first and causes closure of its respective weight recording switch 310 before the disc representing the next higher weight range contacts its corresponding sensing bead and closes its respective weight recording switch. In such a case, the circuit of the lower one of said recording solenoids will be energized before the control switch of the next higher weight recording solenoid is moved to interrupt its power circuit. As a result thereof, two different weights might be recorded in quick succession in the memory drum for one and the same egg. To prevent such misoperation, a normally open switch 391 is connected in series with all the weight recording switches 310 and solenoids 320, respectively (Fig. 45), and the described counterclockwise movement of the rocker frame 334 is arranged to close said switch 391 for a very brief moment only. Thus, it is only during this very brief moment that any of the said recording solenoids 320 can be energized no matter what the position of their respective control switches 310 may be. In the embodiment of the invention illustrated in the accompanying drawings, said switch 391 is mounted upon the right pole 400b of the horseshoe magnet 402 with its actuating arm disposed directly below the right arm 344b of the rocker frame 334. Hence, it is only when the cam 376 has depressed the horizontal arms 344a and 344b of the rocker frame to their lowest level, i.e., when the rocker has reached its extreme counterclockwise position, that any weight recording solenoid may be energized and since the switch 391 remains closed for only the briefest moment, there is no time for a preceding or successive energization of any adjacent weight recording solenoid.

To control the transfer of an egg from a cup 112 of the feed elevator onto the platform 266 of the described weighing mechanism as said elevator cup is tilted laterally on its pivot 204 by engagement of its lug 268 with the stationary camming ledge 270, and to transfer the egg from the weighing platform, upon completion of the actual weighing operation, onto an adjacent cup 120 of the distributing conveyor 122, the described weighing device is provided with the hereinbefore mentioned egg transfer regulating mechanism 380. Said transfer regulating mechanism comprises a cylindrical rod 392 which is disposed substantially parallel to the trace of the relatively inclined surfaces of the elevator cup 112 and also to the trace of the relatively inclined surfaces of the weighing platform 266. Said rod is arranged to swing continuously in a circular orbit about the weighing platform. The described rotation of the rod 392 occurs in timed relation with the operation of both the feed elevator 114 and the distributing conveyor 122 such that said rod will enter the space between an elevator cup and the weighing platform directly after the former has been tipped laterally, and will engage any egg that may at this moment lie on the weighing platform directly after said weighing platform has been locked in position by engagement of the resilient lip 388 on rocker frame 334 with the plate 390 on the transverse mounting bar 352 of bracket 280. In this manner, an egg rolling from a laterally tipped elevator cup (Fig. 21A) will come against and lean on the rounded outer surface of the cylindrical rod 392 (Fig. 21B) and since the speed of rotation of said rod 392 is arranged to be relatively slow, it is said rod—and not the force of gravity—that controls the speed with which an egg rolls from the tilted elevator cup onto the platform 266. In this manner, breakage of the eggs upon impact against the right base plate of the weighing cup due to excessive speed of transfer is held at a minimum. Even before said rod 392 is engaged by an egg rolling off a tilted elevator cup, it engages with its opposite side any egg that may lie on the platform (Fig. 21A) rolling it over a bridge member 394 that is suitably supported from a U-shaped frame structure 395 onto an adjacent cup 120 of the distributing conveyor 122 (Figs. 21B and 21C). To operate the transfer rod 392 in the described manner, said rod is rigidly connected by means of a radially directed arm 396 to the hereinbefore mentioned horizontal shaft 378 that carries the camming member 376 and which is suitably journalled in one leg of the hereinbefore mentioned U-shaped frame structure 395. Rotation is imparted to said shaft through a suitable power train, to be described in greater detail hereinafter, from the distributing conveyor 122 which also drives the feed elevator. Hence, the operation of said feed elevator, of the weighing mechanism, of the distributing conveyor and of the egg transfer mechanism may be readily timed in the proper manner.

In order that the transfer rod 392 may swing over the weighing platform 266 in a relatively shallow arc which is necessary to avoid that small eggs may become lodged, and be crushed, between said rod and the plates 274a and 274b of the platform, the outer edges of said plates are of digitate conformation and the transfer rod is arranged to form complementary digits (Fig. 15) that intermesh with the digits of the weighing platform as said transfer rod swings about said platform. Similarly, the outer sector of the transfer bridge 394 is digitated in a manner permitting the transfer rod to pass with its digits in interdigiting relation with the digits of the bridge member (Figs. 14, 21A, 21B and 21C).

*Distributing conveyor, classification conveyor and transfer means*

The cups 120 into which the rotating transfer rod 392 sweeps the eggs from the platform 266 upon completion of the weighing operation are all mounted at equal intervals upon an endless chain 410 (Fig. 5). Said chain is trained about an idler sprocket 412 mounted upon a shaft 416 and a drive sprocket 414 mounted upon the driven side 418, respectively, of a clutch 420 that is located in a cabinet 422 at the rear side of the machine (Figs. 1, 3B and 4). The shaft 416 is suitably journalled in the frame of the machine within the cabinet 162 that covers the hereinbefore described weighing mechanism 118 and the memory device 116. The upper horizontal run of the chain 410 is supported upon the rides along a ledge 424 (Figs. 21A, 21B, 21C, 26A) that extends between the cabinet 162 and the hereinbefore mentioned clutch cabinet 422. Links 426 of said chain on the side remote from the weighing mechanism are upwardly extended to form outwardly bent lugs 428 (Fig. 24) which carry firmly secured to their under side tubular bearings 430 extending in a direction longitudinally of the conveyor. Rotatably received within said bearings 430 are pivot studs 432, the protruding ends of which are firmly mounted in ears 434 that project downwardly from the under side of concave plates which form the egg supporting cups 120. Said plates are shaped in much the same manner as the plates that form the hereinbefore described egg supporting cups 112 of the feed elevator 114, having a shallow but clearly defined transverse center depression 438 to permit an egg delivered laterally thereonto to roll to the lowest possible position within the cup and be properly supported at two longitudinally spaced points, no matter what its size may be. Means are provided to move the cups into, and positively maintain them in, the upright position illustrated in Figs. 21A, 21B and 21C, wherein they are adapted to receive an egg from the weighing mechanism and support it properly as they move past, and are charged with eggs from, the weighing platform under the propelling force of the hereinbefore described transfer rod 392. For this purpose the hub 440 of the sprocket 412 carries on the side remote from the weighing mechanism a disc 442 of a somewhat larger diameter than the sprocket (Figs. 14 and 22), and as a cup 120 on the lower run of the conveyor 122 approaches, and swings around, said sprocket 412, the under side of its segment 120a is engaged by said disc 442 which forces the cup positively into the egg receiving position illustrated in Fig. 21B. After a cup has received an egg from the weighing platform, the weight of said egg maintains it in the clockwise position illustrated in Figs. 21A, 21B and 21C. Additional means may be provided, however, to hold the cups positively in said position as they transport eggs away from the weighing mechanism until they reach the classification conveyor where they may have to tilt in counterclockwise direction to discharge their load into selected lanes thereof. For this purpose, a guide bar 444 (Figs. 14 and 22) is suitably supported from the machine frame adjacent to and at about the same level as the crest of the guide disc 442 to assume the function of the latter once the cups have been removed from the effective range of said disc.

Disposed below and extending in a direction transversely to the distributing conveyor is the hereinbefore mentioned classification conveyor 124. In the embodiment of the invention illustrated in the accompanying drawings, said classification conveyor forms 18 parallel classification lanes and is actually formed by two parallel sections 450 and 452 of identical construction and performance (Figs. 3B, 3D and 5). Each of said sections comprises a pair of transversely spaced endless sprocket chains 454a, 454b, and 456a, 456b, respectively. At the right side of the machine, as viewed from the front end thereof, said chains are trained about idler sprockets 458a, 458b and 460a and 460b, respectively, that are mounted upon a pair of axially aligned horizontally positioned shaft sections 462a and 462b. Said shaft sections are rotatably supported in horizontally positioned L-shaped angle irons 466a, 466b and 468a, 468b, respectively, which rest upon and are bolted to horizontal mounting plates 470 (Figs. 1 and 26A). Said plates in turn rest upon, and are bolted to, a channel 472 that is supported from the confronting side walls of the cabinets 162 and 422. At the discharge end of the classification conveyor, its four sprocket chains are trained about upper idler sprockets 474a, 474b and 476a, 476b which is described in greater detail in my aforementioned copending application and which are rotatably supported from another set of L-shaped angle irons 477a, 477b and 479a, 479b that form part of the machine frame (Figs. 3A, 3C, 26A and 26B). At said discharge end, the sprocket chains are also trained about drive sprockets 478a, 478b and 480a, 480b that are positioned below the idler sprockets and all of which are firmly mounted upon a common horizontal drive shaft 482 (Fig. 5) that extends through and is suitably journalled in the above mentioned L-shaped angle irons 477a, 477b and 479a, 479b. During performance of the machine, said drive shaft is continuously driven from a source of rotary power common to all the movable elements of the machine in a manner described in greater detail in my aforementioned copending application. Both the upper and the lower runs of the classification conveyor chains 454a, 454b and 456a, 456b are supported on the ride along guide ledges 484 and 486, respectively (Figs. 26A and 27), which are bolted to and extend between the hereinbefore described L-shaped angle irons at the feed and discharge ends of the conveyor.

Extending between, and pivotally supported from, alternate links of the conveyor chains of each conveyor section are tubular rods 488 provided at equal intervals along their length with pairs of collars 490a and 490b that are spaced apart from each other by a distance approximately equal to the width of the recesses or channels 438, provided in the egg supporting cups 120 of the distributing conveyor 122. The pockets 492 defined by the longitudinally aligned collar pairs of each two consecutive rods 488 are adapted to receive and support eggs delivered thereinto from the cups of the distributing conveyor with their main axes disposed parallel to the axes of said rods. The rods 488 may be made from metal but the pocket-forming collars are preferably made of an elastic material, such as rubber or nylon, to protect eggs deposited onto said collars from impact with hard surfaces. Additionally, the rods together with all the collars mounted thereon may be coated with an elastic plastic. This may be accomplished by pulling a distended tube of such a plastic over the rods and the collars and allowing said tube to contract to its normal condition.

The rows of pockets 492 formed by longitudinally aligned pairs of collars 490a and 490b on the rods 488 form the classification lanes 126 into which eggs of the same quality and weight combination group are to be dropped from the distributing conveyor under control from the repeatedly mentioned memory device 116. As mentioned hereinbefore, whenever an egg of a particular quality and weight combination on the distributing conveyor 122 approaches a lane 126 on the classification conveyor that is intended to receive and gather all the eggs of said quality and weight combination, said memory device activates a solenoid 128 that tilts the cup which carries said egg on its pivot 432 in the direction away from the distributing conveyor chain causing the egg in said cup to drop onto the classification conveyor into the particular lane reserved for eggs of the same quality and weight combination.

Having reference to Figs. 3B and 3D, a solenoid 128 is mounted for every one of the quality lanes 126 upon a common base plate 494 extending along the upper run of the distributing conveyor 122. Said base plate 494 may be of L-shaped cross section (Fig. 26A) and may rest upon a channel 496 that may be of S-shaped cross section and which extends between and is supported from the confronting walls of the repeatedly mentioned cabinets 162 and 422. The solenoids 128 are located exteriorly of the distributing conveyor with their axes disposed transversely to the plane defined by the chain thereof and each of said solenoids has a cylindrical armature 498. Upon energization of a solenoid 128 said cylindrical armature is projected into a position in close proximity with, but clear of, the upper run of the distributing conveyor chain 410 into the path of an approximately triangular lug or ear 500 (Fig. 25) depending from the outer section 120b of each of the egg supporting cups 120 of the distributing conveyor. Each of said lugs has a forwardly slanting leading edge 502, and hence whenever a cup 120 approaches a solenoid 128 that has been energized, the forwardly slanting edge of said lug 500 engages the projected cylindrical armature of the solenoid and is therefore cammed upwardly as it rides over said armature. As a result thereof, the cup 120 is swung on its pivot 432 in counterclockwise direction as viewed in Fig. 25 causing any egg lying therein to slide or roll laterally from the cup into the proper lane of the classification conveyor underneath.

As will be noted from Figs. 3B and 23, the base plate 494 carries, beyond the last of the classification lanes of the packing conveyor, a camming device 504 adapted to tilt any and all of the cups passing on the conveyor. Hence, eggs that might not previously have been discharged into one of the classification lanes, will be discharged into a suitable tray 506 supported from the clutch cabinet 422 and no such "forgotten" egg will drop onto the floor of the egg packing establishment as the cups swing around the drive sprocket 414 at the end of the distributing conveyor. In the particular embodiment of the invention illustrated in the accompanying drawings, said camming device 504 is formed by a solenoid of the same type as employed to selectively actuate the cups 120 during their travel about the classification conveyor. Said solenoid 504, however, is not connected in the electric control circuits comprised in the machine of the invention but has its armature permanently projected into cup-tilted position.

Since eggs are rather fragile, it is obviously not sufficient to merely tilt the cups of the distributing conveyor and let the eggs roll from said cups onto the classification conveyor underneath. Therefore, means are provided that receive the eggs from the tilted cups of the distributing conveyor and deposit them gently into the proper pockets of the packing conveyor at a speed equal to the rate of travel of said packing conveyor. In the particular embodiment of the invention illustrated in the accompanying drawings, said transfer mechanism is formed by a continuously operating axially elongated rotor 508 that is disposed longitudinally of, and adjacent to, the discharge side of the distributing conveyor (Fig. 5) and which forms a pair of diametrically opposite scooping surfaces 510a and 510b that turn in timed relation with the distributing conveyor and the classification conveyor in a direction opposite to what may be considered a normal scooping operation in that they receive eggs from the tilted cups of the distributing conveyor and lower them backwardly to the level of the classification conveyor. Having reference to Figs. 5, 26A, 28, 29 and 30, said rotor 508 comprises two shaft sections 512 and 514 of preferable square cross section corresponding to the two sections 450 and 452 of the classification conveyor. At both their ends, said shaft sections form cylindrical tenons. Their outer tenons are suitably journalled in vertically positioned triangular vanes 516 and 518, respectively, that are supported from the side flanges of the hereinbefore mentioned outer angle irons 466a and 468b. The inner tenons of said shaft sections are journalled in the side flanges of an upright 520 of U-shaped cross section that may be supported from the inner angle irons 466b and 468a (Fig. 32). Said inner tenons are both bolted to the hub 522 of a common drive sprocket 524 for rotation in unison, and a sprocket chain 526 connects said drive sprocket operatively to another sprocket 528 mounted upon one end of a stub shaft 530 that protrudes through, and is rotatably supported in, one of the flanges of the hereinbefore mentioned upright 520. Upon its other end said stub shaft 530 carries another sprocket 532 (Fig. 5) that meshes with the inner sprocket chain 456a of the classification conveyor section 452 causing both the shaft sections of the transfer rotor to turn in predetermined synchronism with the classification conveyor.

Bolted to opposite faces of each of the square-shaped shaft sections 512 and 514 are elongated plates 534 extending over the total transverse width of their respective classification conveyor sections. The free edges of said plate are smoothly bent in opposite directions in the manner of scoops and contain a plurality of recesses 535 of a size larger than the maximum sized egg, one in alignment with each of the lanes formed by the classification conveyor sections (Fig. 31). The concave surfaces of the scoop-shaped end portions of the plates 534 are lined with rubber sheets 536 that may be suitably secured to said plates, such as by means of screw bolts 538. Said rubber sheets are preferably arranged to extend beyond and hang over the outer edges of the plates 534, and in registry with the recesses 535 in said plates they are provided with preferably circular apertures 540 of a size that is insufficient to pass the smallest egg to be handled by the machine. Disposed intermediately of each two adjacent recesses 535 and apertures 540, respectively, at points approximately in line with the rear edges of said apertures 540 are wire loops 542 that are preferably coated with a resilient plastic and which may be held in place by clamps 544 that are secured to the plates 534 by the same screw bolts 538 that hold the rubber sheets 536 in place. Said wire loops 542 serve to deflect eggs delivered from the tilted cups of the distributing conveyor onto the transfer mechanism into their proper lanes, and a longitudinally extending rubber cord 546 held in position by the same clamps 544 acts as a stop means to prevent eggs delivered onto the rubber lined scoop-shaped edge portions of the plates 534 from rolling onto the bare metal portions thereof where they might come to harm.

During practical performance, the described transfer mechanism turns continuously in counterclockwise direction as viewed in Figs. 26A, 28, 29 and 30, and its rotation is timed in such a manner with the operation of the distributing conveyor that whenever the cups 120 on said last mentioned conveyor are about to be aligned with the classification lanes of conveyor 124, one of the scoop-shaped side edges of the rotating transfer plates 534 has just dropped below the level of the inner side edge of a cup 120 in tilted position. Thus, if the ejection solenoid 128 above a certain classification lane has been energized and the projected armature thereof has caused a cup to tilt inwardly as shown in Fig. 28, an egg lying in said cup will slide and/or roll from said cup into the concave scoop-shaped portion of the transfer plate 534. There it comes against an area of rubber sheet that covers a recess 535 in, and is therefore unsupported by, the rigid metal plate 534 so that any impact of the egg with a metal surface even through a rubber sheet 536 and the ability of said sheet to yield under the impact of the egg cooperate with the hereinbefore described rubber cord 546 to prevent that an egg deposited upon the scoops of the transfer mechanism may roll too far along the surface of the plates 534 and come into contact with the bare metal portions thereof. As an egg settles itself into one of the rubber lined recesses 535 of a transfer plate 534, said plate continues its rotary orbit and drops below the level of the cup 120. Then, as the transfer plate 534 continues its rotation, the scoop-shaped egg containing edge thereof reaches its lowermost position directly ahead of one of the knuckled rods 488 of the classification conveyor. Hence, any eggs within said scoop-shaped edge area slip from the pockets formed by the rubber lined recesses 535 and are gently deposited into aligned ones of the pockets 492 formed by the pairs of collars upon the directly succeeding rod of the classification conveyor. Thus, breakage of eggs during the transfer from the distributing conveyor onto the classification conveyor is held at a minimum.

Memory device

It has previously been pointed out that whenever an egg is delivered from one of the grading racks 108 onto a cup of the feed elevator 114, its quality as represented by the rack onto which it was originally deposited by the candler is recorded on a rotary control device 116 termed the memory drum of the machine. It has also been pointed out hereinbefore that when said egg is weighed in the described weighing mechanism 118, the weight range to which it belongs is likewise recorded on the memory drum, and during further travel of the egg when it passes over the classification conveyor 124, the memory drum is arranged to energize a particular egg ejection solenoid 128 and effect discharge of the egg from the distributing conveyor 122 whenever it passes over the particular classification lane 126 into which it belongs due to its quality and its weight. For this purpose, all potential stations of an egg that may be delivered from the lowermost rack 108a of the quality grading board 110 onto an elevator cup 112 to the last of the classification lanes 126 of conveyor 124 are represented by a strip shaped area 547 (Fig. 5) on the surface of the memory drum and said drum is arranged to move in synchronism with the advance upon said last mentioned conveyor. In other words, the surface of the rotary memory device must be divided into at least as many strip-shaped sectors 547 as there are potential egg stations from the lowermost rack of the grading board to the last lane of the classification conveyor, and from whichever rack 108 an egg is delivered onto the feed elevator 114, its advance on said elevator, its transfer to the weighing mechanism, its transfer to the distributing conveyor and its advance on said distributing conveyor until its discharge therefrom into a lane of the classification conveyor is represented by the rotary advance of such a strip shaped sector 547 of the cylindrical surface of said memory drum. On said strip shaped sector is first recorded the quality of the egg and then the weight range to which it belongs, and the manner in which the quality and the weight of an egg is recorded in its respective drum strip 547 is such that it may be employed to effect discharge of the egg from the distributing conveyor at the very moment when it passes over the lane of the classification conveyor 124 to which it belongs on account of its weight and its quality.

In the particular embodiment of the invention illustrated in the accompanying drawings, the run of the feed elevator 114 from the lowest quality rack to the weighing platform carries nine cups 120 representing nine potential egg stations. The weighing platform 266 represents an additional egg station and the distributing conveyor run from the weighing platform 266 to the last quality lane of the packing conveyor carries 23 cups. Hence, the surface of the memory drum must be subdivided into at least 33 consecutive strip shaped sectors 547 to represent all the eggs that may at a particular moment be traveling on the elevator, the weighing platform and the distributing conveyor but will in fact have to be subdivided into more such sectors for reasons that will presently appear.

Along each said strip shaped sector of the memory device, pins 548 and 549 are mounted that represent the different quality grades and the different weight ranges respectively into which a particular egg may fall. Since the exemplary machine illustrated in the accompanying drawings is designed to distinguish between eggs of eight different quality grades and to divide the eggs into six different weight ranges, each of the strip shaped sectors 547 of the memory drum carries eight different recording pins 548 individually identified by the suffix letters $a$ to $h$ and six different recording pins 549 individually identified by the suffix letters $i$ to $n$. Initially, all of said pins are in an ineffective or idle position but as an egg passes from the grading board 110 onto an elevator cup 120, that one of the group of eight pins 548 which corresponds to the rack upon which the egg was originally deposited, is moved into an active position, and as the egg is weighed on the described weighing mechanism, one of the group of six pins 549 representing the six different weight ranges is placed into active position depending upon the result of the weighing operation so that the strip shaped drum sector 547 that represents the particular egg and which rotates in synchronism with the advance of the egg on the elevator, over the weighing mechanism and on the distributing conveyor, accurately indicates the quality grade and the weight range to which the egg belongs by the active position of two of its fourteen pins. Then as the egg moves over the separate lanes of the classification conveyor 124, the activated pins on its corresponding drum sector 547 effect energization of the proper ejector solenoid 128 when the egg passes over the particular classification lane into which it belongs. Thereafter as the cup, that carried the egg, moves beyond the last of the classification lanes, its corresponding strip-shaped drum sector 547 encounters camming means that return the activated pins to their neutral positions so that upon completion of a 360 degree revolution the drum sector is ready to start another operational cycle and may represent another egg that may be delivered from the grading board into an elevator cup 120.

Having reference to Figs. 5 and 22, the control device 116 is located below, and within the same cabinet 162 as, the weighing mechanism 118 with its main axis disposed horizontally and extending in a plane parallel to the vertical planes determined by the endless chains of both the elevator 114 and the distributing conveyor 124. It comprises a pair of longitudinally spaced centrally apertured circular side plates 550 and 551 that are rigidly supported from a horizontal partition 552 within the cabinet 162 by means of depending bracket arms 554 and 556. Said side plates carry suitable ball bearings 558 and 560 within which are rotatably received the opposite ends of the main shaft 562 of the rotary memory device (Fig. 34). During operation of the machine, said shaft is intermittently driven in synchronism with the operation of the feed elevator, the weighing mechanism and the distributing conveyor. For this purpose, the idler shaft 416 of the distributing conveyor 122 carries a bevel gear 564 (Fig. 14) that meshes with another bevel gear 566 which is firmly mounted upon a horizontal shaft 568 extending at right angles to the idler shaft 416 and parallel to and above the main shaft 562 of the rotary memory device. Said shaft 568 is suitably supported from the machine frame and carries at a point above the rear end of the memory shaft 562, a crank disc 570 (Figs. 14 and 22) to which is eccentrically pivoted the upper end of an actuating rod 572. Adjustably secured to the lower end of said actuating rod is a drive pawl in the form of a hook 574 whose bent end 576 engages the edge of a ratchet wheel 578 which is firmly secured to the rearwardly projecting end of the memory shaft 562. During rotation of the crank disc 570 the pawl 574 is held in engagement with the toothed edge of the ratchet wheel by a stud 580 mounted upon the free end of an arm 582 that is pivoted to the plate 550 of the memory device and which is urged in clockwise direction as viewed in Fig. 35 by a spring 584 tensioned between the free end of the arm 582 and a mounting sleeve 586 projecting outwardly from the side plate 551 near the center thereof. To prevent return of the ratchet wheel 578 after it has been advanced over an increment of its rotary orbit under actuation from the pawl 574, and as said pawl is retracted to engage a successive tooth of said ratchet wheel, the periphery of said ratchet wheel is also engaged by a blunt nosed pawl 588 at a point opposite to the point where the drive pawl 574 engages said wheel (Fig. 33). Said blunt nosed pawl 588 is likewise pivoted to the side plate 550 and is urged into engagement with the ratchet wheel by a spring 590 that is tensioned between its free end and the hereinbefore mentioned mounting sleeve 586 (Fig. 35). To prevent overthrow of the ratchet wheel during rotation thereof cylindrical friction blocks 592 and 594 of Bakelite or similar material received within the above mentioned sleeve 586 and another sleeve 596 projecting outwardly from the outer surface of the side plate 550, may be spring-urged against the inner surface of the ratchet wheel 578 as shown in Fig. 34.

Firmly mounted upon the main shaft 562 for rotation therewith are eight juxtaposed cylindrical sections 600 consecutively identified by the suffix letters a, b, c, d, e, f, g and h, respectively and six juxtaposed cylindrical sections 601 consecutively identified by the suffix letters i, j, k, l, m and n, respectively, one for each of the eight memory pins 548a to 548h and the six memory pins 549i to 549n provided in each of the strip shaped sectors 547 of the memory drum. Interposed between each two adjacent cylindrical sections 600 or 601, respectively, are suitable spacer discs 602, and all the cylindrical sections 600 and 601 in angular alignment to form longitudinal rows of niches as best shown in Figs. 34 and 38. The resultant thirty-six consecutive rows of niches along the outer surface of the rotary body that is formed by the segments 600 and 601 and the spacer discs 602, represent the repeatedly mentioned strip-shaped sectors 547 comprising the 33 potential egg stations on the conveyor path between the lowest rack 108a of the grading board 110 and a point on the distributing conveyor above the last lane 126 of the classification conveyor 124 plus 3 spare stations.

The radially directed partitions 614 which separate the consecutive niches 612 of each drum section 600 and 601, respectively, are provided with narrow lateral slots 616 at about the halfway mark of their radial depth as best shown in Fig. 38 and extending through all the lateral slots 616 of each section 600 or 601 is an annular wire 618 which forms the pivot upon which the memory pins 548 and 549 are mounted with their outer ends projecting beyond the peripheral surface of the cylindrical body of the memory drum. Means are provided to yieldably maintain the memory pins 548 and 549 in a position of ineffectiveness wherein they are tilted slightly to the left as viewed in Fig. 34. For this purpose, the floors of all the niches that are aligned with each other in a direction axially of the drum are formed by common metallic wear strips 620 that extend through suitable apertures 622 in the adjacent spacer discs 602, and the inner ends of the memory pins 548 and 549 are of tubular construction and contain spherical contact beads 624 that are urged outwardly by suitable coil springs 626 (Fig. 41). Thus, whenever one of the memory pins is forced beyond an up-right position about the annular pivot wire 618 and slants slightly to the left with its outer end leaning against the left spacer disc as viewed in Fig. 34, engagement of its contact bead 624 with the wear strip 620 will yieldably maintain the memory pin in said leftwardly tilted position under the urgency of coil spring 626. From said position the pins may individually be shifted about the pivot ring 618 into the rightwardly tilted effective position illustrated in Fig. 34 wherein their upper ends lean against the circumferential edge of the right spacer disc 602, while their lower ends engage a wedge-shaped recess 628 provided in the adjacent side wall of the opposite spacer disc at and somewhat below the floor level of the niches 612 (Figs. 34 and 37).

It has been described hereinbefore that whenever an egg passes from the particular rack 108 onto which it was placed by the candler, over the gate mechanism 220 into an empty cup 112 of the feed elevator 114, it actuates a switch arm 262 that closes a normally opened switch 256 (Fig. 44) and completes an electrical circuit through a solenoid 250 which disables upon energization the gate-opening mechanism preceding the cup that received the egg. As likewise pointed out hereinbefore closure of switch 256 has an additional effect in that it also completes an electrical circuit through another solenoid 264, which is located adjacent the particular section 600 of the memory drum that corresponds to the quality rack 108 upon which the egg was originally deposited. Upon energization, said solenoid 264 is effective to shift the memory pin 548 of said particular section 600 in the row of pins that represents the cup which received the egg, from its ineffective position into the above described effective position. Hence, the quality of the egg is recorded in the longitudinal row of pins that represents the cup which passes the quality rack at the moment and which received an egg from said rack. Then, as the particular elevator cup rises to the level of the weighing mechanism and the egg in said cup is transferred onto and weighed in the weighing cup, the weighing operation closes another switch 310 depending upon the weight of the egg as previously described, which is effective to close a circuit through yet another solenoid 320 that is located radially above a section 601 of the rotary memory drum which represents the particular weight group into which the egg was found to belong by the weighing operation. Upon energization, said solenoid 320 shifts the memory pin 549 of said particular section 601 within the axial row of pins which represents the particular egg, from ineffective position to effective position in the same manner as the one of the quality pins 600 in said same row was previously shifted by energization of a solenoid 264 as described hereinbefore.

It will be apparent from the above that eight solenoids 264a and 264h, each controlled by a respective one of the switches 256a and 256h, operated by the gate mechanism 220 at the end of the eight consecutive quality racks 108a and 108h, must be provided radially above the eight memory drum sections 600a to 600h in successive sectors of their rotary orbit that correspond to the location of said eight superposed quality racks. It will also be understood that over a successive sector of the circular orbit of the memory drum, six additional pin actuating solenoids 320i and 320n must be provided at points radially above the six drum sections 601i to 601n to tilt whatever pin of the six weight recording pins 549 has to be activated to record the weight of an egg that passes through the weighing mechanism.

In Fig. 43 the rotary orbit of the memory drum is diagrammatically represented as the development of a cylindrical surface that is subdivided into 36 consecutive sectors 1 to 36 which represent the hereinbefore discussed 36 potential egg stations that are provided for on the drum. Said cylindrical surface is also divided into 14 adjacent columns $a$ to $n$. The columns $a$ to $h$ represent the areas around the drum sections 600a to 600h that carry the quality recording pins 548a to 548h and the columns $l$ to $n$ represent the areas around the drum sections 601i to 601n which carry the weight recording pins 549i to 549n. As indicated by the letters QS in said diagram, the quality recording solenoids 264a to 264h are located above the adjacent drum sections 600a to 600h in the first eight sectors 1 to 8 of the rotary orbit of the memory drum which sectors correspond to the eight superposed quality racks 108a to 108h that are successively encountered by the cups on the rising run of the feed elevator. However, the six weight recording solenoids 320i to 320n, above the drum sections 600i to 600n are located in one and the same sector of the rotary orbit of the memory drum, as indicated by the letters WS in sector 10, because the weight-determination occurs for all eggs at one and the same point in their path of advance.

For mounting the recording solenoids 264 and 320 in their proper places adjacent the circumference of the memory drum, each of the drum sections 600 and 601 is surrounded by a stationary annular disc or ring 630, and all the annular discs surrounding the rotary drum body are held in position at three angularly spaced points of their peripheries by three longitudinal rods 632 and 634 and 636, respectively, whose opposite ends carry clamps 638 that are engaged over the edges of the circular side plates 550 and 551 (Figs. 33, 34, 35, 36 and 37). To prevent accidental displacement of said rods along the peripheries of the side plates, the edges of said plates may be provided with semi-circular notches 640 within which the rods may be securely fitted while the clamps 638 may be bolted to said side plates through apertures 642 provided in said plates in radial alignment with the notches 640. As may be seen from Figs. 35 and 37, provision is made for a selection of said notches 640 and appertaining apertures 642 for each of the supporting rods 632, 634 and 636 so that their location on the disc may be varied if desired.

The outer edges of the annular discs 630 are provided with 36 radially receding slots 644 whose outer edges are preferably expanded to form semi-circular recesses 646 that may be engaged by the hereinbefore mentioned supporting rods 632, 634 and 636 in the same manner as the semi-circular notches 640 in the edges of the side plates 550 and 551 (Fig. 36). Said slots 644 serve to mount the recording solenoids 264 and 320, respectively, at their proper places relative to the rotating body of the memory drum.

The solenoids 264 and 320 are preferably constructed in the manner of self-contained units that may be clamped upon the annular discs 630 wherever needed. For this purpose, they may comprise a tubular housing 648 within which the winding (not visible) is disposed and which carries at its upper end the terminal leads 650a and 650b of said winding (Fig. 40). Rigidly secured to said tubular housing at the actuating end of its cylindrical armature 652 is a bracket 654 of a U-shaped cross section, and secured to the side of the tubular housing and extending over a portion of the rear wall of said U-shaped bracket is a guide strip 656 that is adapted to fit into the slots 644 of the mounting discs 630. Fastened to the outer face of said guide strip is a retaining spring 658 extending parallel to the rear wall of the U-shaped bracket 654 to a point below the lower end thereof where it may be provided with a suitable latching button 660. When the described solenoid is slipped over the outer edge of one of the annular mounting discs 630 with its guide strip 656 engaging one of the slots 644 of said discs, said button 660 snaps into a suitable aperture 662 provided in the discs 630 below and in radial alignment with each retaining slot 644, whereupon the solenoid is dependably held in place but may readily be removed if it should be desired to change its position relative to the rotary drum body.

Pivotally attached to the normally retracted actuating end of the cylindrical armature 652 is an arm 664 whose free end is pivotally supported in the U-shaped end 666 of a bell crank 668 that turns upon a pivot 670 which is mounted in the opposite walls of the U-shaped bracket 654 near the lower end thereof. When the solenoid is de-energized, a spring 672 coiled about the projecting upper end of armature 652 and bearing against the radially extended head 674 thereof, maintains said armature in the retracted position shown in full lines in Fig. 40 wherein an actuating lug 676 of a flexible material, such as rubber, secured to the free end 677 of the bell crank 668 is disposed entirely below, and within the space defined by, the U-shaped bracket 654. Upon energization of the solenoid, however, the armature 652 is projected downwardly swinging the bell crank 668 into the position shown in broken lines in Fig. 40, wherein its actuating lug 676 may laterally engage any memory pin of its respective drum segment 600 or 601 and push said pin out of its ineffective position into its effective position as illustrated in Figs. 38 and 39.

Let it be assumed that an egg is delivered into a cup of the feed elevator 114 from the lowermost quality rack 108a upon which the candler places the eggs graded as "Checked." As the egg passes through the gate mechanism 220 the solenoid 264a positioned above the drum segment 600a in sector 1 of the rotary orbit of the memory drum will be energized and move to the left most pin 548a in the row of pins representing the cup into effective position. However, if the cup receives its egg from a higher rack, one of the other quality recording solenoids 264b to 264h in the following sectors 2 to 8 of the drum orbit will enter into action and tilt the proper pin in the particular row of memory pins here under consideration into effective position. As the egg is transferred to the weighing platform 266, its representative row of pins passes through sector 9 of the orbit and as it is swept from said platform onto the distributing conveyor 122 with the platform supporting bracket 280 locked in position, its representative row of pins passes through sector 10. It is while the row of pins passes through said sector 10 that the position of the weight discs 358 is sensed by the fingers 360 and the proper one of the weight recording solenoids 320 is energized. Accordingly, the mounting discs 630 carry in sector 10 six weight recording solenoids 320i to 320n above the six drum sections 601i to 601n, respectively, as pointed out hereinbefore. As one of said solenoids springs into action, depending upon the result of the weighing operation, the proper pin of the group of six weight pins 549i to 549n in the row of pins that represents the egg here under consideration, is tilted laterally into effective position. Then as the egg moves along on the distributing conveyor 122, its respective row of pins on the drum 116 passes through sectors 11, 12 and 13 and finally enters the region represented by sectors 14 to 32 which covers the 18 parallel lanes of classification conveyor 124.

As pointed out hereinbefore, the egg handling machine of the present invention is adapted to distinguish between eight different quality grades and six different weight ranges, and is therefore theoretically capable of sorting the eggs fed to the machine into forty-eight quality and weight combinations. In practice, however, eggs are rarely segregated into more than eighteen quality and weight combinations for which reason the classification conveyor 124 forms only eighteen different lanes as has been described above.

To effect discharge of an egg of a particular weight and quality combination into a predetermined classification lane of conveyor 124, the hereinbefore mentioned mounting discs 630 carry at a sector of the drum orbit corresponding to the particular classification lane switches 680 and 682 that are located above the drum sections 600 and 601 which represent the selected quality grade and weight. Said switches 680 and 682, lie in the power circuit of the particular egg ejector solenoid 128 that is associated with the selected lane and are normally open, but may temporarily be closed by activated memory pins in the drum sections that represent the selected quality and weight grades.

Having reference to Figs. 34 and 38, said switches are enclosed in brackets 684 of U-shaped cross section and carry on one of the side walls of said brackets a guide strip 686. Bolted to said guide strip and extended below the lower extremity thereof is a leaf spring 690 whose lower end is formed into a retaining arch 692. The guide strip 686 is adapted to fit into the hereinbefore described guide slots 644 provided in the annular mounting discs 630, and when pushed down into a selected one of said slots, a retaining head 688 arranged below said guide strip snaps into the hereinbefore mentioned aperture 662 that is provided below each of the guide slots 644, whereupon the spring 690 holds the switch securely in position upon the mounting disc. The terminal leads 694a and 694b of the switch project above the upper or outer end of the bracket 684, and from its inner or lower end projects an actuating arm 696 which protrudes into the path of memory pins, in effective position, of the drum section with which the switch is associated. Hence, as a memory pin, in effective position, passes underneath a switch 680 or 682, respectively, it engages its actuating arm 696 and closes the switch temporarily.

Let it be assumed, for instance, that the first of the lanes of classification conveyor 124, is to receive all eggs of "Large" size and "A-White" quality. In such a case the annular mounting discs 630 carry in sector 14 of the drum orbit (Fig. 43) above the drum section 600e a switch 680 individually identified by the suffix e in Fig. 47 and above drum section 600k a switch 682 individually identified by the suffix letter k. As pointed out above, said switches are normally open, and they are series connected and lie in the power circuit of the hereinbefore described egg ejection solenoid 128 that is mounted above the first lane of the classification conveyor (Fig. 3D). Let it now be assumed that an egg approaches said classification lane on the distributing conveyor and said egg has, say, the proper weight but is of a quality different from grade "A-White." In such a case, the tilted pin 549k in the row of pins representing the egg will engage the actuating arm 696 of the weight switch 682k in sector 14 of the drum orbit and briefly close said switch but the quality switch 680e in said sector 14 remains open. Hence, the egg ejecting solenoid above the first quality lane remains inactive and the egg on the distributing conveyor will pass onto consecutive lanes of the classification conveyor. However, when an egg combining proper weight and quality approaches the first classification lane on the distributing conveyor, both the pin 548e and the pin 549k of its representative row of memory pins on drum 116 are tilted into effective position. Hence, as said row of memory pins passes underneath the aforementioned switches 680e and 682k in sector 14, both said switches are briefly closed and energize the egg ejecting solenoid 128 above the first classification lane, such a condition being illustrated in Fig. 44. Energization of said solenoid projects its armature 498 into the path of the lug 500 on the cup of the distributing conveyor that carries the egg at this very moment over the first quality lane. This causes the cup to tilt and discharge the egg lying therein into the above described continuously rotating transfer mechanism 508 which deposits the egg into the first lane of the classification conveyor.

Let it now be assumed that the second lane of the classification conveyor is to receive all eggs of "Jumbo" size no matter what their quality may be. In such a case, a switch 682i is plugged into the 9th annular mounting disc 630 (counted from the left as viewed in Figs. 34 and 43) in sector 15 of the drum orbit which corresponds to the second lane of the classification conveyor and in the very same sector switches 680a, 680b, 680c, 680d, 680e, 680f, 680g and 680h are plugged into the first eight mounting discs 630 above drum sections 600a to 600h, respectively. These eight switches 680a to 680h are all connected in parallel, and every one of them is connected in series with the weight switch 682i as shown in Fig. 44. Hence, whenever a row of pins with its "Jumbo" weight pin 659i tilted in effective position passes through sector 15 of the drum orbit, the egg ejection solenoid 128 above the second classification lane is energized and tilts the cup 120 that passes above said lane at the moment, because aside from the weight switch 682i, one of the eight different quality switches in series with said weight switch will always be closed, and complete the power circuit of the mentioned egg ejection solenoid. Thus, by mounting quality and weight switches of the described construction at appropriate places above the sectors 14 to 22 and 24 to 32 of the drum orbit and appropriately connecting said switches into the power circuits of the eighteen egg ejection solenoids above the eighteen different classification lanes (Fig. 44) it is possible to adjust the machine in such a manner that all eggs deposited onto the quality racks of the grading board are dependably segregated into eighteen (or less) selected quality and weight combinations.

After a row of pins has passed through sector 32 of the drum orbit which corresponds to the last of the classification lanes on conveyor 120, its activated members must be returned to their neutral position so that said row of pins may again serve to register the weight and quality of an egg supplied from the grading board into the feed elevator. For this purpose, a set of fourteen restore cams 697 may be supported from the hereinbefore mentioned mounting discs 630 in sector 35 of its rotary orbit as indicated in Fig. 43. Having a reference to Figs. 39 and 42, said cams have roughly the forms of an inverted T whose vertical stem 698 fits into the hereinbefore mentioned radial slots 644 of the mounting discs 630 and may be fastened to said discs through the hereinbefore described apertures 662 by suitable screw bolts 700. The two ends 699a and 699b of the cross bar 699 of said T-shaped camming member are turned laterally in opposite directions, as best shown in Fig. 42, so that a pin, in effective position, on passing the camming member, will be shifted back into its oppositely tilted ineffective position in two successive stages.

While I have described my invention with the aid of a preferred embodiment, it will be understood that the constructional details described and shown in the accompanying drawings may be departed from without departing from the scope and spirit of my invention.

Also, while the machine of the invention as illustrated in the accompanying drawings and as described in the specification was specifically devised, and is employed for processing eggs, it will be understood that a machine embodying the principles of the invention may also be usefully employed to segregate other articles, such as avocados or other highly priced fruit.

I claim:

1. A weighing mechanism comprising a platform, means resiliently maintaining said platform in an elevated position in a manner permitting it to yield to different lower levels depending upon the weight of an article placed thereon, a switch actuating device mounted for movement in unison with said platform, a plurality of data storage units, each of said data storage units being arranged when activated to store information that an article of a predetermined weight range is present, a plurality of normally open switches adjacent said actuating device and having actuating arms opposite said actuating device, each of said switches being adapted upon closure to activate one of said units, and a mechanism arranged when actuated to effect relative movement between said device and said actuating arms sufficient to cause engagement and actuation of one of said arms by said device depending upon the level to which an article deposited on said platform depressed said platform.

2. A weighing mechanism comprising a platform, means resiliently maintaining said platform in an elevated position in a manner permitting it to yield to different lower levels depending upon the weight of an article placed thereon, a plurality of data storage units, each of said data storage units being arranged when activated to store information that an article of a predetermined weight range is present, a plurality of switch actuating discs positioned at different relative levels and mounted for movement in unison with said platform, an equal number of normally open switches adjacent said discs and having actuating arms opposite said discs, all of said actuating arms being arranged on a common level, each of said switches being adapted upon closure to activate one of said units, and a mechanism arranged when actuated to effect relative movement between said discs and said actuating arms sufficient to cause engagement and actuation of one of said arms by its corresponding disc depending upon the level to which an article deposited on said platform depressed said platform.

3. A combined weighing and data storing mechanism for eggs comprising a platform adapted to support an egg, means including a linkage parallelogram for resiliently maintaining said platform in an elevated position in a manner permitting it to yield to different lower levels depending upon the weight of an egg placed thereon, a plurality of data storage elements each of which is arranged when activated to store information that an egg of a predetermined weight range is present, a plurality of switch actuating discs positioned at different relative levels and mounted for movement in unison with said platform, an equal number of solenoids, each solenoid being arranged upon energization to activate one of said storage elements, an equal number of normally open switches adapted upon closure to energize individual ones of said solenoids and having actuating points opposite said discs arranged on a common level, a mechanism arranged when actuated to effect relative movement between said discs and said switch actuating points sufficient to cause engagement and actuation of one of said points by its corresponding disc depending upon the level to which an egg deposited on said platform depressed said platform, and means carried by said switches for temporarily locking said platform in the depressed position corresponding to the weight of the egg placed thereon.

4. Arrangement according to claim 3 wherein the normally open switches of all but the solenoid associated with the storage element representing the lowest weight range lie normally in the power circuits of the solenoids representing the next lower weight ranges and are arranged, upon closure to energize their respective solenoids, to interrupt the power circuits of the solenoids representative of the next lower weight ranges.

5. A combined weighing and data storing mechanism for eggs comprising a platform adapted to support an egg, means for resiliently maintaining said platform in an elevated position in a manner permitting it to yield to different lower levels depending upon the weight of an egg placed thereon, a plurality of data storage elements each of which is arranged when activated to store information that an egg of a predetermined weight range is present, a plurality of switch actuating discs positioned at different relative levels and mounted for movement in unison with said platform, an equal number of solenoids arranged upon energization to activate individual ones of said elements, an equal number of normally open switches adapted upon closure to energize individual ones of said solenoids and having actuating points opposite said discs but arranged on a common level, means effective to dampen the oscillations of said platform upon deposit of an egg thereon, a mechanism arranged when actuated to effect relative movement between said discs and said switch actuating points sufficient to cause engagement and actuation of one of said points by its corresponding disc depending upon the level to which an egg deposited onto said platform depressed said platform, and means carried by said switches for temporarily locking said platform in the depressed position corresponding to the weight of the egg placed thereon.

6. A combined weighing and data storing mechanism for eggs comprising a platform adapted to support an egg, means for resiliently maintaining said platform in an elevated position in a manner permitting it to yield to different lower levels depending upon the weight of an egg placed thereon, cyclically operable means for delivering an egg into and out of said platform, a plurality of data storage elements each of which is arranged when activated to store information that an egg of a predetermined weight range is present, a plurality of switch actuating discs positioned at different relative levels and mounted for movement in unison with said platform, an equal number of solenoids arranged upon energization to activate individual ones of said elements, an equal number of normally open switches in series with individual ones of said solenoids, said switches having actuating arms opposite said discs but arranged on a common level, a normally open master switch common to and in series with all said solenoids, means actuated by said egg delivering means and effective upon being actuated to move said arms towards said discs so as to cause actuation of one of said arms by its corresponding disc depending upon the level to which an egg deposited on said platform depressed said platform, and means carried by said switches for locking said platform in the depressed position corresponding to the weight of the egg placed thereon, and means effective upon closest approach of said discs and said switch actuating arms to briefly close said master switch.

7. A combined weighing and data storing mechanism for eggs comprising a platform adapted to support an egg, means for resiliently maintaining said platform in an elevated position in a manner permitting it to yield to different lower levels depending upon the weight of an egg placed thereon, cyclically operable means for delivering an egg into and out of said platform, means effective to dampen the oscillations of said platform upon deposit of an egg thereonto, a plurality of data storage elements each of which is arranged when activated to store information that an egg of a predetermined weight range is present, a plurality of switch actuating discs positioned at different relative levels and mounted for movement in unison with said platform, an equal number of solenoids arranged upon energization to activate individual ones of said elements, an equal number of normally open switches in series with individual ones of said solenoids, said switches having actuating arms opposite said discs but arranged on a common level, a normally open master switch common to and in series with all said solenoids, means operating in timed relation with said egg delivering means for moving said arms toward said discs so as to cause actuation of one of said arms by its corresponding disc depending upon the level to which an egg deposited on said platform depressed said platform, means carried by said switches for temporarily locking said platform in the depressed position corresponding to the weight of the egg placed thereon, and means effective upon closest approach of said discs and said switch actuating arms to fully close said master switch.

8. A combined weighing and data storing mechanism for eggs comprising a platform adapted to support an egg, means for resiliently supporting said platform in an elevated position in a manner permitting it to yield to different lower levels depending upon the weight of an egg placed thereon, a magnet having two opposed poles, said platform supporting means comprising an oscillation damping member arranged to extend into the magnetic field established between said poles, means for delivering an egg into and out of said platform, a plurality of data storage elements each of which is arranged when activated to store information that an egg of a predetermined weight range is present, a plurality of switch actuating discs positioned at different relative levels and mounted for movement in unison with said platform, an equal number of solenoids arranged upon energization to activate individual ones of said elements, an equal number of normally open switches in series with individual ones of said solenoids, said switches having actuating arms opposite said discs but arranged on a common level, and an actuating mechanism arranged when actuated to move said switch actuating arms toward said discs so as to cause actuation of one of said arms by its corresponding disc depending upon the level to which an egg deposited on said platform depressed said platform.

9. A combined weighing and data storing mechanism for eggs comprising a platform adapted to support an egg, means for resiliently supporting said platform in an elevated position in a manner permitting it to yield to different lower levels depending upon the weight of an egg placed thereon, a magnet having two opposed poles, said platform supporting means comprising an oscillation damping member arranged to extend into the magnetic field established between said poles, cyclically operable means for delivering an egg into and out of said platform, a plurality of data storage elements each of which is arranged when activated to store information that an egg of a predetermined weight range is present, a plurality of switch actuating discs positioned at different relative levels and mounted for movement in unison with said platform, an equal number of solenoids arranged upon energization to activate individual ones of said elements, an equal number of normally open switches in series with individual ones of said solenoids, said switches having actuating arms opposite said discs but arranged on a common level, means operating in timed relation with said egg delivering means for moving said switch actuating arms toward said discs so as to cause actuation of one of said arms by its corresponding disc depending upon the level to which an egg deposited on said platform depressed said platform, and means movable into engagement with said platform for temporarily locking said platform in the depressed position corresponding to the weight of the egg placed thereon.

10. A combined weighing and data storing mechanism for eggs comprising a platform adapted to support an egg, means including a linkage parallelogram for resiliently supporting said platform in an elevated position in a manner permitting it to yield to different lower levels depending upon the weight of an egg placed thereon, a magnet having two opposed poles, said platform supporting means comprising an oscillation damping member arranged to extend into the magnetic field established between said poles, cyclically operable means for delivering an egg into and out of said platform, a plurality of data storage elements each of which is arranged when activated to store information that an egg of predetermined weight range is present, a plurality of switch actuating discs positioned at different relative levels and mounted for movement in unison with said platform, an equal number of solenoids arranged upon energization to activate individual ones of said elements, an equal number of normally open switches in series with individual ones of said solenoids, said switches having actuating arms opposite said discs but arranged on a common level, a normally open master switch common to and in series with all said solenoids, means operating in timed relation with said egg delivering means and effective to move said switch actuating arms toward said discs so as to cause actuation of one of said arms by its corresponding disc depending upon the level to which an egg deposited on said platform depressed said platform, means for temporarily locking said platform in the depressed position corresponding to the weight of the egg placed thereon, and means effective upon closest approach of said discs and said switch actuating arms to briefly close said master switch.

11. In a combined weighing and data storing mechanism, a platform, means resiliently supporting said platform in an elevated position in a manner permitting it to yield to different weight levels, a plurality of switch actuating members positioned at different relative levels and mounted for movement in unison with said platform, a plurality of data storage units arranged when selectively activated to register the presence of an article of a predetermined weight range, a plurality of switches adapted upon actuation by said actuating members to selectively activate said data storage units, and means operatively responsive to the selective activation of said data storage units.

12. A combined weighing and data storing mechanism comprising a platform adapted to support an article, means for resiliently maintaining said platform in an elevated position in a manner permitting it to yield to different lower levels depending upon the weight of an article placed thereon, a plurality of data storage elements each of which is arranged when activated to store information that an article of a predetermined weight range is present, a plurality of switch actuating discs positioned at different relative levels and mounted for movement in unison with said platform, an equal number of solenoids arranged upon energization to activate individual ones of said storage elements, an equal number of normally open switches adapted upon closure to energize individual ones of said solenoids and having actuating points opposite said discs but arranged on a common level, and a mechanism arranged when actuated to effect relative movement between said discs and said switch actuating points sufficient to cause engagement and actuation of one of said points by its corresponding disc depending upon the level to which an article deposited onto said platform depressed said platform.

13. A weighing machine comprising a platform, means resiliently maintaining said platform in an elevated position in a manner permitting it to yield to different lower levels depending upon the weight of an article placed thereon, cyclically operable means for delivering an article into and out of said platform, a switch actuating device mounted for movement in unison with said platform, a plurality of data storage units each of which is arranged when activated to store information that an article of a predetermined weight range is present, a plurality of normally open switches adapted upon closure to activate individual ones of said units having actuating arms opposite said device, means operating in timed relation with said article delivering means to effect relative movement between said device and said actuating arms sufficient to cause engagement and actuation of one of said arms by said device depending upon the level of which an article deposited on said platform depressed said platform.

14. In combination, a weighing mechanism having a platform adapted to move downwardly under load to a plurality of different lower levels depending upon the weight of said load, a plurality of data storage units disposed remote from said weighing mechanism, means mounting each data storage unit for movement from an inactive setting to an active setting which registers the presence on said platform of an article in a predetermined weight range, and means movable into engagement with said platform at each of said different levels and operatively associated with said data storage units for activating a predetermined one of said units when said platform is disposed at each of said lower levels.

15. In combination, a weighing mechanism having a platform adapted to move downwardly to a plurality of different lower levels depending upon the weight of an article imposed thereon, actuating means mounted for movement with said platform, data storage units arranged when selectively activated to store information that an article of a predetermined weight classification is present, means operatively responsive to said actuating means for selectively activating said data storage units, and sensing means operatively responsive to the selective activation of said data storage units.

16. A weighing mechanism comprising a platform, means resiliently maintaining said platform in an elevated position in a manner permitting it to yield to different lower levels depending upon the weight of an article placed thereon, a switch actuating device mounted for movement in unison with said platform, a plurality of normally open switches adjacent said device and having actuating arms opposite said device, and means operable upon deposit of an article onto said platform to effect relative movement between said device and said actuating arms sufficient to cause engagement and actuation of one of said arms by said device depending upon the level to which an article deposited on said platform depressed said platform.

17. A weighing mechanism comprising a platform, means resiliently maintaining said platform in an elevated position in a manner permitting it to yield to different lower levels depending upon the weight of an article placed thereon, a plurality of switch actuating discs positioned at different relative levels and mounted for movement in unison with said platform, an equal number of normally open switches adjacent said discs and having actuating arms opposite said discs, all said actuating arms being arranged on a common level, and a mechanism arranged when actuated in response to the depositing of an article onto said platform to effect relative movement between said discs and said actuating arms sufficient to cause engagement and actuation of one of said arms by its corresponding disc depending upon the level to which an article deposited on said platform depressed said platform.

18. A weighing mechanism comprising a platform adapted to support an article, means including a linkage parallelogram for resiliently maintaining said platform in an elevated position in a manner permitting it to yield to different lower levels depending upon the weight of an article placed thereon, a plurality of switch actuating discs positioned at different relative levels and mounted for movement in unison with said platform, an equal number of solenoids, an equal number of normally open switches adapted upon closure to energize individual ones of said solenoids and having actuating points opposite said discs arranged on a common level, a mechanism arranged when actuated in response to the depositing of an article onto said platform to effect relative movement between said discs and said switch actuating points sufficient to cause engagement and actuation of one of said points by its corresponding disc depending upon the level to which an egg deposited on said platform depressed said platform, and means carried by said switches for temporarily locking said platform in the depressed position corresponding to the weight of the egg placed thereon.

References Cited in the file of this patent

UNITED STATES PATENTS

| | | |
|---|---|---|
| 665,584 | Sears et al. | Jan. 8, 1901 |
| 1,176,752 | Hargrove | Mar. 28, 1916 |
| 1,333,890 | Wright | Mar. 16, 1920 |
| 1,573,950 | Torgersen | Feb. 23, 1926 |
| 1,629,221 | MacNutt | May 17, 1927 |
| 1,688,539 | Fischer | Oct. 23, 1928 |
| 2,107,008 | Lasker | Feb. 1, 1938 |
| 2,158,023 | Smith | May 9, 1939 |
| 2,199,010 | Robb | Apr. 30, 1940 |
| 2,308,729 | Walter | Jan. 19, 1943 |
| 2,606,658 | Powell | Aug. 12, 1952 |
| 2,659,182 | Argyle | Nov. 17, 1953 |

UNITED STATES PATENT OFFICE

CERTIFICATE OF CORRECTION

Patent No. 2,910,288                                                October 27, 1959

Harold J. Mumma

It is hereby certified that error appears in the printed specification of the above numbered patent requiring correction and that the said Letters Patent should read as corrected below.

Column 4, line 63, for "directed" read -- directly --; column 10, line 59, for "The" read -- To --.

Signed and sealed this 13th day of December 1960.

(SEAL)
Attest:
KARL H. AXLINE
Attesting Officer

ROBERT C. WATSON
Commissioner of Patents